US012574723B2

(12) United States Patent　　　　(10) Patent No.:　US 12,574,723 B2

Wu　　　　　　　　　　　　　　　(45) Date of Patent:　　Mar. 10, 2026

(54) EARLY DATA COMMUNICATION IN AN INACTIVE STATE

(71) Applicant: GOOGLE LLC, Mountain View, CA (US)

(72) Inventor: Chih-Hsiang Wu, Taoyuan City (TW)

(73) Assignee: GOOGLE LLC, Mountain View, CA (US)

( * ) Notice:　Subject to any disclaimer, the term of this patent is extended or adjusted under 35 U.S.C. 154(b) by 391 days.

(21) Appl. No.:　18/037,529

(22) PCT Filed:　Dec. 6, 2021

(86) PCT No.:　PCT/US2021/062009

§ 371 (c)(1),
(2) Date:　May 17, 2023

(87) PCT Pub. No.: WO2022/154900

PCT Pub. Date: Jul. 21, 2022

(65)　　　　　　Prior Publication Data

US 2024/0022903 A1　　Jan. 18, 2024

Related U.S. Application Data

(60) Provisional application No. 63/136,301, filed on Jan. 12, 2021.

(51) Int. Cl.
H04M 1/66　　　(2006.01)
H04W 12/037　　(2021.01)
H04W 12/041　　(2021.01)
H04W 12/0431　　(2021.01)
(Continued)

(52) U.S. Cl.
CPC ....... H04W 12/037 (2021.01); H04W 12/041 (2021.01); H04W 12/0431 (2021.01); H04W 76/20 (2018.02); H04W 76/30 (2018.02)

(58) Field of Classification Search
CPC ... H04W 12/037; H04W 12/03; H04W 76/30; H04W 76/27; H04W 12/0431; H04W 12/041; H04W 76/20
See application file for complete search history.

(56)　　　　　　References Cited

U.S. PATENT DOCUMENTS

| | | |
|---|---|---|
| 2018/0139778 A1 | 5/2018 | Chou et al. |
| 2018/0368196 A1* | 12/2018 | Gage ................... H04L 63/0428 |
| 2020/0021978 A1* | 1/2020 | Chai ..................... H04W 76/27 |

(Continued)

FOREIGN PATENT DOCUMENTS

| | | |
|---|---|---|
| EP | 3 567 920 A1 | 11/2019 |
| WO | WO-2020/194171 A1 | 10/2020 |

OTHER PUBLICATIONS

International Search Report and Written Opinion for Application No. PCT/US2021/062009, dated Mar. 3, 2022.

*Primary Examiner* — Shantell L Heiber
(74) *Attorney, Agent, or Firm* — MARSHALL, GERSTEIN & BORUN LLP

(57)　　　　　　ABSTRACT

To perform early data transmission with a radio access network (RAN), a UE transmits, by processing hardware and when a radio connection between the UE and the RAN is inactive, an initial data packet to the RAN (1306). The UE transmits, by the processing hardware subsequent to transmitting the initial data packet and while the radio connection remains inactive, a subsequent data packet to the RAN (1308).

10 Claims, 21 Drawing Sheets

(51) Int. Cl.
　　*H04W 76/20*　　　(2018.01)
　　*H04W 76/30*　　　(2018.01)

(56)　　　　　References Cited

U.S. PATENT DOCUMENTS

| 2020/0374966 A1 | 11/2020 | Chang et al. |
| 2021/0014899 A1 | 1/2021 | Shih et al. |
| 2021/0211994 A1 | 7/2021 | Shih et al. |

\* cited by examiner

600 ⟍

700

1200

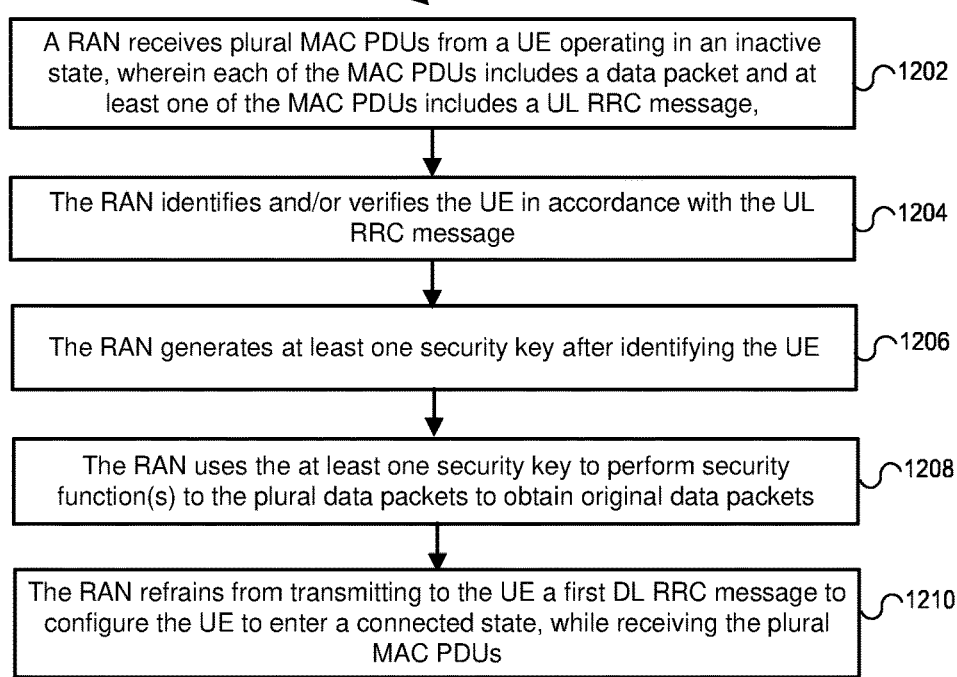

A RAN receives plural MAC PDUs from a UE operating in an inactive state, wherein each of the MAC PDUs includes a data packet and at least one of the MAC PDUs includes a UL RRC message, — 1202

The RAN identifies and/or verifies the UE in accordance with the UL RRC message — 1204

The RAN generates at least one security key after identifying the UE — 1206

The RAN uses the at least one security key to perform security function(s) to the plural data packets to obtain original data packets — 1208

The RAN refrains from transmitting to the UE a first DL RRC message to configure the UE to enter a connected state, while receiving the plural MAC PDUs — 1210

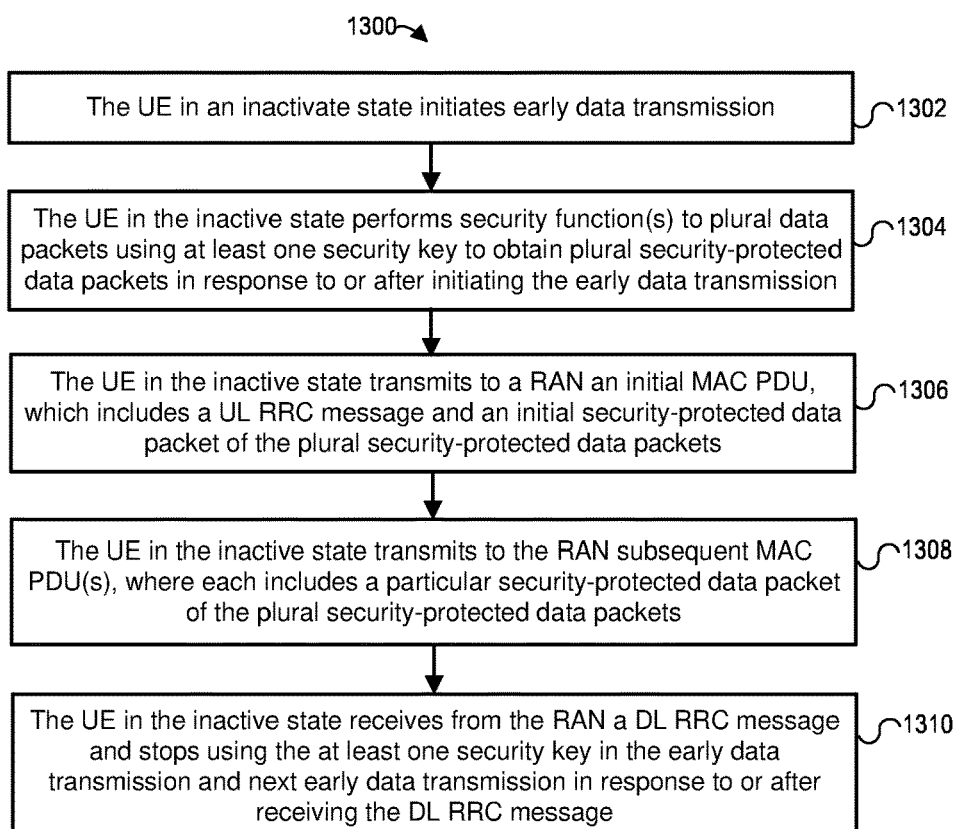

The UE in an inactivate state initiates early data transmission — 1302

The UE in the inactive state performs security function(s) to plural data packets using at least one security key to obtain plural security-protected data packets in response to or after initiating the early data transmission — 1304

The UE in the inactive state transmits to a RAN an initial MAC PDU, which includes a UL RRC message and an initial security-protected data packet of the plural security-protected data packets — 1306

The UE in the inactive state transmits to the RAN subsequent MAC PDU(s), where each includes a particular security-protected data packet of the plural security-protected data packets — 1308

The UE in the inactive state receives from the RAN a DL RRC message and stops using the at least one security key in the early data transmission and next early data transmission in response to or after receiving the DL RRC message — 1310

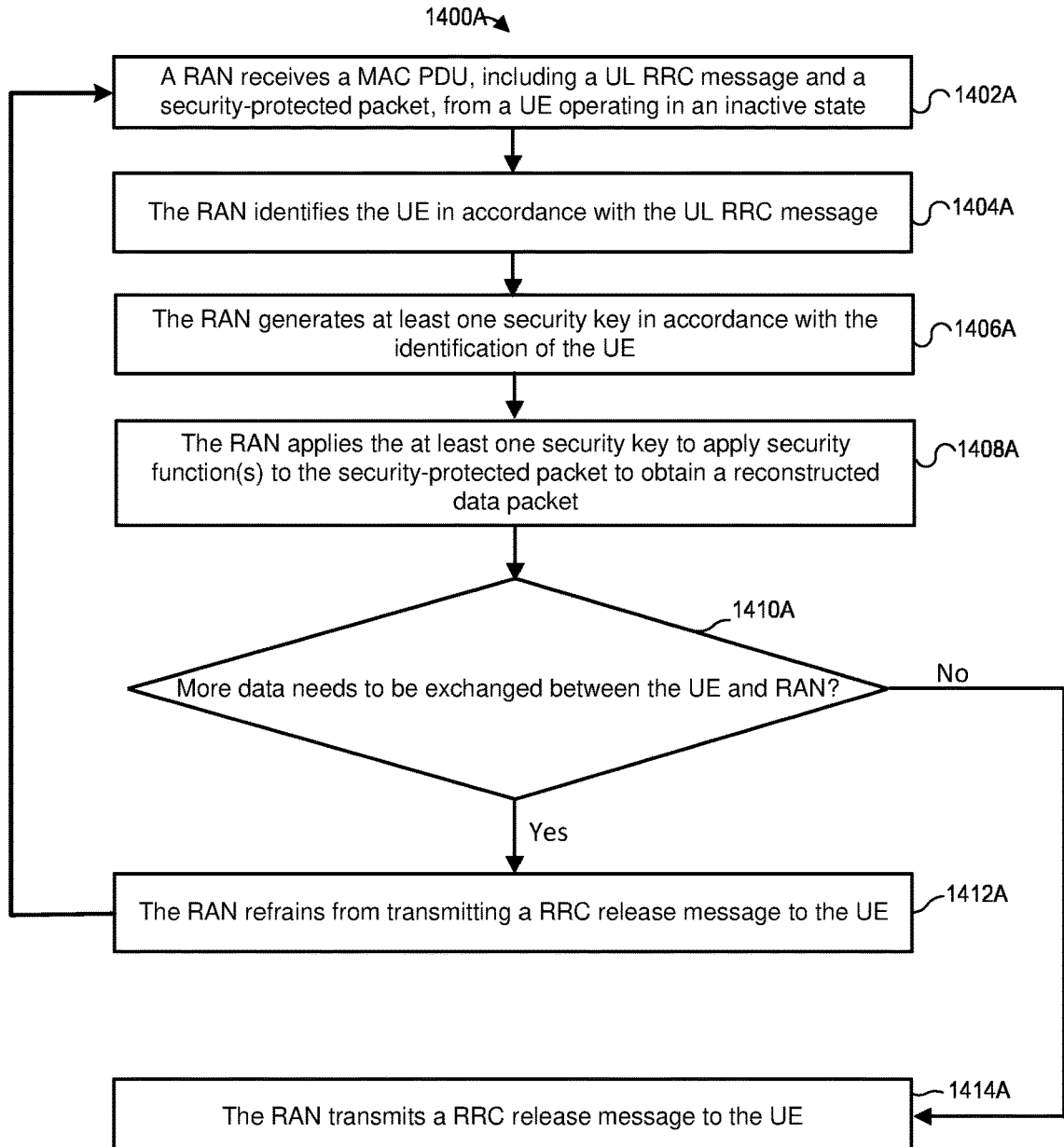

A RAN receives a MAC PDU, including a UL RRC message and a security-protected packet, from a UE operating in an inactive state ⟿1402A The RAN identifies the UE in accordance with the UL RRC message ⟿1404A The RAN generates at least one security key in accordance with the identification of the UE ⟿1406A The RAN applies the at least one security key to apply security function(s) to the security-protected packet to obtain a reconstructed data packet ⟿1408A More data needs to be exchanged between the UE and RAN? 1410A No Yes The RAN refrains from transmitting a RRC release message to the UE 1412A The RAN transmits a RRC release message to the UE 1414A

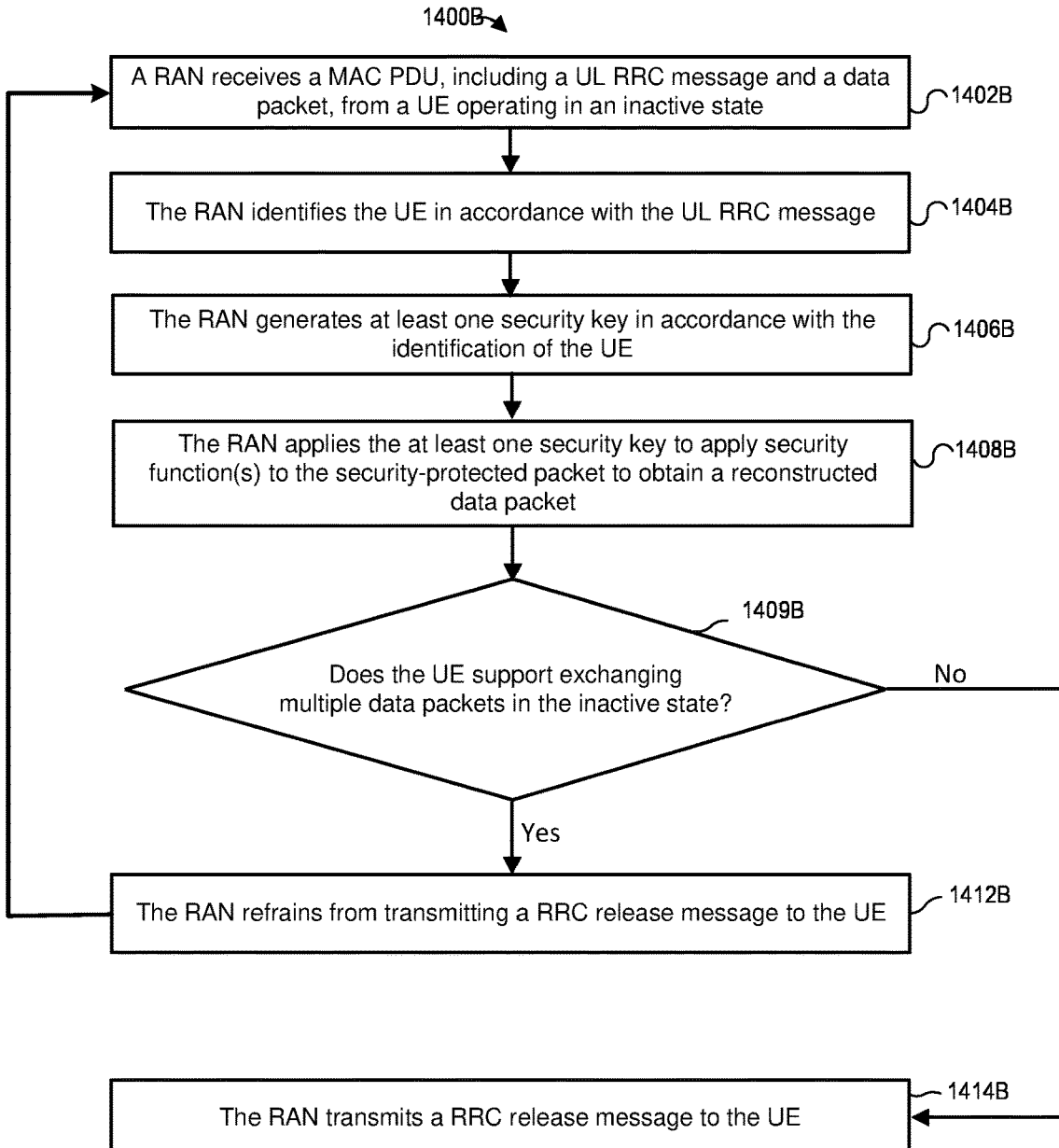

A RAN receives a MAC PDU, including a UL RRC message and a data packet, from a UE operating in an inactive state   1402B The RAN identifies the UE in accordance with the UL RRC message   1404B The RAN generates at least one security key in accordance with the identification of the UE   1406B The RAN applies the at least one security key to apply security function(s) to the security-protected packet to obtain a reconstructed data packet   1408B

1409B

Does the UE support exchanging multiple data packets in the inactive state?    No Yes The RAN refrains from transmitting a RRC release message to the UE   1412B The RAN transmits a RRC release message to the UE   1414B

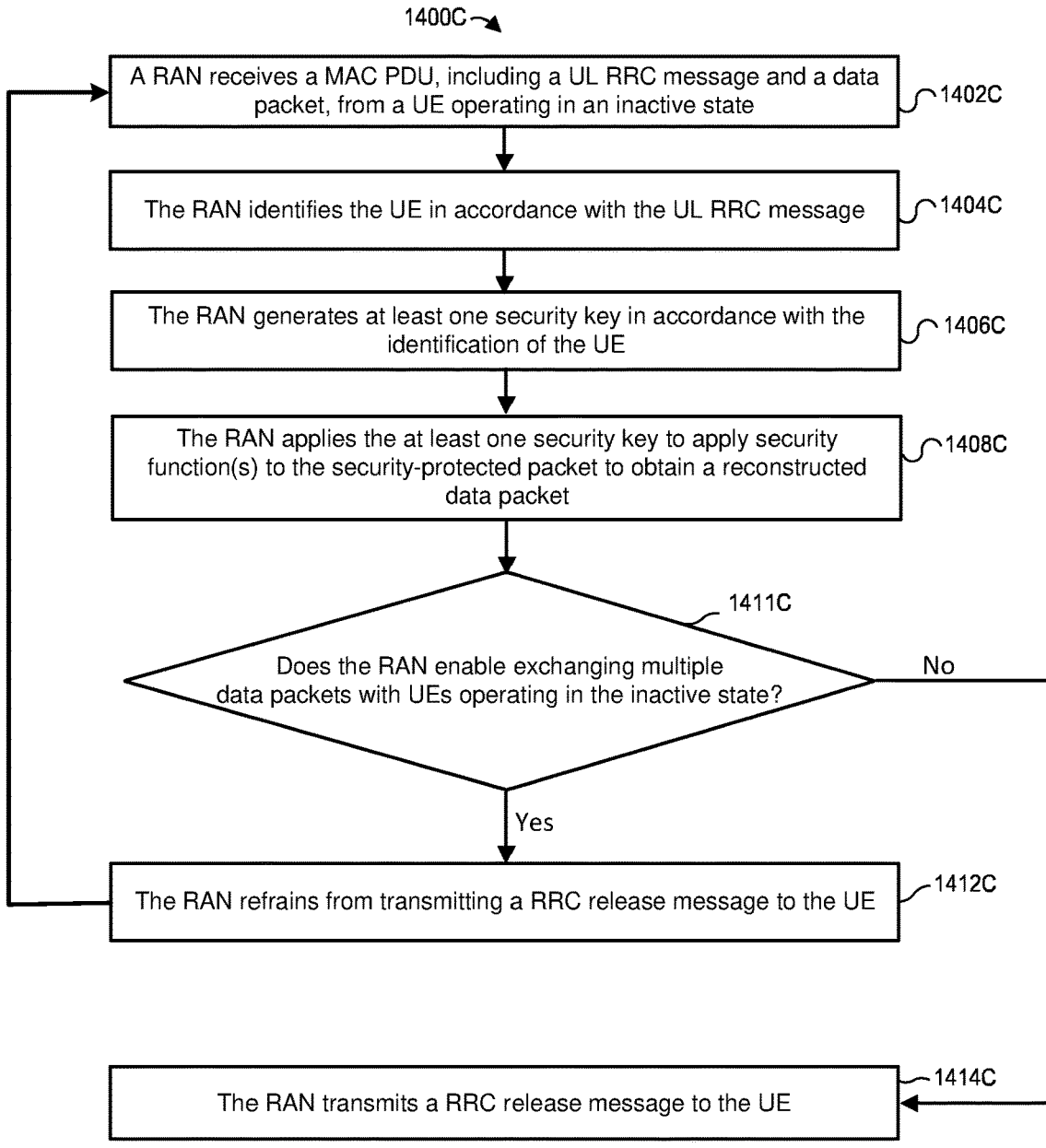

A RAN receives a MAC PDU, including a UL RRC message and a data packet, from a UE operating in an inactive state   1402C The RAN identifies the UE in accordance with the UL RRC message   1404C The RAN generates at least one security key in accordance with the identification of the UE   1406C The RAN applies the at least one security key to apply security function(s) to the security-protected packet to obtain a reconstructed data packet   1408C

1411C

Does the RAN enable exchanging multiple data packets with UEs operating in the inactive state?    No Yes The RAN refrains from transmitting a RRC release message to the UE   1412C The RAN transmits a RRC release message to the UE   1414C

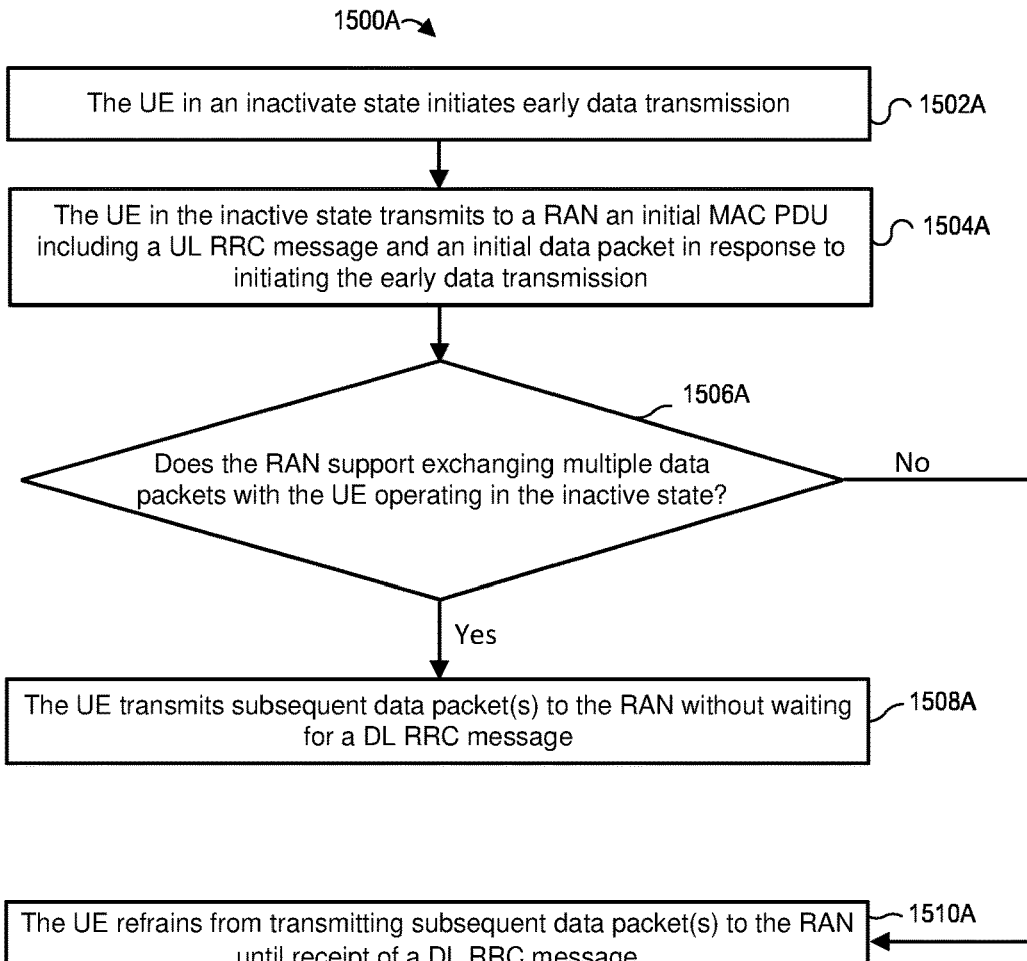

The UE in an inactivate state initiates early data transmission    ⌒ 1502A

The UE in the inactive state transmits to a RAN an initial MAC PDU including a UL RRC message and an initial data packet in response to initiating the early data transmission    ⌒ 1504A Does the RAN support exchanging multiple data packets with the UE operating in the inactive state?    1506A No Yes The UE transmits subsequent data packet(s) to the RAN without waiting for a DL RRC message    1508A The UE refrains from transmitting subsequent data packet(s) to the RAN until receipt of a DL RRC message    1510A

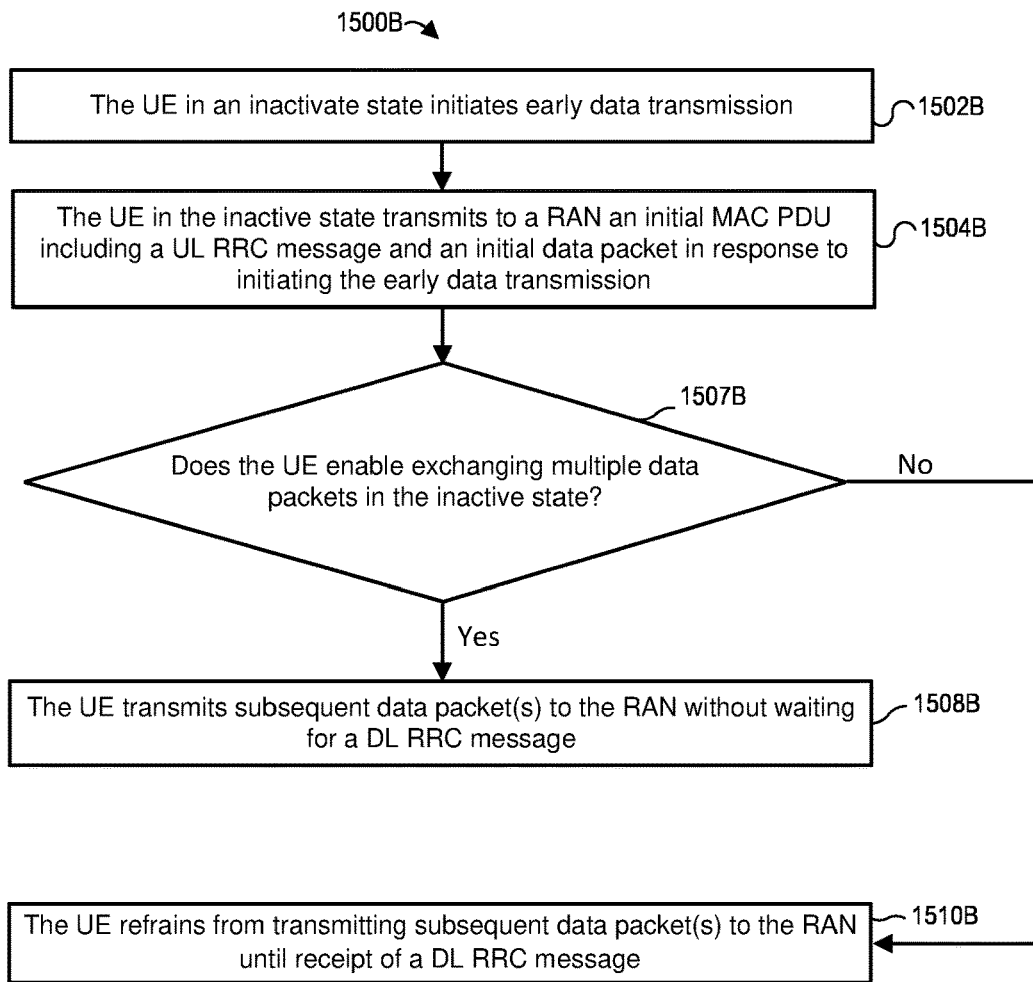

The UE in an inactivate state initiates early data transmission   ⌐1502B

The UE in the inactive state transmits to a RAN an initial MAC PDU including a UL RRC message and an initial data packet in response to initiating the early data transmission   ⌐1504B

1507B

Does the UE enable exchanging multiple data packets in the inactive state?   No

Yes

The UE transmits subsequent data packet(s) to the RAN without waiting for a DL RRC message   1508B The UE refrains from transmitting subsequent data packet(s) to the RAN until receipt of a DL RRC message   1510B

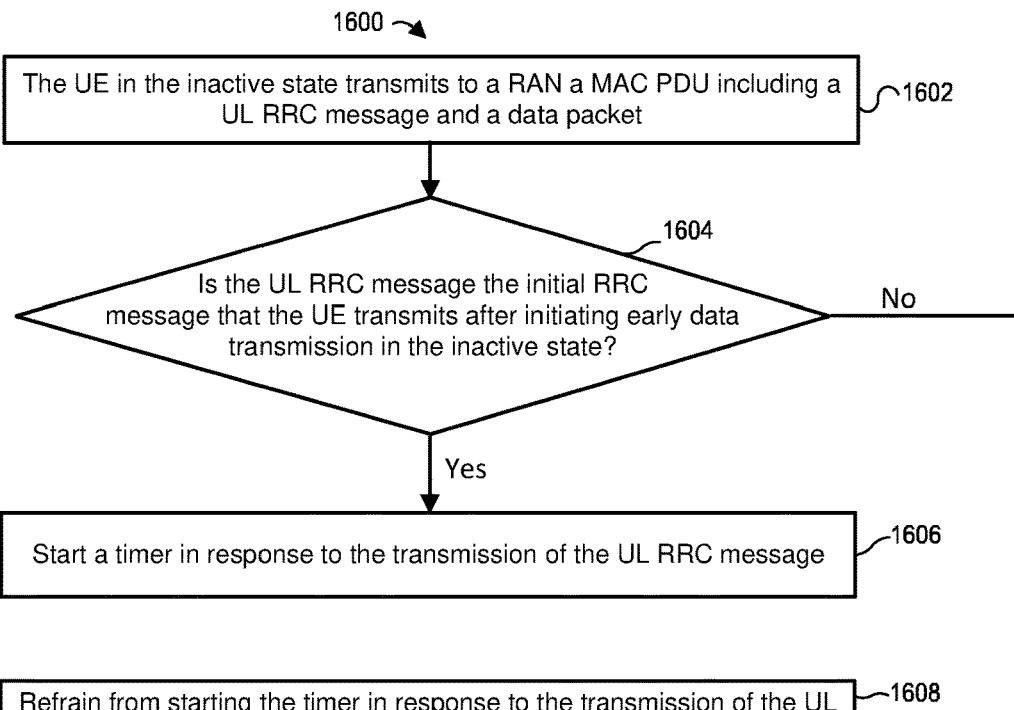

The UE in the inactive state transmits to a RAN a MAC PDU including a UL RRC message and a data packet — 1602

Is the UL RRC message the initial RRC message that the UE transmits after initiating early data transmission in the inactive state? — 1604

No

Yes

Start a timer in response to the transmission of the UL RRC message — 1606

Refrain from starting the timer in response to the transmission of the UL RRC message — 1608

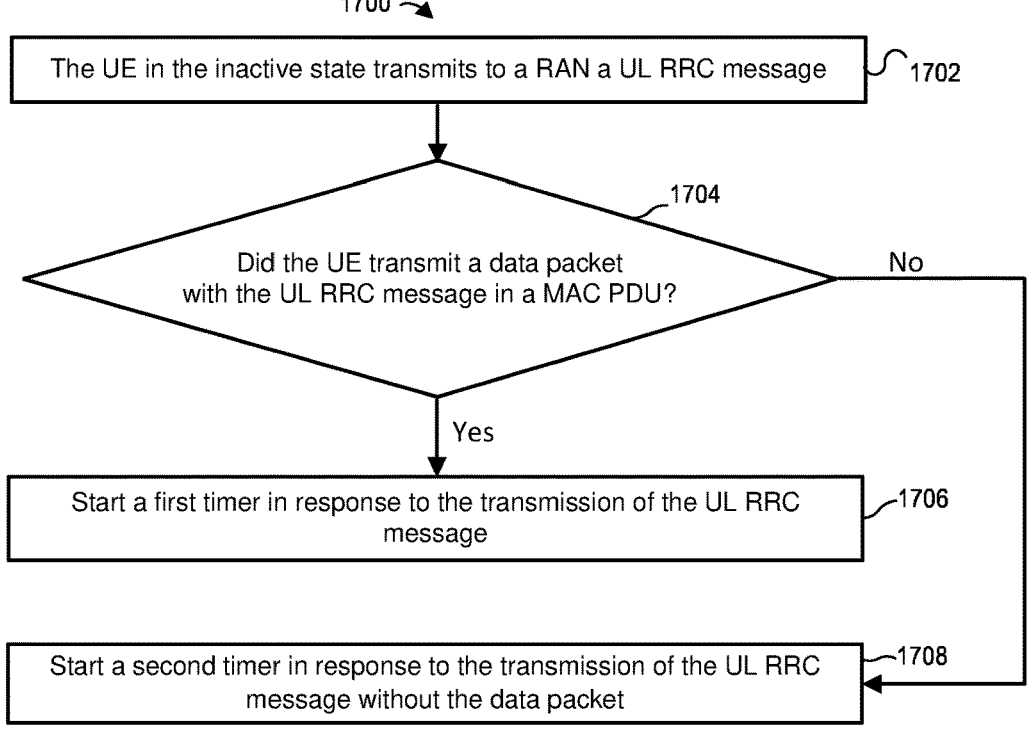

The UE in the inactive state transmits to a RAN a UL RRC message — 1702

Did the UE transmit a data packet with the UL RRC message in a MAC PDU? — 1704

No

Yes

Start a first timer in response to the transmission of the UL RRC message — 1706

Start a second timer in response to the transmission of the UL RRC message without the data packet — 1708

Figure 17

EARLY DATA COMMUNICATION IN AN INACTIVE STATE

CROSS-REFERENCE TO RELATED APPLICATIONS

This application claims priority to and the benefit of the filing date of U.S. Provisional Patent Application No. 63/136,301 entitled "Early Data Communication in an Inactive State," filed on Jan. 12, 2021, the entire disclosure of which is hereby expressly incorporated by reference.

FIELD OF THE DISCLOSURE

This disclosure relates generally to wireless communications and, more particularly, to communication of uplink and/or downlink data at a user equipment (UE) when the UE operates in an inactive or idle state associated with a protocol for controlling radio resources.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Generally speaking, a base station operating a cellular radio access network (RAN) communicates with a user equipment (UE) using a certain radio access technology (RAT) and multiple layers of a protocol stack. For example, the physical layer (PHY) of a RAT provides transport channels to the Medium Access Control (MAC) sublayer, which in turn provides logical channels to the Radio Link Control (RLC) sublayer, and the RLC sublayer in turn provides data transfer services to the Packet Data Convergence Protocol (PDCP) sublayer. The Radio Resource Control (RRC) sublayer is disposed above the PDCP sublayer. The RRC sublayer specifies the RRC_IDLE state, in which a UE does not have an active radio connection with a base station; the RRC_CONNECTED state, in which the UE has an active radio connection with the base station; and the RRC_INACTIVE to allow a UE to more quickly transition back to the RRC_CONNECTED state due to Radio Access Network (RAN)-level base station coordination and RAN-paging procedures. In some cases, the UE in the RRC_IDLE or RRC_INACTIVE state has only one, relatively small packet to transmit. In these cases, the UE is in the RRC_IDLE or RRC_INACTIVE state can perform an early data transmission without transitioning to the RRC_CONNECTED state, e.g., by using techniques as specified in section 7.3 in 3GPP specification 36.300 v16.4.0.

The early data transmission mechanism specified in section 7.3 in 3GPP specification 36.300 v16.4.0 can only support transmission of a single data packet in either UL or DL direction. In some cases, the UE in the RRC_IDLE or RRC_INACTIVE state has several, relatively small packets to transmit. In these cases, the UE still performs the RRC resume procedure with a base station to transition to the RRC_CONNECTED state. After the UE in the RRC_CONNECTED state transmits the packets, the UE waits to receive an RRCRelease message from the base station to configure the UE to transition back to the RRC_IDLE or RRC_INACTIVE state. The UE in the RRC_CONNECTED state performs other tasks (e.g., radio link monitoring and measurements, etc.). Therefore, the UE in the RRC_CONNECTED state consumes more battery power because of these tasks. To serve the UE in the RRC_CONNECTED state, a base station allocates more radio resources (e.g., wider bandwidth part, transmission of channel state information reference signals for the UE's measurements, etc.).

SUMMARY

According to the techniques of this disclosure, when a UE is in an RRC_INACTIVE or RRC_IDLE state, the UE initiates early data transmission with a RAN by transmitting multiple data packets to the RAN in uplink transmission. The UE may transmit a UL RRC message with the initial data packet, such as a control channel (CCCH) message, an RRC resume request message, or an RRC early data transmission request message. In some implementations, the initial data packet is included in the UL RRC message. In other implementations, the UE transmits a MAC protocol data unit (PDU) including the UL RRC message and the initial data packet. Then the UE may transmit subsequent UL RRC messages with each subsequent data packet. In other implementations, the UE transmits each subsequent data packet without a UL RRC message. By initiating early data transmission, a UE may avoid or reduce the amount of time spent in the RRC_CONNECTED state and thus save power and air interface resources.

In some implementations, the UE can secure the data using encryption or integrity protection and may transmit security-protected data packets to the RAN. Also in some implementations, a first base station receiving the security-protected data packets may retrieve the UE ID of the UE for example, from the UL RRC message and identify the base station storing context information for obtaining the data from the security-protected data packets based on the UE ID. When the base station storing the context information is not the first base station receiving the security-protected data packets, the first base station receiving the security-protected data packets may forward the security-protected data packets to a second base station that stores the context information. The second base station may then apply security functions based on the context information to decrypt the data and/or check integrity protection. Then the second base station may transmit the data to a core network or an edge server. In other implementations, the second base station provides the UE context information to the first base station, and the first base station applies security functions based on the context information to decrypt the data and/or check integrity protection. Then the first base station may transmit the data to a core network or an edge server.

Also in some implementations, the UE may not be able to transmit a data packet in early data transmission. For example, the data may be an IMS packet (e.g., for initiating a voice call), the data may be associated with a radio bearer not suitable or configured for early data transmission, the data may be an NAS message for initiating a particular NAS procedure, the size of the data is larger than a threshold size, etc. When the data does not qualify for early data transmission, the UE or the RAN may determine to configure the UE to enter a connected state. Accordingly, the UE may transmit an RRC request message requesting to enter the connected state to the RAN, and the RAN may transmit an RRC response message configuring the UE to enter the connected state. When the RAN determines to configure the UE to enter the connected state, the RAN may transmit the RRC response message configuring the UE to enter the connected state without receiving the RRC request message from the UE. In any event, the UE may then transmit data packets to the RAN in the connected state.

An example embodiment of these techniques is a method in a UE for early data transmission to a radio access network (RAN). The method includes transmitting, by processing hardware and when a radio connection between the UE and the RAN is inactive, an initial data packet to the RAN. Subsequent to transmitting the initial data packet and while the radio connection remains inactive, the method includes transmitting, by the processing hardware, a subsequent data packet to the RAN.

Another example embodiment of these techniques is a UE including processing hardware and configured to implement the method above.

Still another example embodiment of these techniques is a method in a RAN processing early data transmissions from a UE. The method includes receiving, by processing hardware and when a radio connection between the UE and the RAN is inactive, an initial data packet from the UE. Prior to activating or releasing the radio connection, the method includes receiving, by the processing hardware from the UE, a subsequent data packet.

Yet another example embodiment of these techniques is a RAN including processing hardware and configured to implement the method above.

BRIEF DESCRIPTION OF THE DRAWINGS

FIG. 12 is a flow diagram of an example method for processing early data transmissions of security-protected data packets from a UE, which can be implemented in the RAN of FIG. 1A;

FIG. 13 is a flow diagram of an example method for early data transmission of security-protected data packets to a RAN, which can be implemented in the UE of FIG. 1A;

FIG. 14A is a flow diagram of an example method for determining when to release a radio connected when processing early data transmissions of security-protected data packets from a UE, which can be implemented in the RAN of FIG. 1A;

FIG. 14B is a flow diagram of another example method for determining when to release a radio connected when processing early data transmissions of security-protected data packets from a UE, which can be implemented in the RAN of FIG. 1A;

FIG. 14C is a flow diagram of yet another example method for determining when to release a radio connected when processing early data transmissions of security-protected data packets from a UE, which can be implemented in the RAN of FIG. 1A;

FIG. 15A is a flow diagram of an example method for determining when to transmit multiple data packets when performing early data transmission procedures with a RAN, which can be implemented in the UE of FIG. 1A;

FIG. 15B is a flow diagram of another example method for determining when to transmit multiple data packets when performing early data transmission procedures with a RAN, which can be implemented in the UE of FIG. 1A;

FIG. 16 is a flow diagram of an example method for starting a timer after initiating early data transmission with a RAN, which can be implemented in the UE of FIG. 1A;

FIG. 17 is a flow diagram of an example method for starting different timers after initiating early data transmission with a RAN depending on whether a radio resource message included in the early data transmission includes a data packet, which can be implemented in the UE of FIG. 1A;

DETAILED DESCRIPTION OF THE DRAWINGS

Figure 1A:
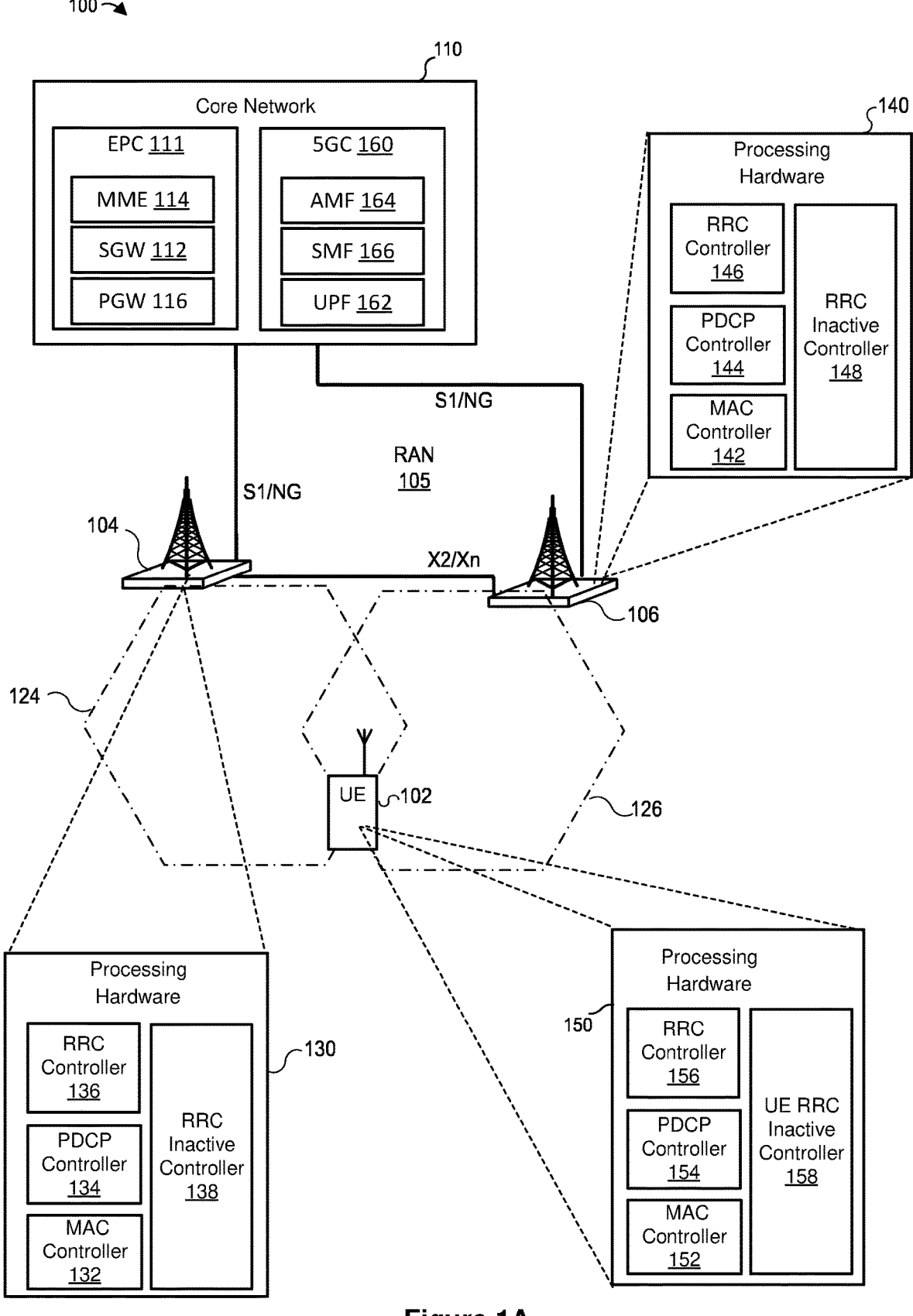
FIG. 1A is a block diagram of an example wireless communication system in which a user device and a base station of this disclosure can implement the techniques of this disclosure for reducing latency in data communication.

Referring first to FIG. 1A, an example wireless communication system 100 includes a UE 102, a base station (BS)

104, a base station 106, and a core network (CN) 110. The base stations 104 and 106 can operate in a RAN 105 connected to the core network (CN) 110. The CN 110 can be implemented as an evolved packet core (EPC) 111 or a fifth generation (5G) core (5GC) 160, for example. The CN 110 can also be implemented as a sixth generation (6G) core in another example.

The base station 104 covers a cell 124, and the base station 106 covers a cell 126. If the base station 104 is a gNB, the cell 124 is an NR cell. If the base station 124 is an ng-eNB, the cell 124 is an evolved universal terrestrial radio access (E-UTRA) cell. Similarly, if the base station 106 is a gNB, the cell 126 is an NR cell, and if the base station 126 is an ng-eNB, the cell 126 is an E-UTRA cell. The cells 124 and 126 can be in the same Radio Access Network Notification Areas (RNA) or different RNAs. In general, the RAN 105 can include any number of base stations, and each of the base stations can cover one, two, three, or any other suitable number of cells. The UE 102 can support at least a 5G NR (or simply, "NR") or E-UTRA air interface to communicate with the base stations 104 and 106. Each of the base stations 104, 160 can connect to the CN 110 via an interface (e.g., S1 or NG interface). The base stations 104 and 106 also can be interconnected via an interface (e.g., X2 or Xn interface) for interconnecting NG RAN nodes.

Among other components, the EPC 111 can include a Serving Gateway (SGW) 112, a Mobility Management Entity (MME) 114, and a Packet Data Network Gateway (PGW) 116. The SGW 112 in general is configured to transfer user-plane packets related to audio calls, video calls, Internet traffic, etc., and the MME 114 is configured to manage authentication, registration, paging, and other related functions. The PGW 116 provides connectivity from the UE to one or more external packet data networks, e.g., an Internet network and/or an Internet Protocol (IP) Multimedia Subsystem (IMS) network. The 5GC 160 includes a User Plane Function (UPF) 162 and an Access and Mobility Management (AMF) 164, and/or Session Management Function (SMF) 166. Generally speaking, the UPF 162 is configured to transfer user-plane packets related to audio calls, video calls, Internet traffic, etc., the AMF 164 is configured to manage authentication, registration, paging, and other related functions, and the SMF 166 is configured to manage PDU sessions.

As illustrated in FIG. 1A, the base station 104 supports a cell 124, and the base station 106 supports a cell 126. The cells 124 and 126 can partially overlap, so that the UE 102 can select, reselect or hands over from one of the cells 124 and 126 to the other. To directly exchange messages or information, the base station 104 and base station 106 can support an X2 or Xn interface. In general, the CN 110 can connect to any suitable number of base stations supporting NR cells and/or EUTRA cells.

As discussed in detail below, the UE 102 and/or the RAN 105 of this disclosure reduces latency in uplink transmission of data when the radio connection between the UE 102 and the RAN 105 is suspended, e.g., in the inactive or idle state of the protocol for controlling radio resources between the UE 102 and the RAN 105. For clarity, the examples below refer to the RRC_INACTIVE or RRC_IDLE state of the RRC protocol.

As used in this disclosure, the term "data" or "data packet" refers to signaling, control-plane information at a protocol layer of controlling radio resources (e.g., RRC), controlling mobility management (MM), controlling session management (SM), or refers to non-signaling, non-control-plane information at protocol layers above the layer of the protocol for controlling radio resources (e.g., RRC), above the layer of the protocol for controlling mobility management (MM), above the layer of the protocol for controlling session management (SM), or above the layer of the protocol for controlling quality of service (QoS) flows (e.g., service data adaptation protocol (SDAP)). The data to which the UE and/or the RAN applies the techniques of this disclosure can include for example Internet of things (IoT) data, Ethernet traffic data, Internet traffic data, or a short message service (SMS) message. Further, as discussed below, the UE 102 in some implementations applies these techniques only if the size of the data is below a certain threshold value.

In the example scenarios discussed below, the UE 102 transitions to the RRC_INACTIVE or RRC_IDLE state, then selects a cell of the base station 104, and exchanges data with the base station 104 either via the base station 106 or with the base station 104 directly, without transitioning to RRC_CONNECTED state. As a more specific example, after the UE 102 determines that data is available for uplink transmission in the RRC_INACTIVE or RRC_IDLE state, the UE 102 can apply one or more security functions to the UL data packet, generate a first UL protocol data unit (PDU) including the security-protected packet, include an uplink (UL) RRC message along with the first UL PDU in a second UL PDU, and transmit the second UL PDU to the RAN 105. The UE 102 includes a UE identity/identifier (ID) of the UE 102 in the UL RRC message. The RAN 105 can identify the UE 102 based on the UE ID. In some implementations, the UE ID can be an inactive Radio Network Temporary Identifier (I-RNTI) or a non-access stratum (NAS) ID. The NAS ID can be a S-Temporary Mobile Subscriber Identity (S-TMSI) or a Global Unique Temporary Identifier (GUTI).

The security function can include an integrity protection and/or encryption function. When integrity protection is enabled, the UE 102 can generate a message authentication code for integrity (MAC-I) to protect integrity of the data. Thus, the UE 102 in this case generates a security-protected packet including the data and the MAC-I. When encryption is enabled, the UE 102 can encrypt the data to obtain an encrypted packet, so that the security-protected packet includes encrypted data. When both integrity protection and encryption are enabled, the UE 102 can generate a MAC-I for protecting integrity of the data and encrypt the data along with the MAC-I to generate an encrypted packet and an encrypted MAC-I. The UE 102 then can transmit the security-protected packet to the RAN 105, while in the RRC_INACTIVE or RRC_IDLE state.

In some implementations, the data is an uplink (UL) service data unit (SDU) of the packet data convergence protocol (PDCP) or SDAP. The UE 102 applies the security function to the SDU and includes the secured SDU in a first UL PDU (e.g., a UL PDCP PDU). The UE 102 then includes the UL PDCP PDU in a second UL PDU such as a UL MAC PDU, which can be associated with the medium access control (MAC) layer. Thus, the UE 102 in these cases transmits the secured UL PDCP PDU in the UL MAC PDU. In some implementations, the UE 102 can include, in the UL MAC PDU, a UL RRC message. In other implementations, the UE 102 may not include a UL RRC message in the UL MAC PDU. In this case, the UE 102 may not include a UE ID of the UE 102 in the UL MAC PDU not including a UL RRC message. In yet other implementations, the UE 102 can include the UL PDCP PDU in a UL radio link control (RLC) PDU and then include the UL RLC PDU in the UL MAC PDU. In the case of including the UL RRC message in the UL MAC PDU, the UE 102 in some implementations generates an RRC MAC-I and includes the RRC MAC-I in the UL RRC message. For example, the RRC MAC-I is a resumeMAC-I field, as specified in 3GPP specification 38.331. In other implementations, the UE can obtain the RRC MAC-I from the UL RRC message with an integrity key (e.g., $K_{RRCint}$ key), an integrity protection algorithm, and other parameters COUNT (e.g., 32-bit, 64-bit or 128-bit value), BEARER (e.g., 5-bit value) and DIRECTION (e.g., 1-bit value).

In other implementations, the data is an uplink (UL) protocol data unit (SDU) of the NAS. The UE 102 applies the security function to the SDU and includes the secured SDU in a first UL PDU such as a NAS PDU, which can be associated with the NAS layer. For example, the NAS layer can be MM sublayer or SM sublayer of 5G, Evolved Packet System (EPS) or 6G. Then the UE 102 can include the UL NAS PDU in a second UL PDU such as a UL RRC message. Thus, the UE 102 in these cases transmits the (first) secured UL NAS PDU in the UL RRC message. In some implementations, the UE 102 can include the UL RRC message in a UL MAC PDU and transmits the UL MAC PDU to a base station (e.g., base station 104 or 106) via a cell (e.g., cell 124 or 126). In this case, the UE 102 may not include an RRC MAC-I in the UL RRC message. Alternatively, the UE 102 may include an RRC MAC-I as described above.

In some implementations, the UL RRC message described above can be a common control channel (CCCH) message, an RRC resume request message or an RRC early data request message. The UL RRC message can include a UE ID of the UE 102 as described above.

More generally, the UE 102 can secure the data using at least one of encryption and integrity protection, include the secured data as a security-protected packet in the first UL PDU, and transmit the first UL PDU to the RAN 105 in the second UL PDU.

In some scenarios and implementations, the base station 106 can retrieve the UE ID of the UE 102 from the UL RRC message and identify the base station 104 as the destination of the data in the first UL PDU, based to the determined UE ID. In one example implementation, the base station 106 retrieves the first UL PDU from the second UL PDU and transmits the first UL PDU to the base station 104. The base station 104 then retrieves the security-protected packet from the first UL PDU, applies one or two security functions to decrypt the data and/or check the integrity protection, and transmits the data to the CN 110 (e.g., SGW 112, UPF 162, MME 114 or AMF 164) or an edge server. More specifically, the base station 104 derives at least one security key from UE context information of the UE 102. Then the base station 104 retrieves the data from the security-protected packet by using the at least one security key and transmits the data to the CN 110 or edge server. When the security-protected packet is an encrypted packet, the base station 104 decrypts the encrypted packet to obtain the data by using the at least one security key (e.g., an (d)encryption key). If the security-protected packet is an integrity-protected packet, the integrity protected packet may include the data and the MAC-I. The base station 104 can verify whether the MAC-I is valid for the security-protected packet by using the at least one security key (e.g., an integrity key). When the base station 104 confirms that the MAC-I is valid, the base station 104 sends the data to the CN 110 or edge server. On the other hand, when the base station 104 determines the MAC-I is invalid, the base station 104 discards the security-protected packet. Further, if the security-protected packet is both encrypted and integrity-protected, the encrypted and integrity-protected packet may include the encrypted packet along with the encrypted MAC-I. The base station 104 in this case decrypts the encrypted packet and the encrypted MAC-I to obtain the data and the MAC-I. The base station 104 then determines whether the MAC-I is valid for the data. If the base station 104 determines that the MAC-I is valid, the base station 104 retrieves the data and forwards the data to the CN 110 or edge server. However, if the base station 104 determines that the MAC-I is invalid, the base station 104 discards the packet.

In another implementation, the base station 106 retrieves the security-protected packet from the first UL PDU. The base station 106 performs a retrieve UE context procedure with the base station 104 to obtain UE context information of the UE 102 from the base station 104. The base station 106 derives at least one security key from the UE context information. Then the base station 106 retrieves the data from the security-protected packet by using the at least one security key and transmits the data to the CN 110 (e.g., UPF 162) or an edge server. When the security-protected packet is an encrypted packet, the base station 106 decrypts the encrypted packet to obtain the data by using the at least one security key (e.g., an (d)encryption key). If the security-protected packet is an integrity-protected packet, the integrity protected packet may include the data and the MAC-I. The base station 106 can verify whether the MAC-I is valid for the security-protected packet by using the at least one security key (e.g., an integrity key). When the base station 106 confirms that the MAC-I is valid, the base station 106 sends the data to the CN 110. On the other hand, when the base station 106 determines the MAC-I is invalid, the base station 106 discards the security-protected packet. Further, if the security-protected packet is both encrypted and integrity-protected, the encrypted and integrity-protected packet may include the encrypted packet along with the encrypted MAC-I. The base station 106 in this case decrypts the encrypted packet and the encrypted MAC-I to obtain the data and the MAC-I. The base station 106 then determines whether the MAC-I is valid for the data. If the base station 106 determines that the MAC-I is valid, the base station 106 retrieves the data and forwards the data to the data CN 110. However, if the base station 106 determines that the MAC-I is invalid, the base station 106 discards the packet.

In other scenarios and implementations, the base station 104 can retrieve the UE ID of the UE 102 from the UL RRC message and identify that the base station 104 stores UE context information of the UE 102. Thus, the base station 104 retrieves the security-protected packet from the first UL PDU, retrieve the data from the security-protected packet and sends the data to the CN 110 or edge server as described above.

Further, the RAN 105 in some cases transmits data in the downlink (DL) direction to the UE 102 operating in the RRC_INACTIVE or RRC_IDLE state.

For example, when the base station 104 determines that data is available for downlink transmission to the UE 102 currently operating in the RRC_INACTIVE or RRC_IDLE state, the base station 104 can apply at least one security function to the data to generate a security-protected packet, generate a first DL PDU including the security-protected packet, and the first DL PDU in a second DL PDU. To secure the data, the base station 104 can apply the security function (e.g., integrity protection and/or encryption) to the data. More particularly, when integrity protection is enabled, the base station 104 generates a MAC-I for protecting integrity of the data, so that security-protected packet includes the data and the MAC-I. When encryption is enabled, the base station 104 encrypts the data to generate an encrypted packet, so that security-protected packet is an encrypted packet. Further, when both integrity protection and encryption are enabled, the base station 104 can generate a MAC-I for protecting integrity of the data and encrypt the data along with the MAC-I to generate an encrypted packet and an encrypted MAC-I. The base station 104 in some implementations generates a first DL PDU, such as a DL PDCP PDU, using the security-protected packet, includes the first DL PDU in a second DL PDU associated with the MAC layer for example (e.g., a DL MAC PDU), and transmits the second DL PDU to the UE 102 without first causing the UE 102 to transition from the RRC_INACTIVE or RRC_IDLE state to the RRC_CONNECTED state. In some implementations, the base station 104 includes the DL PDCP PDU in a DL RLC PDU, includes the DL RLC PDU in the DL MAC PDU and transmits the DL MAC PDU to the UE 102 without first causing the UE 102 to transition from the RRC_INACTIVE or RRC_IDLE state to the RRC_CONNECTED state.

In another implementation, the base station 104 transmits the first DL PDU to the base station 106, which then generates a second PDU (e.g., a DL MAC PDU) including the first DL PDU and transmits the second DL PDU to the UE 102 without first causing the UE 102 to transition from the RRC_INACTIVE or RRC_IDLE state to the RRC_CONNECTED state. In some implementations, the base station 106 generates a DL RLC PDU including the first DL PDU and includes the DL RLC PDU in the second DL PDU. In yet another implementation, the base station 104 includes the first DL PDU in a DL RLC PDU and transmits the DL RLC PDU to the base station 106, which then generate a second DL PDU (e.g. a DL MAC PDU) including the DL RLC PDU and transmits the second DL PDU to the UE 102.

In some implementations, the base station (i.e., the base station 104 or 106) generates a downlink control information (DCI) and a cyclic redundancy check (CRC) scrambled with an ID of the UE 102 to transmit the second DL PDU generated by the base station. In some implementations, the ID of the UE 102 can be a Radio Network Temporary Identifier (RNTI). For example, the RNTI can be a cell RNTI (C-RNTI), a temporary C-RNTI or an inactive C-RNTI. The base station transmits the DCI and scrambled CRC on a physical downlink control channel (PDCCH) to the UE 102 operating in the RRC_INACTIVE or RRC_IDLE state. The base station scrambles the CRC with the ID of the UE 102. In some implementations, the base station may assign the ID of the UE 102 to the UE 102 in a random access response that the base station transmits in a random access procedure with the UE 102 before transmitting the DCI and scrambled CRC. In other implementations, the base station may assign the ID of the UE 102 to the UE 102 in an RRC message (e.g., RRC release message or an RRC reconfiguration message) that the base station transmits to the UE 102 before transmitting the DCI and scrambled CRC, e.g., while the UE 102 was in the RRC_CONNECTED state.

The UE 102 operating in the RRC_INACTIVE or RRC_IDLE state can receive the DCI and scrambled CRC on the PDCCH. Then the UE 102 confirms that a physical downlink shared channel (PDSCH), including the second DL PDU, is addressed to the UE according to the ID of the UE 102, DCI and scrambled CRC. The UE 102 then can retrieve the data from the security-protected packet. If the security-protected packet is an encrypted packet, the UE 102 can decrypt the encrypted packet using the appropriate decryption function and the security key to obtain the data. If the security-protected packet is the integrity-protected packet including the data and the MAC-I, the UE 102 can determine whether the MAC-I is valid. If the UE 102 confirms that the MAC-I is valid, the UE 102 retrieves the data. If, however, the UE 102 determines that the MAC-I is invalid, the UE 102 discards the packet. Finally, when the security-protected packet is both encrypted and integrity-protected, with encrypted data and an encrypted MAC-I, the UE 102 can decrypt the encrypted packet and encrypted MAC-I to obtain the data and the MAC-I. The UE 102 then can verify that the MAC-I is valid for the data. If the UE 102 confirms that the MAC-I is valid, the UE 102 retrieves and processes the data. Otherwise, when the UE 102 determines that the MAC-I is invalid, the UE 102 discards the data.

The base station 104 is equipped with processing hardware 130 that can include one or more general-purpose processors (e.g., CPUs) and a non-transitory computer-readable memory storing instructions that the one or more general-purpose processors execute. Additionally or alternatively, the processing hardware 130 can include special-purpose processing units. The processing hardware 130 in an example implementation includes a Medium Access Control (MAC) controller 132 configured to perform a random access procedure with one or more user devices, receive uplink MAC protocol data units (PDUs) to one or more user devices, and transmit downlink MAC PDUs to one or more user devices. The processing hardware 130 can also include a Packet Data Convergence Protocol (PDCP) controller 134 configured to transmit DL PDCP PDUs in accordance with which the base station 104 can transmit data in the downlink direction, in some scenarios, and receive UL PDCP PDUs in accordance with which the base station 104 can receive data in the uplink direction, in other scenarios. The processing hardware further can include an RRC controller 136 to implement procedures and messaging at the RRC sublayer of the protocol communication stack. The processing hardware 130 in an example implementation includes an RRC inactive controller 138 configured to manage uplink and/or downlink communications with one or more UEs operating in the RRC_INACTIVE or RRC_IDLE state. The base station 106 can include generally similar components. In particular, components 142, 144, 146, and 148 can be similar to the components 132, 134, 136, and 138, respectively.

The UE 102 is equipped with processing hardware 150 that can include one or more general-purpose processors such as CPUs and non-transitory computer-readable memory storing machine-readable instructions executable on the one or more general-purpose processors, and/or special-purpose processing units. The processing hardware 150 in an example implementation includes an RRC inactive controller 158 configured to manage uplink and/or downlink communications when the UE 102 operates in the RRC_INACTIVE state. The processing hardware 150 in an example implementation includes a Medium Access Control (MAC) controller 152 configured to perform a random access procedure with a base station, transmit uplink MAC protocol data units (PDUs) to the base station, and receive downlink MAC PDUs from the base station. The processing hardware 150 can also include a PDCP controller 154 configured to transmit DL PDCP PDUs in accordance with which the base station 106 can transmit data in the downlink direction, in some scenarios, and receive UL PDCP PDUs in accordance with which the base station 106 can receive data in the uplink direction, in other scenarios. The processing hardware further can include an RRC controller 156 to implement procedures and messaging at the RRC sublayer of the protocol communication stack.

Figure 1B:
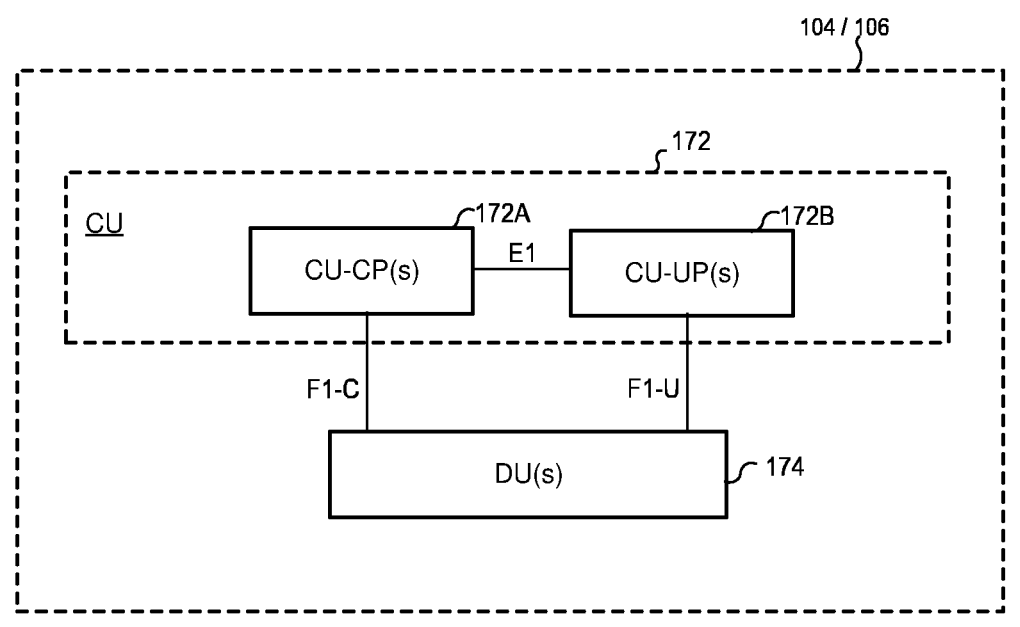
FIG. 1B is a block diagram of an example base station in which a centralized unit (CU) and a distributed unit (DU) that can operate in the system of FIG. 1A.

FIG. 1B depicts an example, distributed or disaggregated implementation of any one or more of the base stations 104, 106. In this implementation, the base station 104, 106 includes a central unit (CU) 172 and one or more DUs 174. The CU 172 includes processing hardware, such as one or more general-purpose processors (e.g., CPUs) and a computer-readable memory storing machine-readable instructions executable on the general-purpose processor(s), and/or special-purpose processing units. For example, the CU 172 can include a PDCP controller, an RRC controller and/or an RRC inactive controller such as PDCP controller 134, 144, RRC controller 136, 146 and/or RRC inactive controller 138, 148. In some implementations, the CU 172 can include a radio link control (RLC) controller configured to manage or control one or more RLC operations or procedures. In other implementations, the CU 172 does not include a RLC controller.

Each of the DUs 174 also includes processing hardware that can include one or more general-purpose processors (e.g., CPUs) and computer-readable memory storing machine-readable instructions executable on the one or more general-purpose processors, and/or special-purpose processing units. For example, the processing hardware can include a MAC controller (e.g., MAC controller 132, 142) configured to manage or control one or more MAC operations or procedures (e.g., a random access procedure), and/or a RLC controller configured to manage or control one or more RLC operations or procedures. The process hardware can also include a physical layer controller configured to manage or control one or more physical layer operations or procedures.

In some implementations, the CU 172 can include a logical node CU-CP 172A that hosts the control plane part of the PDCP protocol of the CU 172. The CU 172 can also include logical node(s) CU-UP 172B that hosts the user plane part of the PDCP protocol and/or Service Data Adaptation Protocol (SDAP) protocol of the CU 172. The CU-CP 172A can transmit control information (e.g., RRC messages, F1 application protocol messages), and the CU-UP 172B can transmit the data packets (e.g., SDAP PDUs or Internet Protocol packets).

The CU-CP 172A can be connected to multiple CU-UP 172B through the E1 interface. The CU-CP 172A selects the appropriate CU-UP 172B for the requested services for the UE 102. In some implementations, a single CU-UP 172B can be connected to multiple CU-CP 172A through the E1 interface. The CU-CP 172A can be connected to one or more DU 174s through an F1-C interface. The CU-UP 172B can be connected to one or more DU 174 through the F1-U interface under the control of the same CU-CP 172A. In some implementations, one DU 174 can be connected to multiple CU-UP 172B under the control of the same CU-CP 172A. In such implementations, the connectivity between a CU-UP 172B and a DU 174 is established by the CU-CP 172A using Bearer Context Management functions.

Figure 2:
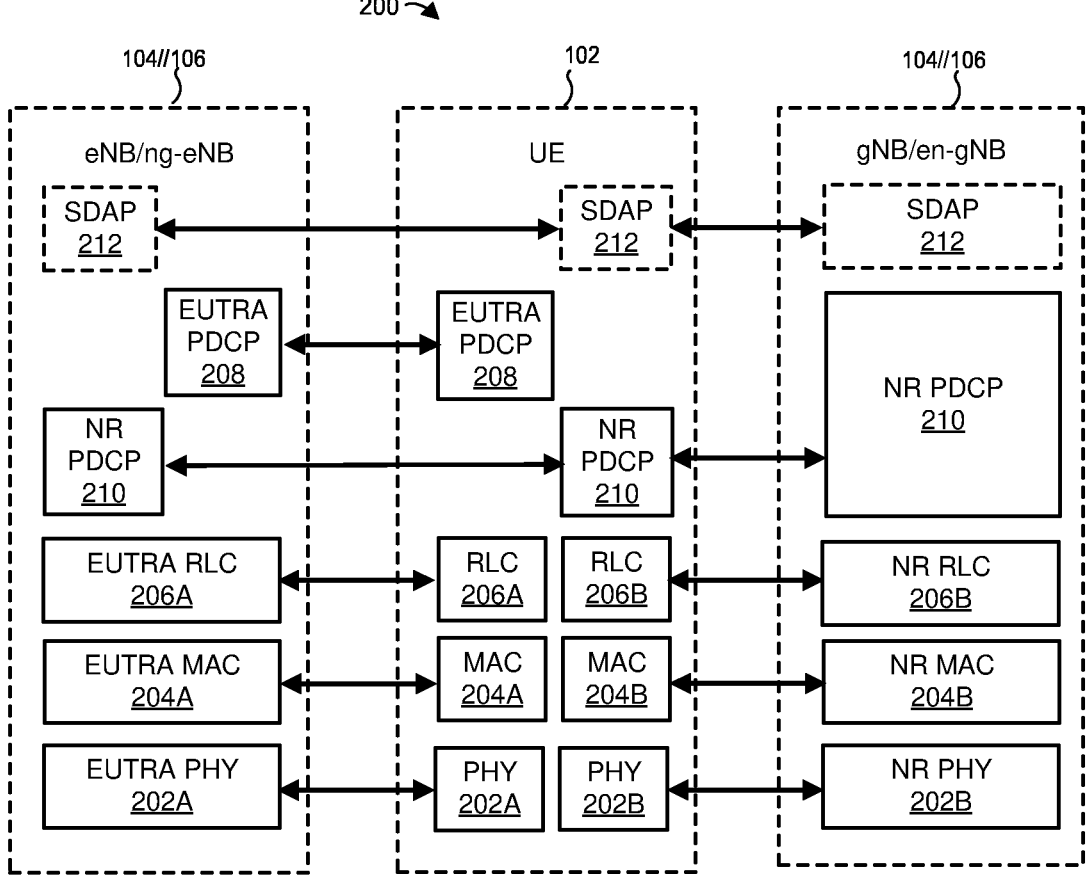
FIG. 2 is a block diagram of an example protocol stack according to which the UE of FIG. 1A communicates with base stations.

FIG. 2 illustrates, in a simplified manner, an example protocol stack 200 according to which the UE 102 can communicate with an eNB/ng-eNB or a gNB (e.g., one or more of the base stations 104, 106).

In the example stack 200, a physical layer (PHY) 202A of EUTRA provides transport channels to the EUTRA MAC sublayer 204A, which in turn provides logical channels to the EUTRA RLC sublayer 206A. The EUTRA RLC sublayer 206A in turn provides RLC channels to an EUTRA PDCP sublayer 208 and, in some cases, to a NR PDCP sublayer 210. Similarly, the NR PHY 202B provides transport channels to the NR MAC sublayer 204B, which in turn provides logical channels to the NR RLC sublayer 206B. The NR RLC sublayer 206B in turn provides data transfer services to the NR PDCP sublayer 210. The NR PDCP sublayer 210 in turn can provide data transfer services to Service Data Adaptation Protocol (SDAP) 212 or a radio resource control (RRC) sublayer (not shown in FIG. 2). The UE 102, in some implementations, supports both the EUTRA and the NR stack as shown in FIG. 2, to support handover between EUTRA and NR base stations and/or to support DC over EUTRA and NR interfaces. Further, as illustrated in FIG. 2, the UE 102 can support layering of NR PDCP 210 over EUTRA RLC 206A, and SDAP sublayer 212 over the NR PDCP sublayer 210.

The EUTRA PDCP sublayer 208 and the NR PDCP sublayer 210 receive packets (e.g., from an Internet Protocol (IP) layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets."

On a control plane, the EUTRA PDCP sublayer 208 and the NR PDCP sublayer 210 can provide signaling radio bearers (SRBs) or RRC sublayer (not shown in FIG. 2) to exchange RRC messages or non-access-stratum (NAS) messages, for example. On a user plane, the EUTRA PDCP sublayer 208 and the NR PDCP sublayer 210 can provide DRBs to support data exchange. Data exchanged on the NR PDCP sublayer 210 can be SDAP PDUs, Internet Protocol (IP) packets or Ethernet packets.

Next, several example scenarios that involve several components of FIG. 1A and relate to transmitting and/or receiving data in an inactive or idle state are discussed with reference to FIGS. 3-11. Generally speaking, events in FIGS. 3-11 that are similar are labeled with similar reference numbers (e.g., event 302 is similar to events 402, 502, 602, 702, 802, 902, 1002A, 1002B, 1102), with differences discussed below where appropriate. With the exception of the differences shown in the figures and discussed below, any of the alternative implementations discussed with respect to a particular event (e.g., for messaging and processing) may apply to events labeled with similar reference numbers in other figures. To simplify the following description, the "inactive state" can represent the RRC_INACTIVE or RRC_IDLE state, and the connected state can represent the RRC_CONNECTED state.

Figure 3:
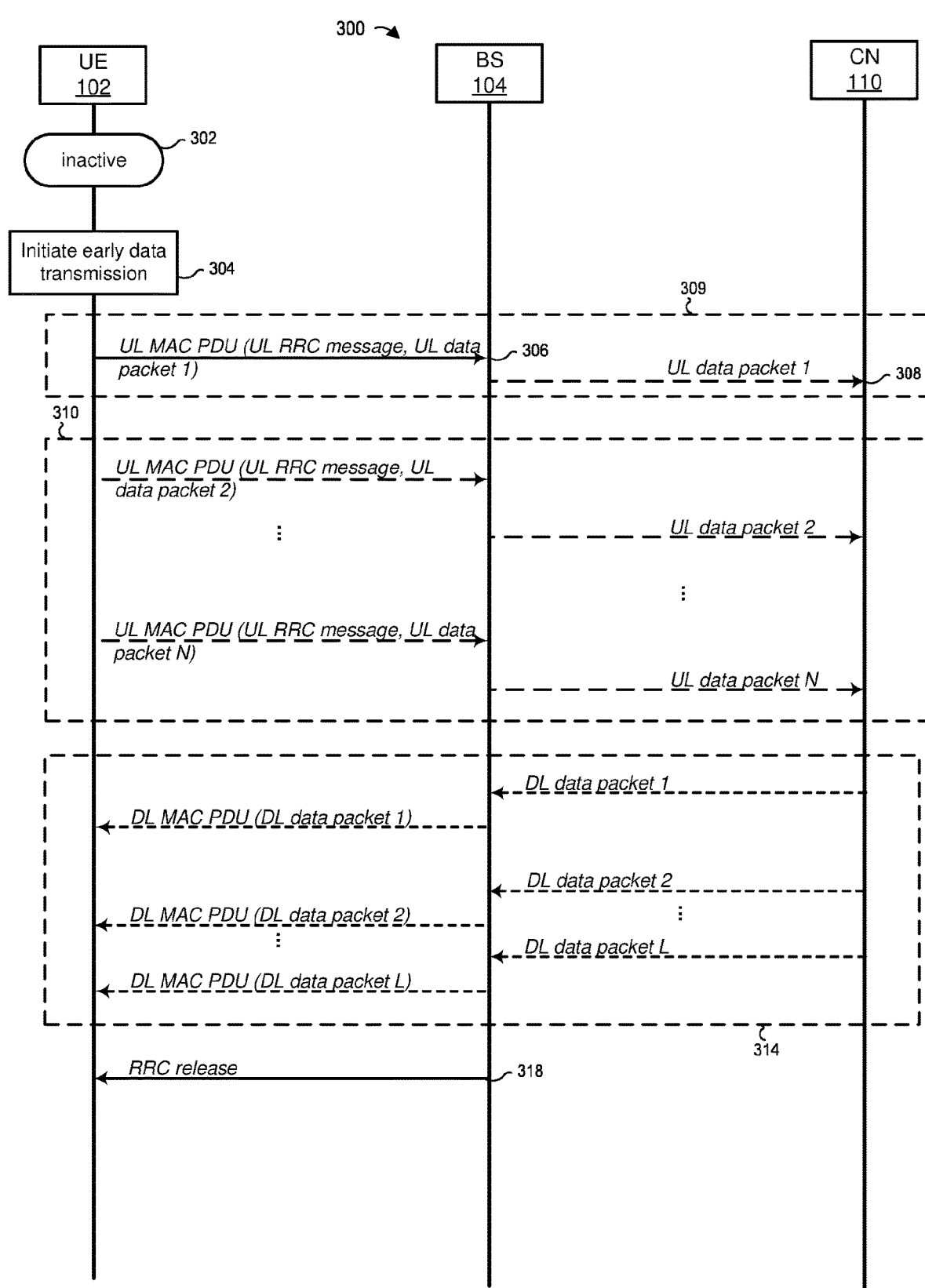
FIG. 3 is a messaging diagram of an example procedure for transmitting multiple data packets from a UE to a RAN when a radio connection between the UE and the RAN is inactive.

Referring first to FIG. 3, in a scenario 300, the UE 102 initially operates 302 in an inactivate state with the base station 104. Before the UE 102 operates 302 in the inactive state, the UE 102 was in a connected state with the RAN 105 (e.g., the base station 104, base station 106 or another base station not shown in FIG. 1A). After a certain period of data inactivity, the RAN 105 can determine that neither the RAN 105 nor the UE 102 has transmitted any data in the downlink direction or the uplink direction, respectively, during the certain period. In response to the determination, the RAN 105 can transmit a first RRC release message to the UE 102 and instruct the UE 102 to transition to the inactive state. The UE 102 transitions to the inactive state upon receiving the first RRC release message. The RAN 105 can assign an I-RNTI to the UE 102 and include the assigned value in the first RRC release message.

At a later time, the UE 102 in the inactive state initiates 304 early data transmission to transmit uplink data. The data in some example scenarios is an Internet Protocol (IP) packet, an Ethernet packet, or an application packet. In other scenarios, the data is an RRC PDU that includes an RRC message, a NAS message, an IP packet, and Ethernet packet, or an application packet. Still further, the data in some scenarios can be an RRC PDU including a NAS PDU, such that the NAD PDU includes an IP packet, an Ethernet packet, or an application packet.

The UE 102 in some implementations can determine at block 304 whether the data qualifies for transmission in the inactive state in view of one or more of such factors as whether the data is an IMS packet, whether the data is associated with a radio bearer not suitable or configured for early data transmission, whether the data is an NAS message for initiating a particular NAS procedure, the size of the data, etc. When the UE 102 determines that the data does not qualify for transmission in the inactive state, the UE 102 can utilize procedure 1060A of FIG. 10A for transmitting in the connected state (e.g., RRC_CONNECTED state).

In response to or after initiating data transmission, the UE 102 generates an initial MAC PDU, which includes a UL RRC message and a UL data packet 1, and transmits 306 the initial MAC PDU to the base station 104 on cell 124. The base station 104 retrieves the UL data packet 1 from the initial MAC PDU and sends 308 the UL data packet 1 to the CN 110 (e.g., SGW 112, UPF 162, MME 114 or AMF 164). Alternatively, the base station 104 can transmit the UL data packet 1 to an edge server instead of the CN 110. In some implementations, the edge server can operate within the RAN 105. The events 306 and 308 are collectively referred to in FIG. 3 as an initial UL data communication 309.

After transmitting the initial MAC PDU, the UE 102 can transmit 310 subsequent MAC PDU(s) where each include a particular UL RRC message and a particular UL data packet to the base station 104, which in turn transmits 310 the particular data packet to the CN 110. Alternatively, the base station 104 can transmit these UL data packets to an edge server instead of the CN 110. The subsequent MAC PDU(s) include (N–1) MAC PDU(s), where "N" is an integer and larger than 0 or 1 (i.e., a natural number larger than 1). The event 310 is referred to in FIG. 3 as further/ additional UL data communications.

After receiving 306 the uplink data packet 1 or transmitting 308 the UL data packet 1 to the CN 110 or edge server, the base station 104 can receive 314 one or more DL data packet(s) (e.g., 1, . . . , L packets and "L" is an integer and larger than 0 or 1 (i.e., a natural number larger than 1)) from the CN 110 or edge server and in turn transmits 314 the DL data packet(s) to the UE 102. For each DL data packet, the base station 104 generates a DL MAC PDU including the DL data packet and transmits 314 the DL MAC PDU to the UE 102. After determining no more data needs to be exchanged between the UE 102 and base station 104, the base station 104 transmits 318 a (second) RRC release message to the UE 102. Particularly, the base station 104 can transmit 318 to the UE 102 a DL MAC PDU including the second RRC release message. The UE 102 still stays in the inactive state from event 302 to event 318 and after receiving 318 the RRC release message. In some implementations, the base station 104 can transmit 314 the DL MAC PDU(s) to the UE 102 in parallel or alternating with receiving 310 the UL MAC PDU(s). In other implementations, the base station 104 can transmit 314 the DL MAC PDU(s) after receiving 310 the UL MAC PDU(s).

To transmit the uplink data packets at events 306 and 310, the UE 102 in some implementations applies at least one security function to each of the UL data packets (i.e. the UL data packet 1, UL data packet 2, . . . , UL data packet N) to generate a security-protected packet. The at least one security function can rely on a certain security algorithm and use one or more security keys, as discussed in more detail below. After applying the at least one security function, the UE 102 can include the security-protected packet in a first UL PDU, include the first UL PDU in a second UL PDU, which may be associated with a lower protocol layer than the first UL PDU, and transmit the second UL PDU to the base station 104 at event 306 or 310. In one example implementation, the RRC controller 156 generates the UL RRC message, the PDCP controller 154 includes the security-protected packet in a UL PDCP PDU (i.e., the first UL PDU), and the MAC controller 152 includes the UL RRC message and the UL PDCP PDU in a UL MAC PDU (i.e., the second UL PDU).

The one or more security keys the UE 102 utilizes can include an encryption key (or called ciphering key) and/or an integrity key, and the one or more security algorithms the UE 102 utilizes can include a ciphering algorithm and/or an integrity protection algorithm. In one implementation, the base station 104 can configure the ciphering algorithm and/or the integrity protection algorithm in the first RRC release message, described with reference to event 302. In another implementation, the base station 104 can configure the ciphering algorithm and/or the integrity protection algorithm in an RRC message (e.g., a SecurityModeCommand or RRC reconfiguration message) transmitted to the UE while the UE 102 was in the connected state. Accordingly, to apply a security function and the security key(s) to the UL data packets, the UE 102 can encrypt the UL data packets using the (same) encryption key and the (same) ciphering algorithm, and/or perform integrity protection on the UL data packets by using the (same) integrity key and the (same) integrity protection algorithm.

More particularly, when encryption is enabled and integrity protection is not enabled for the UE 102, the UE 102 encrypts the UL data packets to generate encrypted UL data packets using the (same) encryption key and the (same) ciphering algorithm. The security-protected packets in this case includes encrypted UL data packets. When encryption is not enabled but integrity protection is enabled for the UE 102, the UE 102 generates a MAC-I for each of the UL data packets using the (same) integrity key and the (same) integrity algorithm. Each of the security-protected packets in this case includes the particular UL data packet and the particular MAC-I. Further, when both integrity protection and encryption are enabled for the UE 102, the UE 102 generates a particular MAC-I for each of the UL data packets using the (same) integrity key and the (same) integrity protection algorithm, and also encrypts the particular UL data packet along with the particular MAC-I to generate a particular encrypted UL data packet and a particular encrypted MAC-I using the (same) encryption key and the (same) ciphering algorithm. The security-protected packet in this case includes the particular encrypted UL data packet and the particular encrypted MAC-I, and thus is both encrypted and integrity-protected.

In some implementations, the UE 102 also uses one or more parameters as an input to the at least one security function when applying one or more security functions to the UL data packets. These parameters can include a first radio bearer (RB) identity, a COUNT value associated with the UL data packets (when the data is a packet associated with a protocol that associates packets with respective counter), and/or a DIRECTION bit (e.g. 0 or 1) to indicate whether the UL data packets is traveling in the uplink direction (to the RAN 105) or in the downlink direction (from the RAN 105). In some implementations, these parameters can include an ID of the UE 102 (e.g., the I-RNTI). In one implementation, the UE 102 can use the ID of the UE 102 in either the integrity protection function or the encryption function, or both the integrity protection function and the encryption function.

With continued reference to FIG. 3A, the PDCP controller 134 or another suitable component of the base station 104 can retrieve the first UL PDU from the second UL PDU, retrieve the security-protected packet from the first UL PDU and obtain the UL data packet from the security-protected packet. To this end, the base station 104 can apply an inverse of the security function the UE 102 used to retrieve the UL data packet from the security-protected packet, as discussed below.

In some implementations, the UE 102 (e.g., an RLC controller of the UE 102 not shown in FIG. 1A) includes the first UL PDU in another, third UL PDU when transmitting 306, 310 the data to the base station 104. In one such implementation, the third UL PDU is an UL RLC PDU. Then the MAC controller 152 can include a MAC subheader and the third UL PDU in the second UL PDU, such that the MAC subheader is associated with the third UL PDU. To identify the third UL PDU, the MAC controller 152 of the UE 102 can include a particular logical channel identity (LCID) associated with a particular radio bearer (RB) in the MAC subheader. The base station 104 then can identify and retrieve the third UL PDU according to the MAC subheader and/or the particular LCID.

In other implementations, the UE 102 includes the first UL PDU directly in the second UL PDU. More particularly, the UE 102 can include a MAC subheader in the second UL PDU, such that the MAC subheader is associated with the first UL PDU. The UE 102 can include the particular LCID of the particular RB in the MAC subheader to identify the first UL PDU. The base station 104 then can identify and retrieve the first UL PDU according to the MAC subheader and/or the particular LCID.

In the examples above, the first UL PDU(s) or the UL data packet(s) can be associated with one or more RBs (i.e., the same RB or different RBs), one or more quality of service (QoS) flows (i.e., the same QoS flow or different QoS flows), or one or more PDU sessions (i.e., the same PDU session or different PDU sessions). In some implementations, the UE 102 receives one or more messages configuring the one or more RBs, QoS flows, or PDU sessions before event 302 and/or while the UE 102 was in the connected state. The message(s) can be RRC message(s) or NAS message(s), for example. The UE 102 can receive the message(s) from the RAN 105 (e.g., the base station 104, base station 106 or another base station) or from the CN 110 (e.g., AMF 164 or SMF 166 or MME 114) via the RAN 105. In one implementation, the RAN 105 includes one or more RB configurations (e.g., RadioBearerConfig, DRB-toAddMod or SRB-toAddMod information elements) for the one or more RBs in the RRC message(s). Each of the RB configuration(s) can include or configure a particular RB identity for a particular RB of the RB(s). In another implementation, a predefined RB identity (e.g., as a default value) can be specified in the corresponding standard for a particular RB of the RB(s). Further, in one implementation, the RRC message(s) can also include the particular LCID(s) for (each of) the RB(s). In another implementation, the particular LCID is a predefined or default LCID specified in the corresponding standard.

Regarding the RRC message, when the base station 104 is an eNB or ng-eNB, this message can be RRCConnectionReconfiguration, RRCConnectonResume, or RRCConnectionSetup. When the base station 104 is a gNB, the RRC message can be RRCReconfiguration, RRCResume, RRCReestablihsment, or RRCSetup. The RB(s) include SRB(s) or data RB(s).

When encryption is enabled but integrity protection is not enabled for the UE 102, the security-protected packet is an encrypted data that includes only the secured data. The base station 104 can decrypt the encrypted UL data packets to obtain the UL data packets using the (same) encryption key and the (same) ciphering algorithm (e.g., the inverse of the encryption function) the UE 102 used to encrypt the UL data packets. When encryption is not enabled but integrity protection is enabled for the UE 102, the security-protected packet can include the UL data packet along with the MAC-I. The base station 104 can verify the MAC-I for the UL data packet using the (same) integrity key and the (same) integrity algorithm that the UE 102 used to generate the MAC-I. After the base station 104 confirms that the MAC-I is valid to thereby ascertain that the security-protected packet has not been tampered with, the base station 104 retrieves the UL data packet. However, the base station 104 can discard the security-protected packet in response to determining that the MAC-I is invalid, and thus tampered with. Finally, when both encryption and integrity protection are enabled for the UE 102, the security-protected packet is a UL data packet that is both encrypted and integrity-protected, and includes encrypted UL data packet as well as the encrypted MAC-I. The base station 104 can decrypt the security-protected packet and the encrypted MAC-I to obtain the UL data packet and the MAC-I, by using the encryption key and the ciphering algorithm as discussed above. The base station 104 then can verify the MAC-I for the UL data packet using the (same) integrity key and (same) integrity algorithm. If the base station 104 confirms that the MAC-I is valid, the base station 104 obtains the data from the security-protected packet. Otherwise, if the base station 104 determines that the MAC-I is invalid, the base station 104 discards the security-protected packet because of possible tampering.

In some implementations, the base station 104 also uses one or more parameters to obtain the UL data packet from the security-protected packet, in addition to the one or more security keys and one or more security algorithms. The one or more parameters can include the first RB identity, the COUNT value associated with the data, and/or the DIRECTION bit, as discussed above. In general, the base station 104 can apply the same set of parameters as the UE 102 applied. In some implementations, these parameters can include an ID of the UE 102 (e.g., the I-RNTI). In one implementation, the UE 102 can use the ID of the UE 102 in either the integrity protection function or the encryption function, or both the integrity protection function and the encryption function.

As described above, the UL data packets (i.e. the UL data packet 1, UL data packet 2, . . . , UL data packet N) can be associated to the RB(s). The UE 102 (e.g., the PDCP controller 154) in the inactive state may maintain a state variable TX_NEXT for each of the RB(s). The TX_NEXT indicates the COUNT value of the next UL data packet to be transmitted as described below. For each of the UL data packets associated to an RB in the inactive state, the UE 102 in some implementations sets a COUNT value to the value of the TX_NEXT for the RB. In some implementations, the UE 102 can set or reset the TX_NEXT to an initial value such as zero before the event 304 or before transmitting the first UL packet at event 306. In other implementations, the UE 102 can set the first TX_NEXT counter to an initial value such as zero upon transitioning from the RRC_CONNECTED state to the inactive state.

For example, the UL data packets are associated to an RB and the UE 102 maintains a state variable TX_NEXT for the RB. After the UE 102 sets the COUNT value to the value of the TX_NEXT (e.g., Z) for transmission of the UL data packet 1, the UE 102 increments the value of the TX_NEXT by one (i.e., the value of the TX_NEXT is set to Z+1). The UE 102 sets the COUNT value for the UL data packet 2 to the value of the TX_NEXT (i.e., Z+1) and increments the value of the TX_NEXT by one (i.e., the value of the TX_NEXT is set to Z+2), . . . , and sets the COUNT value for the UL data packet N to the value of TX_NEXT (i.e., Z+L−1) and increments the value of the TX_NEXT by one (i.e., the value of the TX_NEXT is set to Z+L). The UE 102 retains the value of the TX_NEXT before receiving 318 a second RRC release message. "Z" is the initial value of the TX_NEXT, e.g., zero.

In some implementations, the base station 104 (e.g., the PDCP controller 134) may maintain state variables RX_NEXT and/or RX_DELIV for each of the RB(s), where the UL data packets are associated, to receive the UL data packets from the UE 102 operating in the inactivate state. The RX_NEXT indicates the COUNT value of the next UL data packet expected to be received, and the RX_DELIV indicates the COUNT value of the first UL data packet not delivered to the upper layers, but still waited for. The base station 104 can set or reset the RX_NEXT and/or the RX_DELIV to initial values such as zero in response to determining that the UE 102 should enter the inactive state, in response to transmitting the first RRC release message prior to the UE 102 entering the inactive state, before receiving the UL data packet 1 at event 306, or upon receiving the UL data packet 1 at event 306. After receiving a UL data packet associated to an RB at event 306 or 310, the base station 104 can increment the RX_NEXT for the RB by one and/or increment RX_DELIV for the RB by one. The base station 104 can use the RX_NEXT and/or the RX_DELIV to process the security-protected UL data packets associated to the RB, that base station 104 receives at events 306 and 310 as described below.

In some implementations, the base station 104 can set or reset the RX_NEXT and/or the RX_DELIV to initial values such as zero in response to transmitting the second RRC release message in similar ways as described above. Similarly, the UE 102 can set or reset the TX_NEXT to initial values such as zero after or in response to receiving the second RRC release message in similar ways as described above.

Generally speaking, to generate the security-protected packet, the UE 102 can generate and apply a new security key. For example, the base station 104 in some implementations includes a Next Hop Chaining Count value in the first RRC release message. The UE 102 and the base station 104 derive a new base station key, e.g., $K_{eNB}$, $K_{gNB}$ or $K_{NG-RAN}^*$, according to the Next Hop Chaining Count value. The base station 104 can identify the UE 102 according to UE information (e.g., the I-RNTI) received at event 306, so that the base station 104 can identify the Next Hop Chaining Count value assigned to the UE 102. The UE 102 and the base station 104 can derive the one or more security keys (for example, the encryption key and/or the integrity key) from the base station key. For example, the UE 102 and the base station 104 can derive the one or more security keys from the base station key and the at least one security algorithm (e.g., the ciphering algorithm and/or the integrity protection algorithm) in accordance with the techniques specified in 3GPP TS 33.501 or 33.401. If the Next Hop Chaining Count value is a new value which the UE 102 did not receive while operating in the connected state, the UE 102 and the base station 104 can derive the base station key from a Next Hop (NH) key.

If the UE 102 received the Next Hop Chaining Count value in the RRC_CONNECTED state prior to receiving the first RRC release message, the UE 102 and the base station 104 can derive the base station key from another, second base station key (i.e., the "old" base station key). The UE 102 and the base station 104 can use the second base station key to derive at least one second security key (e.g., a second encryption key and/or a second integrity key) e.g., as specified in 3GPP TS 33.501 or 33.401. The UE 102 and the base station 104 can use the at least one second security key to exchange data packets at events 306, 310, 314 as described above.

In the scenarios of this disclosure, the COUNT value associated with a data packet can include a Hyper Frame Number (HFN) and a PDCP sequence number (SN). For example, if the COUNT value has a length of 32 bits, the most significant bits (MSBs) (e.g., 14 bits) of the COUNT value are the HFN and the least significant bits (LSBs) (e.g., 18 bits) of the COUNT value are the PDCP SN. The TX_NEXT in the UE 102 and the RX_NEXT in the base station 104 are of the same length as the COUNT value. For each UL data packet, the UE 102 includes the PDCP SN in a PDCP header of a UL PDCP PDU including the UL data packet. The UE 102 sets the PDCP SN to the LSBs of the TX_NEXT. After assigning or associating the PDCP SN to the UL data packet, the UE 102 increments the TX_NEXT by one.

For example, the UL data packets at events 306 and 310 are associated to an RB configured. The UE 102 includes a first PDCP SN associated with the UL data packet 1 in a header of the UL PDCP PDU 1 that the UE 102 transmits at event 306. The UE 102 sets the first PDCP SN (i.e., zero) to the LSBs of the TX_NEXT after the UE 102 (re)sets the TX_NEXT to the initial value (e.g., zero). The UE 102 increments the TX_NEXT by one after setting the first PDCP SN. The UE 102 sets the COUNT value for the UL data packet 1 to the TX_NEXT (i.e., zero). The UE 102 performs the security function(s) on the UL data packet 1 with the COUNT value to obtain the security-protected packet 1 as described above and transmits 306 to the base station 104 the initial MAC PDU including the security-protected packet 1. As described above, the base station 104 (re)sets the RX_NEXT to the initial value (e.g., zero). After receiving 306 the UL PDCP PDU 1 from the UE 102, the base station 104 can generate a COUNT value where the MSBs of the COUNT value are equal to the MSBs of the RX_NEXT, and the LSBs of the COUNT value are equal to the first PDCP SN (i.e., zero). Alternatively, the LSBs of the COUNT value can be equal to the LSBs of the RX_NEXT. Therefore, the COUNT value the base station 104 generates is the same as the COUNT value the UE 102 uses for the security-protected packet 1. The base station 104 can increment the RX_NEXT by one (i.e., the RX_NEXT is set to one) after processing the UL PDCP PDU 1.

The UE 102 includes a second PDCP SN associated with the UL data packet 2 in a header of the UL PDCP PDU 2 that the UE 102 transmits at event 310. The UE 102 sets the second PDCP SN (i.e., one) to the LSBs of the TX_NEXT (i.e., one) and sets the COUNT value for the UL data packet 1 to the TX_NEXT (i.e., one). The UE 102 increments the TX_NEXT by one (i.e., the TX_NEXT is set to two) after setting the second PDCP SN. The UE 102 performs the security function(s) on the UL data packet 2 with the COUNT value to obtain the security-protected packet 2 as described above and transmits 310 to the base station 104 the subsequent MAC PDU including the security-protected packet 2. After receiving 310 the UL PDCP PDU 2 from the UE 102, the base station 104 can generate a COUNT value where the MSBs of the COUNT value are equal to the MSBs of the RX_NEXT, and the LSBs of the COUNT value are equal to the first PDCP SN (i.e., one). Alternatively, the LSBs of the COUNT value can be equal to the LSBs of the RX_NEXT. Therefore, the COUNT value the base station 104 generates is the same as the COUNT value the UE 102 uses for the security-protected packet 2. The base station 104 can increment the RX_NEXT by one (i.e., the RX_NEXT is set to two) after processing the UL PDCP PDU 2. For other UL data packet(s) at event 310 (i.e., the UL data packet 3 . . . UL data packet N (if N>2)), the UE 102 and base station 104 perform similar actions as described above, to transmit and receive 310 the other UL data packet(s), respectively.

In some scenarios and implementations, the base station 104 may receive 310 from the UE 102 the UL PDCP PDU 3 including the third PDCP SN (i.e., two) and the UL data packet 3 and does receive the UL PDCP PDU 2. In this case, the base station 104 sets the RX_DELIV to two. More generally, if the base station 104 receives 306, 310 UL PDCP PDU(s) 1, 2, . . . T, T+S, wherein S is an integer larger than 1, the base station 104 sets the RX_DELIV to (T+S−1).

In some implementations, the UE 102 generates an RRC MAC-I and includes the RRC MAC-I in the UL RRC message. In one implementation, the UL RRC message in each UL MAC PDU at events 306 and 310 can be identical. For example, the UL RRC message is an RRCResumeRequest message and the RRC MAC-I may be in a format of an RRC information element (IE) such as a resumeMAC-I field. The UE 102 in these cases sets the resumeMAC-I to the 16 LSBs of a MAC-I. The VarResumeMAC-Input speci-fies in the input for generating the MAC-I and is ASN.1-encoded as a sequence of fields of types sourcePhysCellId, targetCellIdentity, and source-c-RNTI. In particular, the value of sourcePhysCellId is set to a physical cell identity (PCI) of a primary cell (PCell) to which the UE 102 was connected prior to entering the inactive state, e.g., the cell of a previously connected base station where the UE 102 receives the first RRC release message. The value of source-c-RNTI is set to a C-RNTI that the UE 102 had in the PCell to which it was connected prior to entering the inactive state, i.e., the C-RNTI assigned by the base station 104 to the UE 102. The value of targetCellIdentity is set to a cellIdentity of the first PLMN-Identity included in a PLMN-IdentityInfo-List broadcast in a SIB1 of a cell of the base station 104, i.e. the cell (i.e., cell 124) in which the UE 102 transmit 306 the UL MAC PDU. The UE 102 calculates these bits with the "old" integrity key and the "old" integrity protection algo-rithm that the UE 102 most recently used in the RRC_CO-NNECTED state or inactive state before event 302, and with all input bits for COUNT, BEARER, and DIRECTION set to binary ones.

In another implementation, the UL RRC message in each MAC PDU at event 306 and at event 310 can be the same RRC message (e.g., RRCResumeRequest message) with different contents. For example, the UE 102 includes the RRC MAC-I in the UL RRC message at event 306 as described above. Then the UE 102 includes a different RRC MAC-I in each UL RRC message at event 310. the RRC MAC-I in each UL RRC message at event 310 is in a format of a resumeMAC-I field in the UL RRC message. For each UL RRC message, the UE 102 sets the resumeMAC-I to the 16 LSBs of a MAC-I that the UE 102 generates with the VarResumeMAC-Input and the UL data packet included with the UL RRC message. The UL data packet can be a security-protected packet as described above or a packet where the UE 102 has not performed the security function(s).

In other implementations, the UL RRC message transmit-ted at event 306 is a CCCH message and the UL RRC messages transmitted at event 310 are Dedicated Control Channel (DCCH) messages which can be the same or different. In yet other implementations, the UL RRC mes-sage transmitted at event 306 is a first CCCH message and the UL RRC messages transmitted at event 310 are second CCCH messages.

In some implementations, the UE 102 in the inactive state can perform a random access procedure with the base station 104 to transmit the UL data packet 1 at event 306. For example, the random access procedure can be a four-step random access procedure or a two-step random access procedure. In the case of the four-step random access procedure, the UE 102 transmits a random access preamble to the base station 104 and in response, the base station 104 transmits to the UE 102 a random access response (RAR) including an uplink grant, and the UE 102 transmit 306 the UL MAC PDU in accordance with the uplink grant. The base station 104 receives 306 the UL MAC PDU in accor-dance with the uplink grant in the RAR. In the case of the two-step random access procedure, the UE 102 transmits 306 to the base station 104 a message A including a random access preamble and the UL MAC PDU in accordance with two-step random access configuration parameters. The UE 102 receives the two-step random access configuration parameters in system information broadcast by the base station 104 on cell 124 before transmitting 306 the UL MAC PDU. The base station 104 receives 306 the UL MAC PDU in accordance with the two-step random access configura-tion parameters. In other implementations, the UE 102 can transmit 306 the UL MAC PDU on radio resources config-ured in a preconfigured uplink grant (PUR) configuration. The base station 104 can include the PUR configuration to the UE 102 in the first RRC release message. Thus, the base station 104 receives 306 the UL MAC PDU on the radio resources.

After receiving 306 the UL MAC PDU or identifying the UE 102 in accordance with the UE ID in the UL RRC message 306, the base station 104 can transmit to the UE 102 one or more DCI on PDCCH(s). The base station 104 includes configuration parameters in each of the DCI(s) for the UE 102 to transmit 310 UL MAC PDU(s). Thus, the UE 102 does not (need to) perform other random access proce-dure(s) to transmit 310 UL MAC PDU(s). On the PDCCH(s), the base station 104 transmits each of the DCI(s) with a CRC scrambled with an ID of the UE 102. The base station 104 can derive the CRC from the DCI. In some implementations, the ID of the UE 102 can be a Radio Network Temporary Identifier (RNTI). For example, the RNTI can be a cell RNTI (C-RNTI), a temporary C-RNTI or an inactive C-RNTI. The UE 102 uses the ID to monitor the PDCCH(s) to receive the DCI(s). The configuration parameters can include new data indicator (NDI), hybrid automatic repeat request (HARQ) process number, redun-dancy version, frequency domain resource assignment, time domain resource assignment, etc. The UE 102 transmits 310 the UL MAC PDU in accordance with the configuration parameters. In other implementations, the UE 102 can transmit 310 the UL MAC PDU on radio resources config-ured in a PUR configuration. Thus, the base station 104 receives 310 the UL MAC PDU on the radio resources.

After receiving 306 the UL MAC PDU, identifying the UE 102 in accordance with the UE ID in the UL RRC message 306, or receiving the DL data packet 1, the base station 104 can transmit to the UE 102 one or more DCI on PDCCH(s). The base station 104 includes configuration parameters in each of the DCI(s) for the UE 102 to receive 314 DL MAC PDU(s), and receive 318 the RRC release message. On the PDCCH(s), the base station 104 transmits each of the DCI(s) with a CRC scrambled with the ID of the UE 102. The base station 104 can derive the CRC from the DCI. The UE 102 uses the ID to monitor the PDCCH(s) to receive the DCI(s). The configuration parameters can include new data indicator (NDI), hybrid automatic repeat request (HARQ) process number, redundancy version, frequency domain resource assignment, time domain resource assignment, etc. The UE 102 receives 314 the DL MAC PDU and/or 318 the RRC release message in accordance with the configuration parameters.

In some implementations, the base station 104 does not include a DL RRC message in the DL MAC PDU(s) at event 314 to respond to the UL RRC message at event 306 and/or 310. For example, the base station 104 does not include a RRCResume message in the DL MAC PDU(s) at event 314 to respond to the RRCResumeRequest message at event 306. In some implementations, the base station 104 can include a DL data packet in the RRC release message at event 318. In some implementations, if the base station only has a single DL data packet (e.g., the DL data packet 1), the base station 104 can include the DL data packet 1 in the RRC release message at event 318. In other implementations, the base station 104 can transmit 318 to the UE 102 a DL MAC PDU including the RRC release message and a DL data packet. In yet other implementations, the base station 104 neither includes a DL data packet in the RRC release message nor includes a DL data packet in the DL MAC PDU including the RRC release message at event 318.

In some implementations, the base station 104 applies one or more security functions to each of the DL data packet(s) at events 314 and/or 318 in similar ways as described for the UE 102 applying the security function(s) to each of the UL data packet(s) at events 306 and 310. Therefore, the above description for the UE 102 applying the security function(s) can apply to the base station 104 by replacing "the UE 102" and "UL" with "the base station 104" and "DL" respectively. In some implementations, the base station 104 uses a value (e.g., 1) for the DIRECTION bit, which is different from the value that the UE 102 uses in the one or more security functions.

To transmit 318 the RRC release message or a DL RRC message (e.g., the DL RRC message at event 1034B of FIG. 10B), the base station 104 in some implementations applies one or more security functions (e.g., encryption and/or integrity protection) to the RRC release message or DL RRC message in similar ways as described for the UE 102 applying the security function(s) to a UL data packet at event 306 or 310. Therefore, the above description for the UE 102 applying the security function(s) can apply to the base station 104 by replacing "UL data packet", "the UE 102" and "UL" with "the RRC release message or DL RRC message", "the base station 104" and "DL" respectively. More particularly, the base station 104 derives RRC security key(s) for applying the security function(s) to the RRC release message or DL RRC message in similar ways as described for the UE 102 deriving the security key(s) for transmitting the UL data packets at events 306 and 310. The UE 102 also derives the (same) RRC security key(s) as the base station 104 in similar ways as described for the UE 102 deriving and transmitting the UL data packets at events 306 and 310. In some implementations, the UE 102 derives the RRC security key(s) after receiving the first RRC release message, before receiving 318 the RRC release message, or before, during, or after event 304 or 306. The UE 102 applies the security function(s) (e.g., decryption and/or integrity check) with the RRC security key(s) to the received security-protected RRC release message to obtain the original RRC release message in similar ways as described for the base station 104 applying the security function(s) with the security key(s) to the security protected packet received at events 306 or 310.

In some implementations, the UE 102 does not use the RRC security key(s) to secure the UL RRC message transmitted at event 306. In some implementations, the UE 102 does not use the RRC security key(s) to secure the UL RRC messages transmitted at event 310. Alternatively, the UE 102 uses the RRC security key(s) to secure the UL RRC messages transmitted at event 310 in similar ways as described for the UE 102 securing the UL data packets transmitted at events 306 or 310. In these alternative implementations, the base station 104 uses the RRC security key(s) to apply the security function(s) (e.g., decryption and/or integrity check) to the UL RRC messages received at event 310 to obtain the original UL RRC messages in similar ways as described for the base station 104 applying the security function(s) to the UL data packets.

In some implementations, the base station 104 uses a TX_NEXT to transmit the DL data packet(s) at event 310 to the UE 102 in similar ways as described for the UE 102 using the TX_NEXT to transmit the UL data packet(s) at events 306 and 310. Therefore, the above description for the UE 102 transmitting the UL data packet(s) at events 306 and 310 can apply to the base station 104 transmitting the DL data packet(s) at event 314 by replacing "the UE 102" and "UL" with "the base station 104" and "DL" respectively. In some implementations, the UE 102 uses a RX_NEXT and/or a RX_DELIV to receive the DL data packet(s) at event 314 in similar ways as described for the base station 104 using the RX_NEXT to receive the UL data packet(s) at events 306 and 310. Therefore, the above description for the base station 104 receiving the DL data packet(s) at events 306 and 310 can apply to the UE 102 receiving the DL data packet(s) at event 314 by replacing "the base station 104" and "UL" with "the UE 102" and "DL" respectively.

In some implementations, the UE 102 may start a first timer in response to initiating 304 data transmission or transmitting 306 the UL RRC message. If the UE 102 fails to transmit 306 the UL data packet 1 and the first timer expires, the UE 102 stops the early data transmission. If the UE 102 successfully transmits 306 the MAC PDU during the first timer running, the UE 102 can stop the first timer.

In some implementations, if the UE 102 successfully transmits 306 the MAC PDU, the UE 102 may start a second timer. Alternatively, the UE 102 may start the second timer in response to transmitting the UL data packet 2. If the second timer expires, the UE 102 stops the early data transmission. If the UE 102 receives 318 the RRC release message during the second timer running, the UE 102 stops the second timer and the early data transmission.

In other implementations, if the UE 102 successfully transmits the UL data packet X (i.e., X=one of 1, 2, ..., N) at event 306 or 310, the UE 102 can start or restart the first timer. In this case, the UE 102 does not start another timer (i.e., the second timer described above). If the UE 102 fails to transmit 310 the UL data packet X and the first timer expires, the UE 102 stops initiating the early data transmission. If the UE 102 receives 318 the RRC release message during the first timer running, the UE 102 stops the first timer and the early data transmission.

In yet other implementations, the UE 102 may start a first timer in response to initiating 304 data transmission or transmitting 306 the UL RRC message. If the UE 102 receives 318 the RRC release message during the first timer running, the UE 102 can stop the first timer. If the first timer expires during the event 310, the UE 102 stops the early data transmission. In these implementations, the UE 102 refrains from restarting the first timer and starting another timer (e.g., the second timer) in response to transmitting the UL RRC message at event 310.

In some implementations, the UE 102 may communicate the data packets with the base station 104 via cell 124 at events 306, 310 and 314. In some cases, the UE 102 (re)selects a different cell than cell 124 during the event 310 or 314. In response to (re)selecting the different cell, the UE 102 in some implementations can stop the early data transmission and stop the first timer and/or the second timer. In other implementations, the UE 102 may continue the early data transmission after (re)selecting the different cell. In yet other implementations, the UE 102 may determine to stop or continue the early data transmission in accordance with one or more conditions, after or in response to (re)selecting the different cell. For example, the RAN 105 can transmit to the UE 102 an RRC message including a cell list indicate cell(s) that the UE 102 can continue early data transmission. The UE 102 receives the RRC message from the RAN 105 before event 306. For example, the RRC message can be the first RRC release message or a system information (e.g., a system information block) broadcast on the cell 124 by the base station 104. If the different cell and cell 124 are in the cell list, the UE 102 can continue the early data transmission on the different cell. If the different cell or cell 124 is not in the cell list, the UE 102 stops the early data transmission.

In some implementations, the first timer can be a timer T319 and the second timer can be a new timer specified in 3GPP specification 38.331. Alternatively, the first timer can be a new timer specified in 3GPP specification 38.331. In some implementations, the base station 104 can broadcast system information (e.g., one or more system information blocks (SIBs)) including timer value(s) for the first timer and/or second timer on cell(s) (e.g., cell 124) operated by the base station 104. Thus, the UE 102 can receive the system information before transmitting 306 the MAC PDU or while operating 302 in the inactive state. For example, the SIB is a SIB1. In another example, the SIB(s) include a first SIB (e.g., SIB1) and a second SIB. The first SIB includes a timer value for the first timer and the second SIB includes a timer value for the second timer. In other implementations, the UE 102 can use preconfigured or predetermined timer value(s) for the first timer and/or second timer.

After stopping the early data transmission, if the UE 102 has not successfully transmitted all the UL data packet(s), the UE 102 may initiate an RRC connection setup procedure to establish an RRC connection with the base station 104 to transmit a NAS message (e.g., a 5GMM message, a 5GSM message, an EMM message, an ESM message, or a Service Request message). In the RRC connection setup procedure, the UE 102 transmits an RRC setup request message (e.g., RRCSetupRequest message) to the base station 104. In response, the base station 104 transmits an RRC setup message (e.g., RRCSetup message) to the UE 102. In response to the RRC setup message, the UE 102 transitions to a connected state (e.g., RRC_CONNECTED state) and transmits an RRC setup complete message (e.g., RR CSetupComplete message) to the base station 104. The UE 102 can include the NAS message in the RRC setup complete message or transmit the NAS message to the base station 104 after transmitting the RRC setup complete message. In turn, the base station 104 sends the NAS message to the CN 110 (e.g., AMF 164). After establishing the RRC connection, the base station 104 can send a security mode command message (e.g., SecurityModeCommand message) to the UE 102 to activate security protection. In response, the UE 102 transmits a security mode complete message (e.g., SecurityModeComplete message) to the base station 104. After activating security protection, the base station 104 can transmit to the UE 102 an RRC reconfiguration message (e.g., RRCReconfiguration message) including a DRB configuration to configure a DRB. In response, the UE 102 transmits an RRC reconfiguration complete message (e.g., RRCReconfigurationComplete message) to the base station 104. The UE 102 communicate UL data packets (e.g., the remainder of the UL data packets and/or other UL data packets) and/or DL data packets on the DRB with the base station 104. In some implementations, the base station 104 can include RLC configuration parameters, MAC configuration parameters and/or physical layer configuration parameters in the RRC reconfiguration message. The UE 102 and base station 104 can use these configuration parameters to communicate with one another.

In some implementations, the UE 102 in the inactive state 302 may receive from the base station 104 a paging message for mobile terminating early data transmission (i.e., downlink early data transmission). In response to the paging message, the UE 102 can transmit to the base station 104 a UL MAC PDU including a UL RRC message but not including a UL data packet, similar to event 306. After transmitting the UL MAC PDU, the UE 102 does not transmit a data packet to the base station 104 which contrasts with event 308. After receiving the UL RRC message and verifying or validating a MAC-I in the UL RRC message, the base station 104 transmits DL MAC PDU(s) and an RRC release message to the UE 102, similar to events 314 and 318 respectively. Thus event 310 can be skipped for mobile terminating early data transmission. In some implementations, the paging message can include a cause value indicating the mobile terminating early data transmission. If the UE 102 has UL data to transmit while receiving the DL MAC PDU(s) (i.e., performing DL data communication like event 314), the UE 102 in some implementations transmits the UL data, e.g., in similar ways as described above, after receiving the RRC release message from the base station 104.

Figure 4:
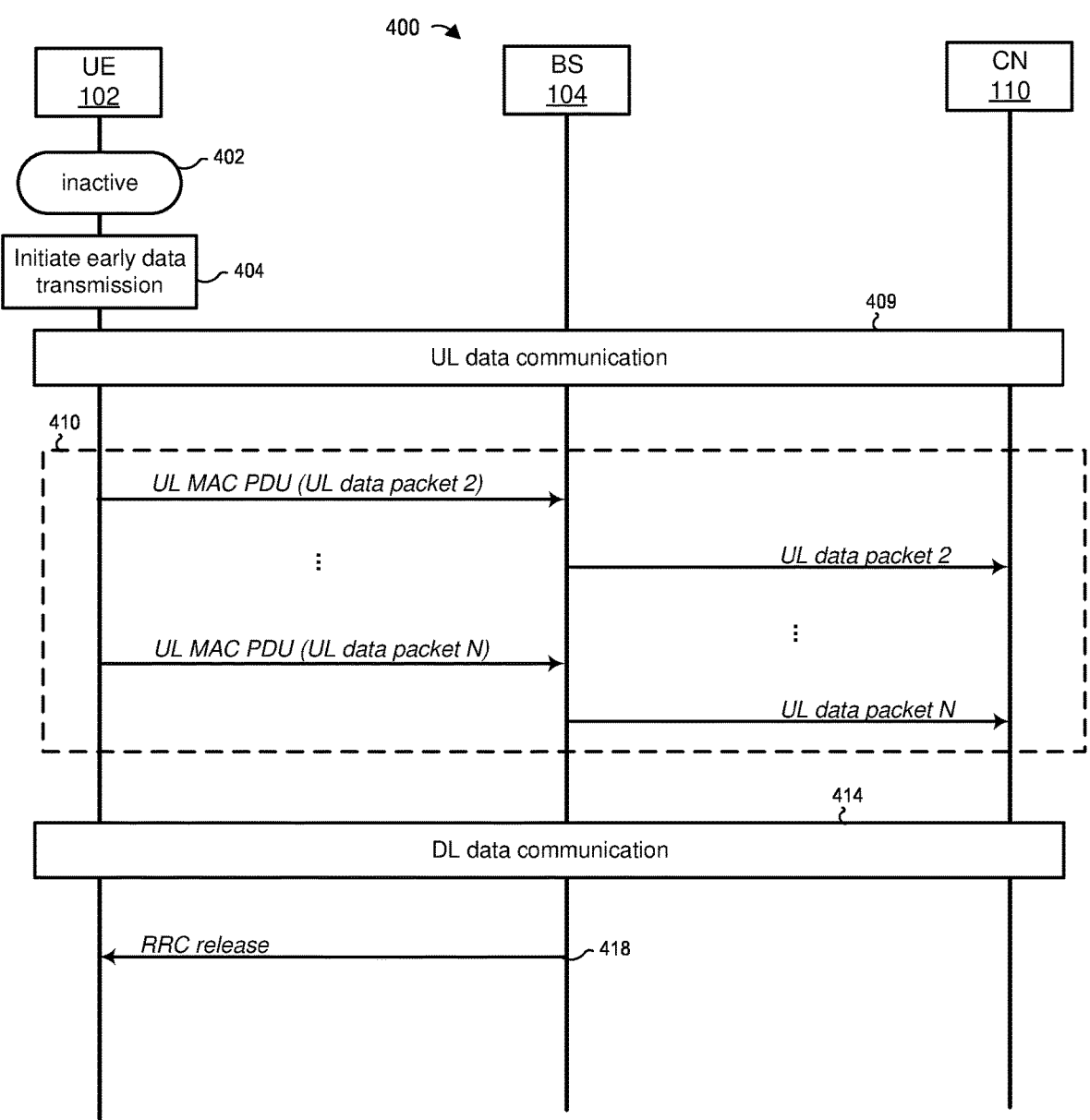
FIG. 4 is a messaging diagram of another example procedure for transmitting multiple data packets from a UE to a RAN when a radio connection between the UE and the RAN is inactive.

Referring next to FIG. 4, in a scenario 400, which is generally similar to the scenario 300, the events 402, 404, 409, 410, 414 and 418 are similar to the events 302, 304, 309, 310, 314 and 318, respectively. However, the UE 102 does not include a UL RRC message in each of the UL MAC PDU(s) at event 410.

Figure 5:
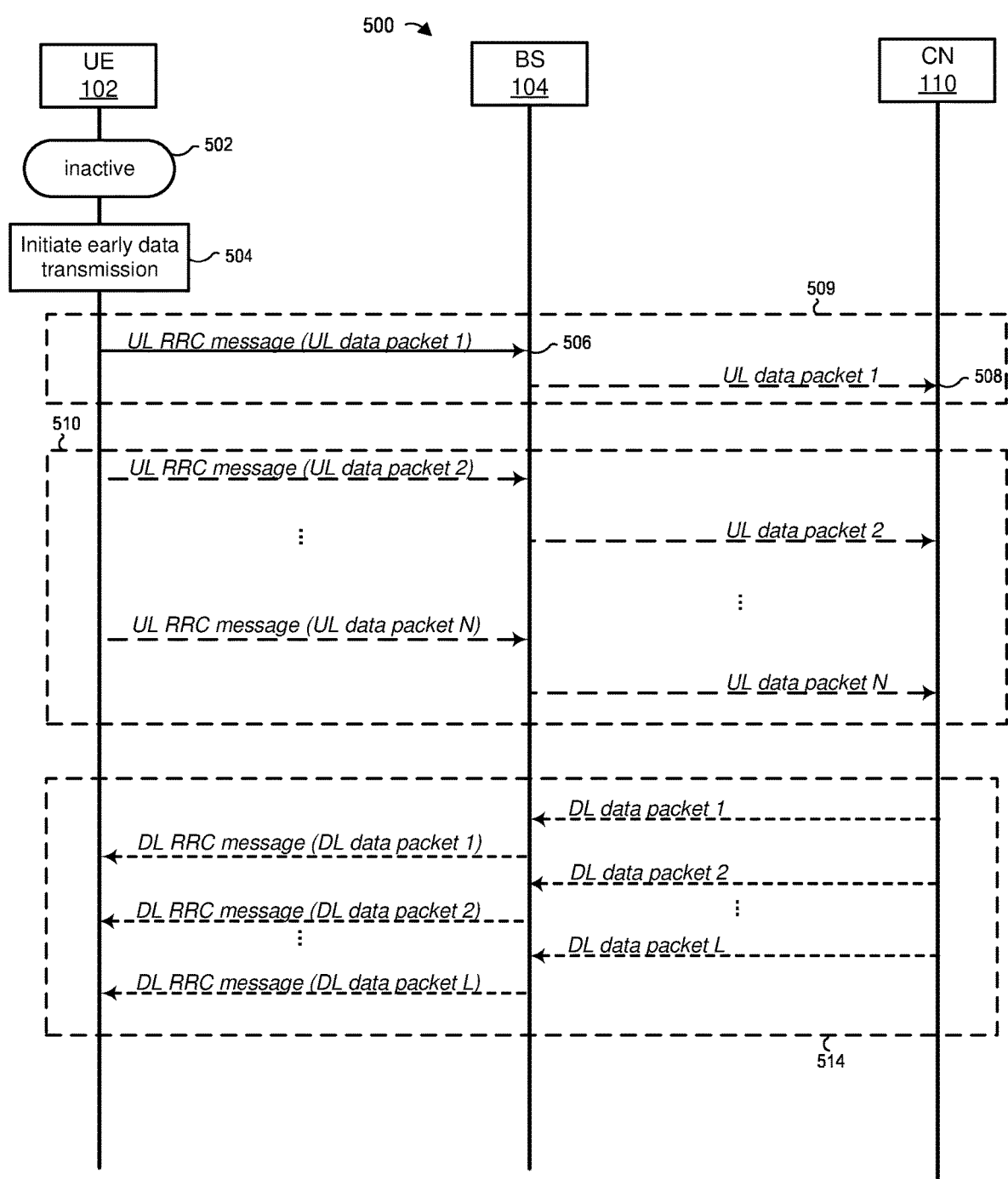
FIG. 5 is a messaging diagram of yet another example procedure for transmitting multiple data packets from a UE to a RAN when a radio connection between the UE and the RAN is inactive.

Referring next to FIG. 5, in a scenario 500, which is generally an early data communication scenario similar to the scenario 300, the events 502, 504, 506, 508, 510 and 514 are similar to the events 302, 304, 306, 308, 310 and 314, respectively. However, the UE 102 includes the UL data packet 1, UL data packet 2, . . . , UL data packet N in the N UL RRC messages respectively and includes the N UL RRC messages in N UL MAC PDUs respectively and transmits the N UL MAC PDUs to the base station 104. In some implementations, the UL RRC messages can be CCCH messages. In some implementations, the UL RRC message including the UL data packet 1 is an RRC early data transmission request message (e.g., RRCEarlyDataRequest message). In this case, the UE 102 may indicate that the UE 102 has more data to transmit in the UL RRC message including the UL data packet 1. In other implementations, the UL RRC messages including UL data packet 2, . . . , UL data packet N are RRC uplink early data transmission messages. In other implementations, the UL RRC message transmitted at event 306 is a CCCH message and the UL RRC messages transmitted at event 310 are DCCH messages which can be the same or different. In yet other implementations, the UL RRC message transmitted at event 306 is a first CCCH message and the UL RRC messages transmitted at event 310 are second CCCH messages.

In some implementations, the base station 104 includes the DL data packet 1, DL data packet 2, . . . , DL data packet L in L DL RRC messages respectively and includes the L DL RRC messages in L DL MAC PDUs respectively. In some implementations, the DL RRC messages can be CCCH messages or DCCH messages. In other implementations, the DL RRC messages including DL data packet 1, . . . , DL data packet (L–1) are RRC downlink early data messages and the DL RRC message including the DL data packet L is an RRC early data transmission complete message (e.g., DL RRCEarlyDataComplete message). In some implementations, the base station 104 may not include a DL data packet in the last DL RRC message. After receiving the last DL RRC message, the UE 102 stops the early data communication with the base station 104. If the UE 102 has new UL data packet(s) to transmit after receiving the last DL RRC message, the UE 102 initiates another early data transmission and transmits the new UL data packet(s) like events 506 and/or 510.

In the scenario 500, the base station 104 may not transmit an RRC release message to the UE 102 after communicating the data packets with the UE 102 at events 510 and/or 514.

In some implementations, the base station 104 may not apply a security function to the UL data packets received at events 506 and 510 and the DL data packets transmitted at event 514. The base station 104 forwards to the CN 110 the security protected packets received at events 506 and 510, and the CN 110 (e.g., AMF 164) applies security function(s) (e.g., decryption and/or integrity check) to the security-protected packets received at events 506 and 510 as described above for the base station 104. Likewise, the CN 110 (e.g., AMF 164) applies security function (e.g., integrity protection and/or encryption) to the DL data packets to obtain security-protected packet(s) as described above for the base station 104 and sends 514 the security-protected packet(s) to the base station 104, which in turn sends to the UE 102 the L DL RRC message(s) including the security-protected packet(s) respectively.

In some implementations, the UE 102 in the inactive state 502 may receive from the base station 104 a paging message for mobile terminating early data transmission (i.e., downlink early data transmission). In response to the paging message, the UE 102 can transmit to the base station 104 a UL RRC message but not including a UL data packet, similar to event 506. After transmitting the UL RRC message, the UE 102 does not transmit a data packet to the base station 104 which contrasts with event 508. After receiving the UL RRC message, the base station 104 transmits DL RRC messages including data packets to the UE 102, similar to event 514. Thus event 510 can be skipped for mobile terminating early data transmission. In some implementations, the paging message can include a cause value indicating the mobile terminating early data transmission. If the UE 102 has UL data to transmit while receiving the DL RRC messages (i.e., performing DL data communication like event 514), the UE 102 transmits the UL data, e.g., in similar ways as described above, after receiving the last DL RRC message from the base station 104 in the DL data communication.

Figure 6:
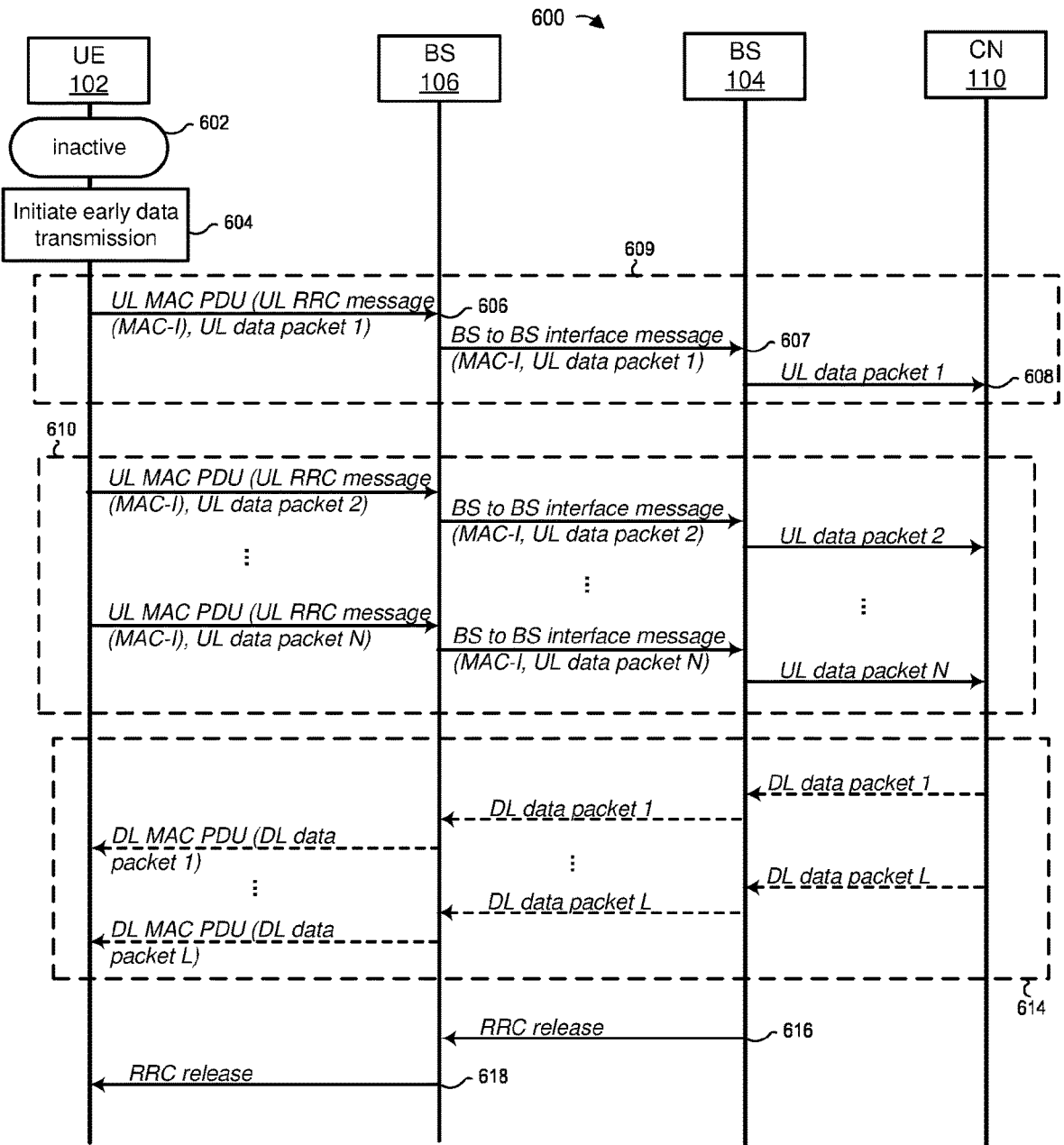
FIG. 6 is a messaging diagram of an example procedure for transmitting multiple security-protected data packets from a UE to a RAN when a radio connection between the UE and the RAN is inactive and when the base station receiving the security-protected data packets does not store UE context information for deriving a security key for retrieving data from the security-protected data packets.

Referring next to FIG. 6, in a scenario 600, the UE 102 initially operates 602 in an inactivate state with the base stations 104, 106. Before the UE 102 operates 602 in the inactive state, the UE 102 was in a connected state with the RAN 105 (e.g., the base station 104, base station 106 or another base station not shown in FIG. 1A). After a certain period of data inactivity, the RAN 105 can determine that neither the RAN 105 nor the UE 102 has transmitted any data in the downlink direction or the uplink direction, respectively, during the certain period. In response to the determination, the RAN 105 can transmit a first RRC release message to the UE 102 and instruct the UE 102 to transition to the inactive state. The UE 102 transitions to the inactive state upon receiving the first RRC release message. The RAN 105 can assign a UE ID (e.g., an I-RNTI) to the UE 102 and include the assigned value in the first RRC release message.

At a later time, the UE 102 in the inactive state initiates 604 early data transmission to transmit uplink data. In response to or after initiating data transmission, the UE 102 generates an initial MAC PDU, which includes a UL RRC message including a MAC-I (e.g., RRC MAC-I) and a UL data packet 1, and transmits 606 the initial MAC PDU to the base station 106 on cell 126. The UE 102 can apply one or more security functions to the UL data packet 1. The security function(s) can include an integrity protection and/or encryption function. When integrity protection is enabled, the UE 102 can generate a MAC-I to protect integrity of the data. Thus, the UE 102 in this case generates a security-protected packet including the data and the MAC-I. When encryption is enabled, the UE 102 can encrypt the data to obtain an encrypted packet, so that the security-protected packet includes encrypted data. When both integrity protection and encryption are enabled, the UE 102 can generate a MAC-I for protecting integrity of the data and encrypt the data along with the MAC-I to generate an encrypted packet and an encrypted MAC-I.

The base station 106 retrieves the security-protected UL data packet 1 from the initial MAC PDU and retrieves the UE ID of the UE 102 from the UL RRC message. The base station 106 then identifies another base station 104 as the destination of the data in the initial MAC PDU based on the UE ID, and determines that the base station 104 has the UE context information for obtaining the UL data from the security-protected UL data packet 1. The base station 106 then transmits 607 the security-protected UL data packet 1 and the MAC-I to the base station 104 in a base station to base station (BS-to-BS) interface message (e.g., Retrieve UE Context Request message). In the BS-to-BS interface message, the base station 106 can include a UE Context ID information element and/or a New Cell Identifier information element for the base station 104 to determine whether the MAC-I (e.g., RRC MAC-I) is valid. In some implementations, the base station 104 may send a BS-to-BS response message to the base station 106 in response to the BS-to-BS interface message. For example, the BS-to-BS response message is a Retrieve UE Context Failure message that has been specified in 3GPP specification 38.423 or 36.423. In another example, the BS-to-BS response message is an XnAP message newly specified in 3GPP specification 38.423 or 36.423 for the early data transmission mechanism. In other implementations, the base station 104 does not send a BS-to-BS response message to the base station 106 to respond to the BS-to-BS interface message.

The base station 104 then retrieves the security-protected packet UL data packet 1 from the BS-to-BS interface message, applies one or two security functions to decrypt the data and/or check the integrity protection, and transmits 608 the data to the CN 110 (e.g., SGW 112, UPF 162, MME 114 or AMF 164) or an edge server. More specifically, the base station 104 derives at least one security key from UE context information of the UE 102. Then the base station 104 retrieves the data from the security-protected UL data packet 1 by using the at least one security key and transmits the data to the CN 110 or edge server. When the security-protected UL data packet 1 is an encrypted packet, the base station 104 decrypts the encrypted packet to obtain the data by using the at least one security key (e.g., an (de-)encryption key). If the security-protected UL data packet 1 is an integrity-protected packet, the integrity protected packet may include the data and the MAC-I. The base station 104 can verify whether the MAC-I is valid for the security-protected UL data packet 1 by using the at least one security key (e.g., an integrity key). When the base station 104 confirms that the MAC-I is valid, the base station 104 sends the data to the CN 110 or edge server. On the other hand, when the base station 104 determines the MAC-I is invalid, the base station 104 discards the security-protected UL data packet 1. Further, if the security-protected UL data packet 1 is both encrypted and integrity-protected, the encrypted and integrity-protected packet may include the encrypted packet along with the encrypted MAC-I. The base station 104 in this case decrypts the encrypted packet and the encrypted MAC-I to obtain the data and the MAC-I. The base station 104 then determines whether the MAC-I is valid for the data. If the base station 104 determines that the MAC-I is valid, the base station 104 retrieves the data and forwards the data to the CN 110 or edge server. However, if the base station 104 determines that the MAC-I is invalid, the base station 104 discards the packet. The events 606-608 are collectively referred to in FIG. 6 as initial UL initial data communication 609. The event 610 is referred to in FIG. 6 as further/additional UL data communications.

After transmitting the initial MAC PDU, the UE 102 can transmit 610 subsequent MAC PDU(s) where each include a particular UL RRC message including a MAC-I (e.g., RRC MAC-I) and a particular security-protected UL data packet to the base station 106, which in turn transmits 610 the particular security-protected UL data packet, e.g., in a particular BS-to-BS interface message, to the base station 104. In some implementations, the base station 106 includes the MAC-I (e.g., RRC MAC-I) in the particular BS-to-BS interface message. In other implementations, the base station 106 does not include the MAC-I (e.g., RRC MAC-I) in the particular BS-to-BS interface message. The base station 104 retrieves the data from the particular security-protected UL data packet by using the at least one security key and transmits the data to the CN 110. Alternatively, the base station 104 can transmit the data to an edge server instead of the CN 110. The subsequent MAC PDU(s) include (N−1) MAC PDU(s), where "N" is an integer and larger than 0 or 1. In some implementations, the edge server can operate within the RAN 105.

After transmitting 608 the UL data packet 1 to the CN 110, the base station 104 can receive 614 one or more DL data packet(s) (e.g., 1, . . . , L packets and "L" is an integer and larger than 0 or 1) from the CN 110 and in turn transmits 614 the DL data packet(s) to the base station 106 which forwards the DL data packet(s) to the UE 102. For each DL data packet, the base station 106 generates a DL MAC PDU including the DL data packet and transmits 614 the DL MAC PDU to the UE 102. After determining no more data needs to be exchanged between the UE 102 and base station 104, the base station 104 transmits 616 a (second) RRC release message to the base station 106 which forwards 618 the RRC release message to the UE 102. The UE 102 still stays in the inactive state from event 602 to event 618 and after receiving 618 the RRC release message. In some implementations, the base station 106 can transmit 614 the DL MAC PDU(s) to the UE 102 in parallel or alternating with receiving 610 the UL MAC PDU(s). In other implementations, the base station 106 can transmit 614 the DL MAC PDU(s) after receiving 610 the UL MAC PDU(s).

In some implementations, the base station 104 may send a BS-to-BS response message including the RRC release message 616 to the base station 106 in response to or after receiving the last BS-to-BS interface message that base station 104 receives at event 610. For a BS-to-BS interface message 610 which is not the last BS-to-BS interface message, the base station 104 may or may not send a BS-to-BS response message to the base station 106 to respond to the BS-to-BS interface message. For example, the BS-to-BS response message is a Retrieve UE Context Failure message that has been specified in 3GPP specification 38.423 or 36.423. In another example, the BS-to-BS response message is an XnAP message newly specified in 3GPP specification 38.423 or 36.423 for the early data transmission mechanism.

In some implementations, the base station 104 can include each of the DL data packets at event 614 in a particular BS-to-BS interface message. For example, the particular BS-to-BS response message is a Retrieve UE Context Failure message that has been specified in 3GPP specification 38.423 or 36.423. In another example, the particular BS-to-BS response message is an XnAP message newly specified in 3GPP specification 38.423 or 36.423 for the early data transmission mechanism.

In other implementations, the base station 104 can send 614 the DL data packets to the base station 106 via a General Packet Radio Services (GPRS) Tunneling Protocol for a User Plane (GTP-U) connection or interface. In some implementations, the base station 106 can send 610 the UL data packets the base station 104 via the GTP-U connection or interface and may not use the BS-to-BS interface messages to transfer the UL data packets to the base station 104.

In some implementations, the UE 102 in the inactive state 602 may receive from the base station 106 a paging message for mobile terminating early data transmission (i.e., downlink early data transmission). In response to the paging message, the UE 102 can transmit to the base station 106 a UL MAC PDU including a UL RRC message and not including a UL data packet, similar to event 606. In turn, the base station 106 sends to the base station 104 a BS-to-BS interface message including a MAC-I (included in the UL RRC message) and not including a UL data packet, similar to event 607. After transmitting the UL MAC PDU, the UE 102 does not transmit a data packet to the base station 104. After receiving the BS-to-BS interface message and verifying or validating the MAC-I, the base station 104 transmits to the UE 102 DL data packet(s) and an RRC release message via the base station 106, similar to events 614, 616 and 618 respectively. In some implementations, the paging message can include a cause value indicating the mobile terminating early data transmission. In some implementations, the base station 106 receives the paging message from the base station 104. In other implementations, the base station 106 receives from the base station 104 a BS-to-BS interface message (e.g., an XnAP message, or an X2AP or a PAGING message in the XnAP or X2AP message format) indicating the mobile terminating early data transmission for the UE 102. The base station 106 generates the paging message in response to receiving the BS-to-BS interface message or in accordance with the indication of the mobile terminating early data transmission in the BS-to-BS interface message. If the UE 102 has UL data to transmit while receiving the DL MAC PDU(s) (i.e., performing DL data communication like event 614), the UE 102 in some implementations transmits the UL data, e.g., in similar ways as described above, after receiving the RRC release message from the base station 106.

Figure 7:
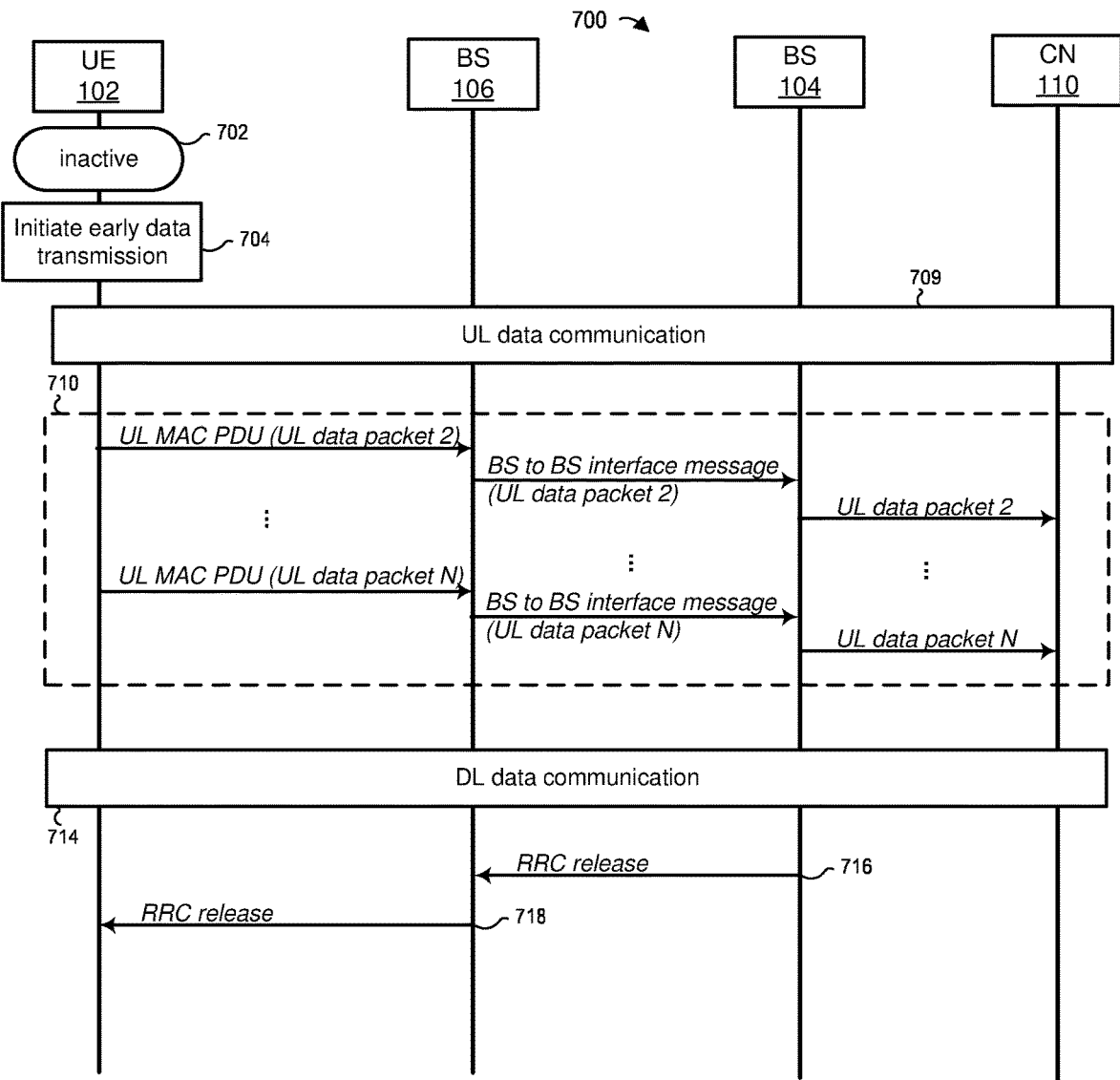
FIG. 7 is a messaging diagram of another example procedure for transmitting multiple security-protected data packets from a UE to a RAN when a radio connection between the UE and the RAN is inactive and when the base station receiving the security-protected data packets does not store UE context information for deriving a security key for retrieving data from the security-protected data packets.

Referring next to FIG. 7, in a scenario 700, which is generally similar to the scenario 600, the events 702, 704, 709, 710, 714, 716, and 718 are similar to the events 602, 604, 609, 610, 614, 616, and 618, respectively. However, the UE 102 does not include a UL RRC message in each of the UL MAC PDU(s) at event 710. Accordingly, the base station 106 does not send a MAC-I (e.g., RRC MAC-I) with the UL data packet to the base station 104 at event 710.

Figure 8:
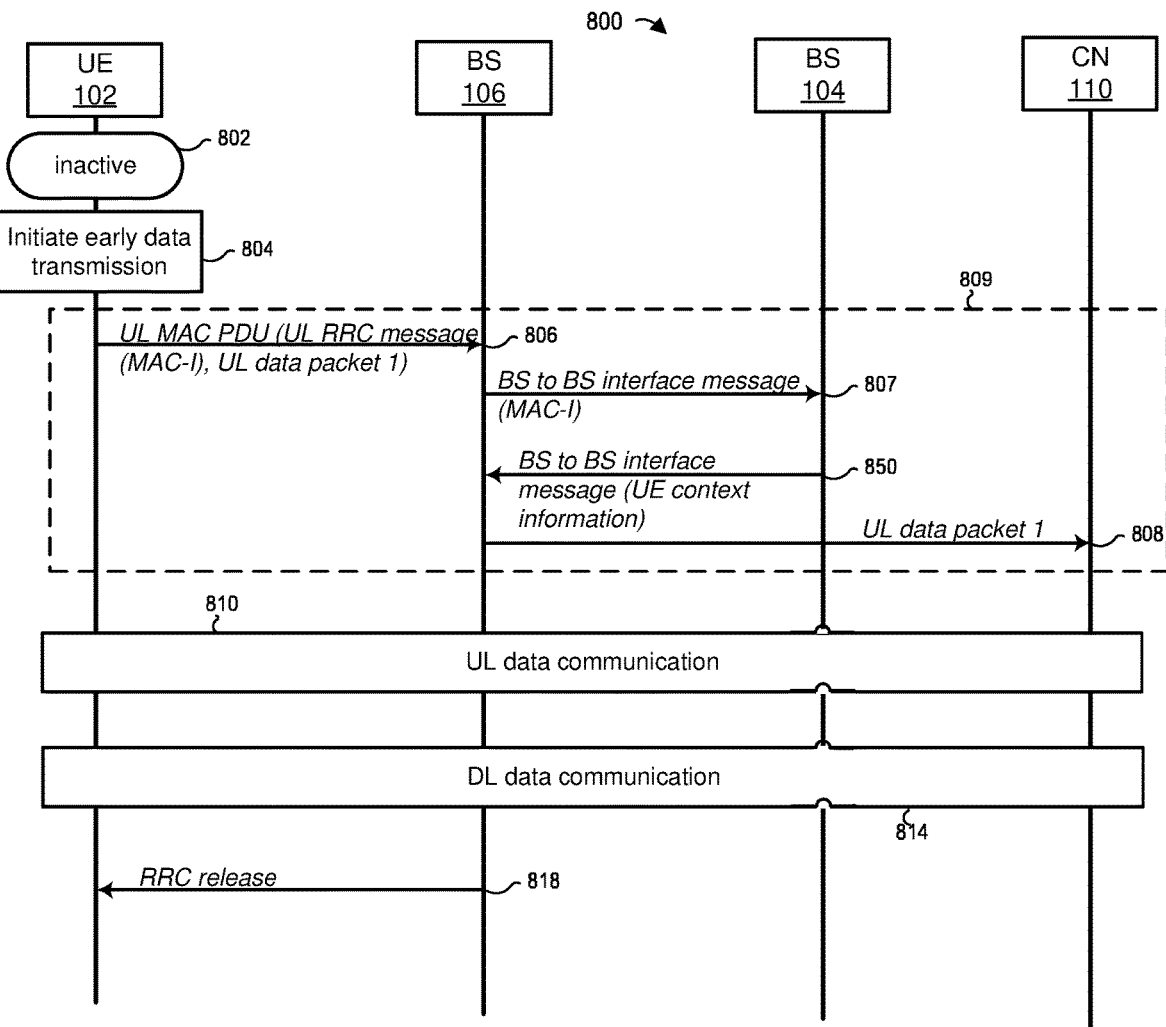
FIG. 8 is a messaging diagram of yet another example procedure for transmitting multiple security-protected data packets from a UE to a RAN when a radio connection between the UE and the RAN is inactive and when the base station receiving the security-protected data packets does not store UE context information for deriving a security key for retrieving data from the security-protected data packets.

Referring next to FIG. 8, in a scenario 800, which is generally similar to the scenario 600, the events 802, 804, 806, 810, 814, and 818 are similar to the events 602, 604, 606, 610, 614, and 618, respectively. However, rather than transmitting the security-protected UL data packet 1 and the MAC-I to the base station 104 as in event 607, the base station 106 performs 807, 850 a retrieve UE context procedure with the base station 104 to obtain UE context information of the UE 102 from the base station 104. More specifically, the base station 106 transmits 807 a BS-to-BS interface message (e.g., Retrieve UE Context Request message) to the other base station 104 including a request for the UE context information and a MAC-I. The base station 104, in turn, transmits 850 a BS-to-BS interface message (e.g., Retrieve UE Context Response message) to the base station 106 including the UE context information. After receiving the UE context information, the base station 106 performs 810 UL data communication, performs 814 DL data communication and transmits 818 the RRC release message in similar ways as described for the base station 104 in FIG. 3.

The base station 106 then derives at least one security key from the UE context information. Then the base station 106 retrieves the data from the security-protected UL data packet 1 by using the at least one security key and transmits 808 the data to the CN 110 (e.g., UPF 162) or an edge server.

Accordingly, in events 810 and 814, the base station 106 does not forward subsequent security-protected UL data packets to the base station 104 or receive DL data packets from the base station 104. Instead, the base station 106 retrieves the data from the subsequent security-protected UL data packets by using the at least one security key and transmits the data to the CN 110. Moreover, the base station 106 receives 814 one or more DL data packet(s) (e.g., 1, . . . , L packets and "L" is an integer and larger than 0 or 1). For each DL data packet, the base station 106 generates a DL MAC PDU including the DL data packet and transmits 814 the DL MAC PDU to the UE 102.

Figure 9:
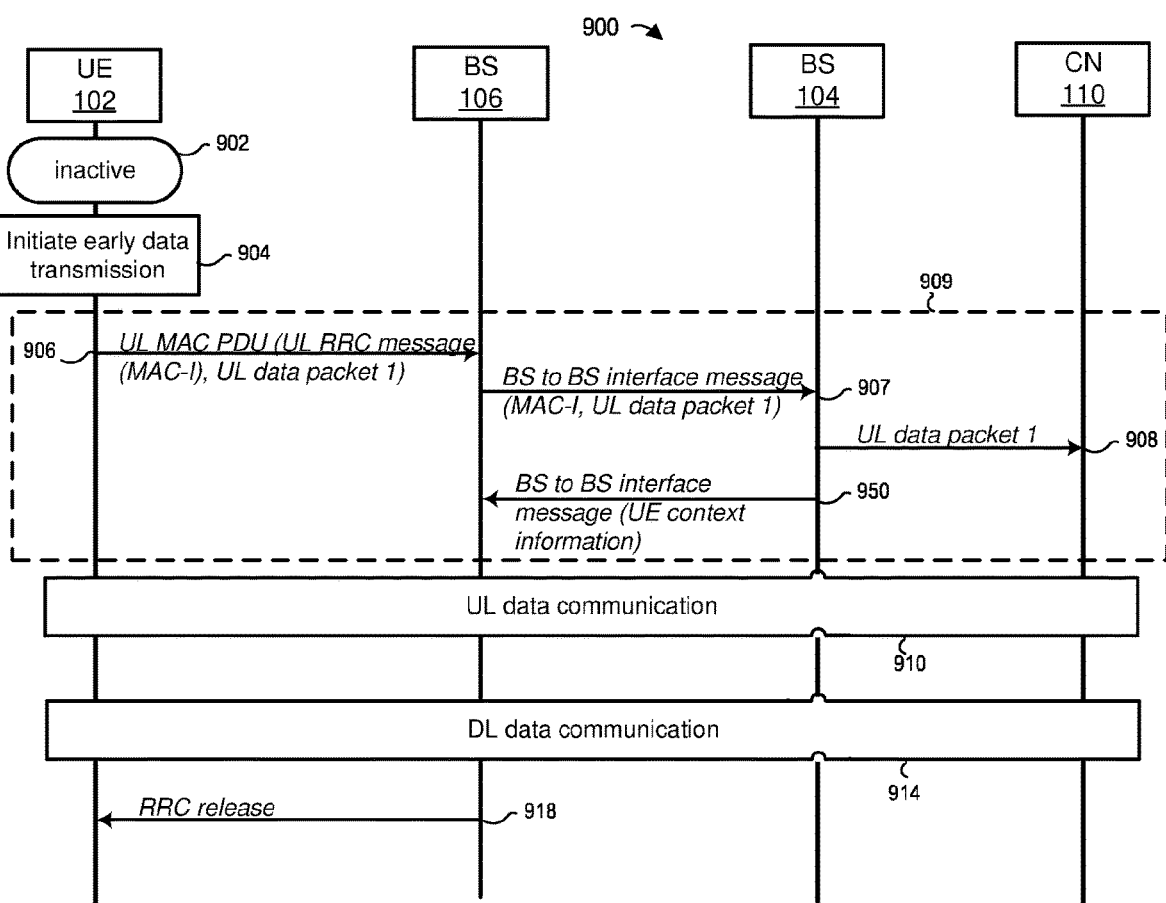
FIG. 9 is a messaging diagram of another example procedure for transmitting multiple security-protected data packets from a UE to a RAN when a radio connection between the UE and the RAN is inactive and when the base station receiving the security-protected data packets does not store UE context information for deriving a security key for retrieving data from the security-protected data packets.

Referring next to FIG. 9, in a scenario 900, which is generally similar to the scenario 800, the events 902, 904, 906, 908, 910, 914, 918, and 950 are similar to the events 802, 804, 806, 808, 810, 814, 818, and 850, respectively. However, the base station 106 transmits 907 the security-protected UL data packet 1 and the MAC-I to the base station 104 in a BS-to-BS interface message with a request for the UE context information for the UE 102. The base station 104 then retrieves the security-protected packet UL data packet 1 from the BS-to-BS interface message, applies one or two security functions to decrypt the data and/or check the integrity protection, and transmits 908 the data to the CN 110 (e.g., SGW 112, UPF 162, MME 114 or AMF 164) or an edge server. Additionally, the base station 104 transmits 950 a BS-to-BS interface message to the base station 106 including security information, such as the UE context information.

The base station 106 then derives at least one security key from the UE context information. Then the base station 106 retrieves the data from subsequent security-protected UL data packets by using the at least one security key and transmits 910 the data to the CN 110.

Figure 10A:
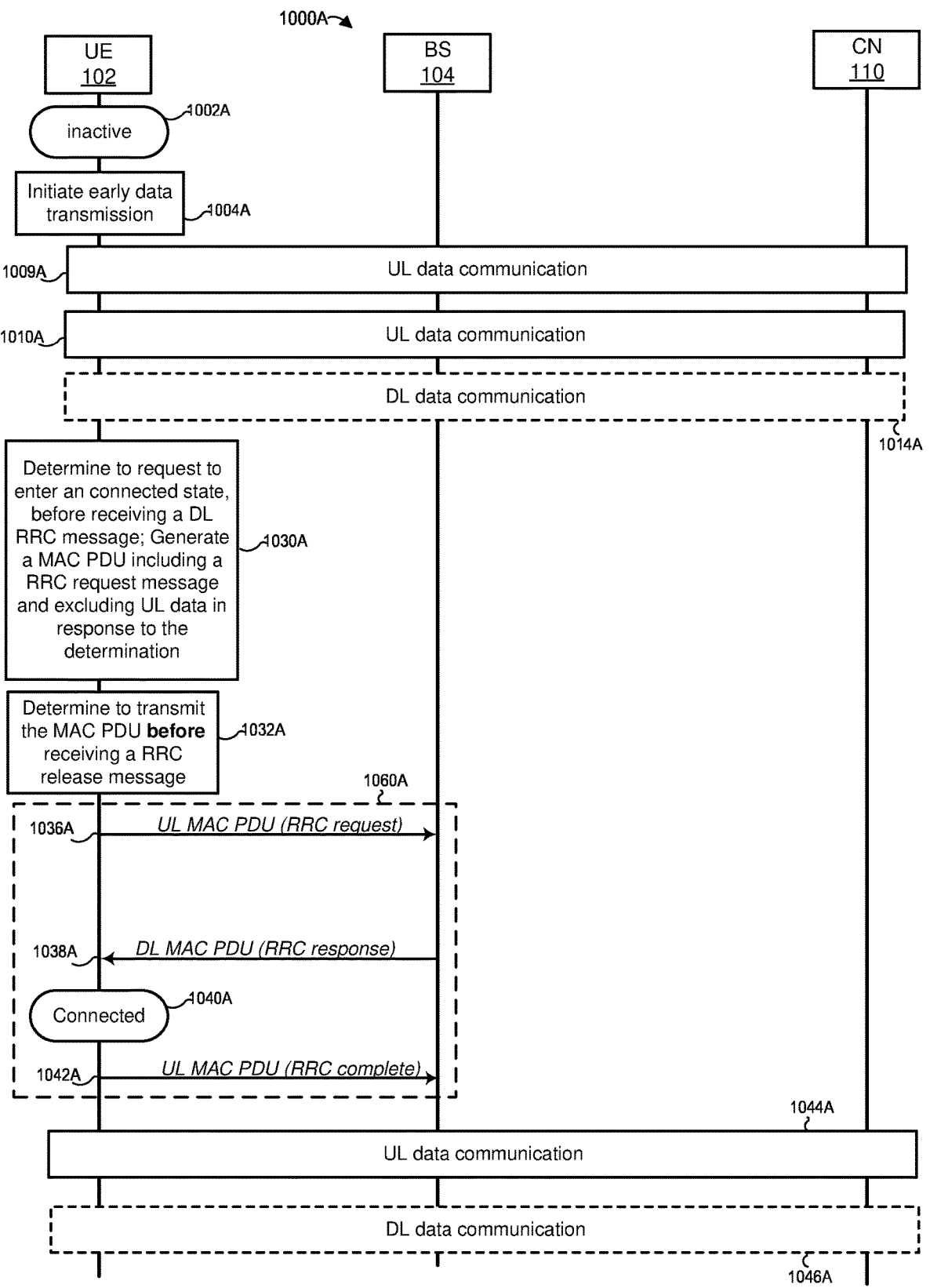
FIGS. 10A, 10B, and 11 are messaging diagrams of example procedures for connecting to a RAN after transmitting multiple data packets from a UE to the RAN when a radio connection between the UE and the RAN is inactive.

Referring next to FIG. 10A, in a scenario 1000A, which is generally similar to the scenario 300, the events 1002A, 1004A, 1009A, 1010A, and 1014A are similar to the events 302, 304, 309, 310, and 314, respectively. However, after the event 1009A or during the event 1010A, and prior to receiving an RRC release message or a DL RRC message from the base station 104, the UE 102 determines to request to enter a connected state with the base station 104. The UE 102 may determine 1030A to enter the connected state because the UE 102 may not be able to transmit a data packet in early data transmission. For example, the data may be an IMS packet (e.g., for initiating a voice call), the data may be associated with a radio bearer not suitable or configured for early data transmission, the data may be an NAS message for initiating a particular NAS procedure, the size of the data may be larger than a threshold size, or the data may not qualify for early data transmission for any other suitable reason.

Accordingly, the UE 102 generates 1030A a MAC PDU including an RRC request message without including a UL data packet. The RRC request message may be an RRC setup request message (e.g., RRCSetupRequest message or RRCResumeRequest message). The UE 102 determines 1032A to transmit the MAC PDU before receiving the RRC release message or a DL RRC message from the base station 104. Accordingly, prior to receiving the RRC release message or the DL RRC message from the base station 104, the UE 102 transmits 1036A the MAC PDU including the RRC request message to the base station 104. In some implementations, the UE 102 neither includes the data in the RRC request message nor includes the data in the UL MAC PDU 1036A including the RRC request message. In response, the base station 104 transmits 1038A a DL MAC PDU including an RRC response message, such as an RRC setup message (e.g., RRCSetup message or RRCResume message) to the UE 102. In response to the RRC response message, the UE 102 transitions 1040A to a connected state (e.g., RRC_CONNECTED state) and transmits 1042A a UL MAC PDU including an RRC complete message, such as an RRC setup complete message (e.g., RRCSetupComplete message or RRCResumeComplete message) to the base station 104. The UE 102 can include the NAS message in the RRC setup complete message or transmit the NAS message to the base station 104 after transmitting the RRC setup complete message. In turn, the base station 104 sends the NAS message to the CN 110 (e.g., AMF 164). The events 1036A-1042A are collectively referred to in FIG. 10A as procedure 1060A.

If the base station 104 does not have the UE context information of the UE 102, the base station 104 sends 1052A a Retrieve UE Context Request message to obtain UE context information of the UE 102 from another base station (not shown), similar to the event 807. In response, the other base station sends 1054A a Retrieve UE Context Response message including the UE context information to the base station 104, similar to event 850. After receiving the UE context information, the base station 104 transmits 1038A the RRC response message.

After transitioning to the connected state, the base station 104 in some implementations can send a security mode command message (e.g., SecurityModeCommand message) to the UE 102 to activate security protection. In response, the UE 102 transmits a security mode complete message (e.g., SecurityModeComplete message) to the base station 104. After activating security protection, the base station 104 in some implementations can transmit to the UE 102 an RRC reconfiguration message (e.g., RRCReconfiguration message) including a DRB configuration to configure a DRB. In response, the UE 102 transmits an RRC reconfiguration complete message (e.g., RRCReconfigurationComplete message) to the base station 104. In other implementations, the base station 104 can include the DRB configuration in the RRC response message (e.g., RRCResume message).

The UE 102 then communicates 1044A UL data packets (e.g., the remainder of the UL data packets and/or other UL data packets) with the base station 104, for example on the DRB, while in an RRC_CONNECTED state. The base station 104 communicates 1046A DL data packets with the UE 102, for example, on the DRB, while in an RRC_CONNECTED state. In some implementations, the base station 104 can include RLC configuration parameters, MAC configuration parameters and/or physical layer configuration parameters in the RRC reconfiguration message. The UE 102 and base station 104 can use these configuration parameters to communicate with one another.

Figure 10B:
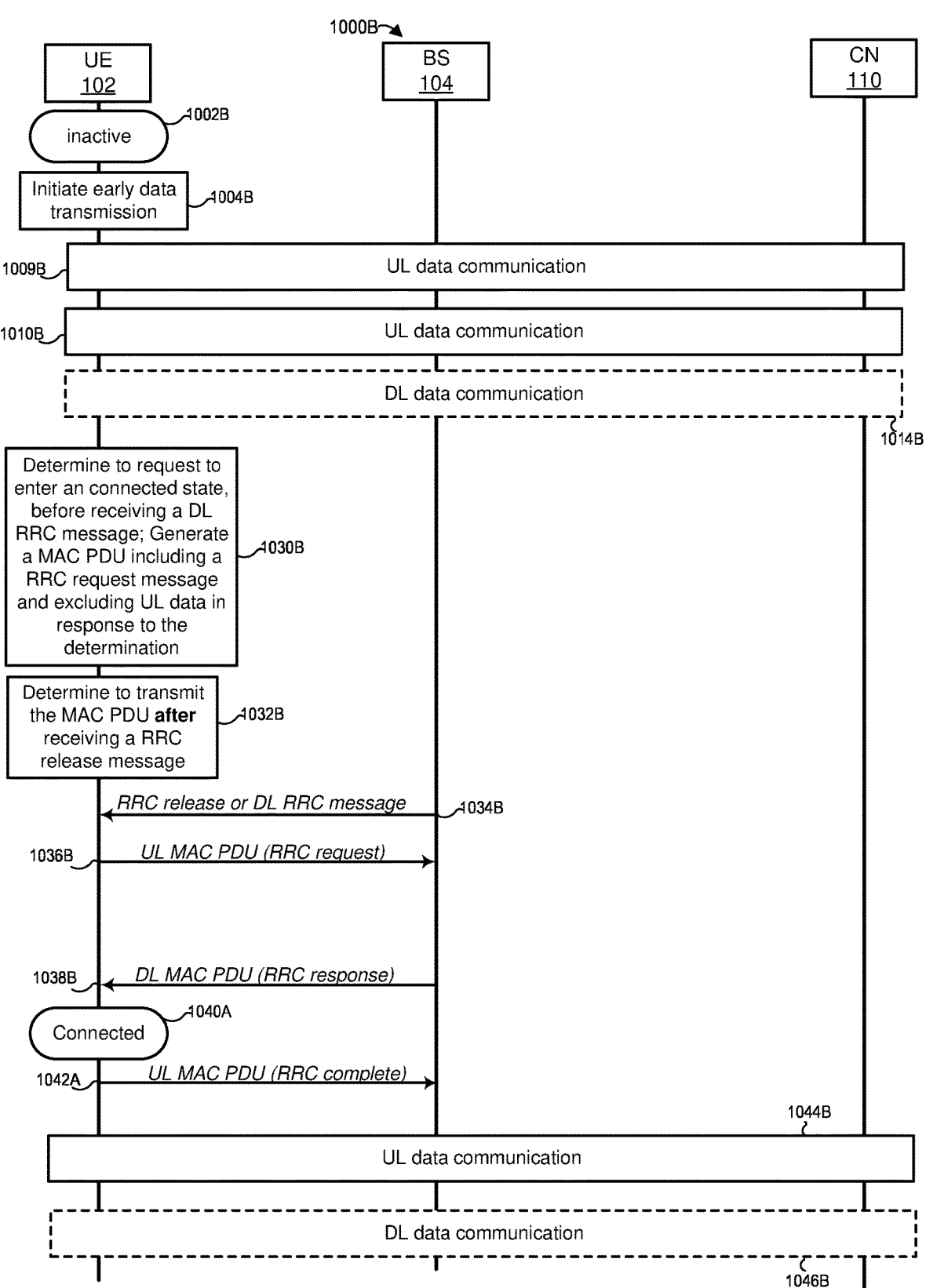

Referring next to FIG. 10B, in a scenario 1000B, which is generally similar to the scenario 1000A, the events 1002B, 1004B, 1009B, 1101B, 1014B, 1030B, 1036B, 1038B, 1040B, 1042B, 1044B, and 1046B are similar to the events 1002A, 1004A, 1009A, 1010A, 1014A, 1030A, 1036A, 1038A, 1040A, 1042A, 1044A, and 1046A, respectively. However, rather than transmitting the MAC PDU with an RRC request message for entering a connected state before receiving the RRC release message or a DL RRC message from the base station 104, the UE 102 determines 1032B to transmit the MAC PDU after receiving the RRC release message or a DL RRC message from the base station 104.

The base station 104 transmits 1034B an RRC release message or a DL RRC to the UE 102. Then the UE 102 requests to enter a connected state with the base station 104 by transmitting 1036B the MAC PDU with an RRC request message to the base station 104.

Figure 11:
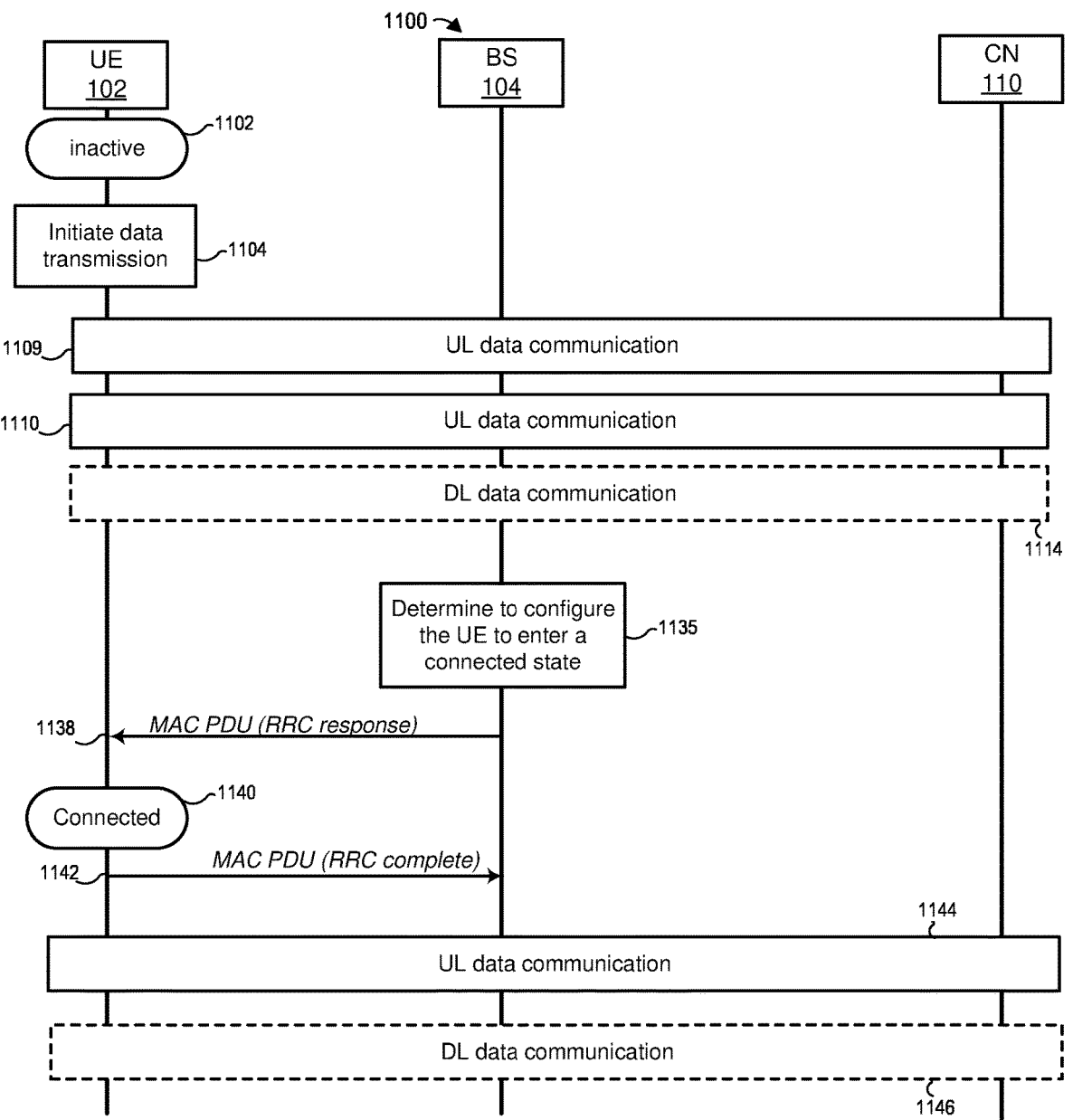

Referring next to FIG. 11, in a scenario 1100, which is generally similar to the scenario 1000A, the events 1102, 1104, 1109, 1110, 1114, 1138, 1140, 1142, 1144, and 1146 are similar to the events 1002A, 1004A, 1009A, 1010A, 1014A, 1038A, 1040A, 1042A, 1044A, and 1046A, respectively. However, rather than the UE 102 requesting to enter the connected state with the base station 104, the base station 104 determines 1135 to configure the UE to enter the connected state, after performing 1109 UL data communication, 1110 UL data communication and/or 1114 DL data communication with the UE 102. The base station 104 then transmits 1138 a DL MAC PDU including an RRC response message, such as an RRC setup message (e.g., RRCSetup message) to the UE 102 for configuring the UE to enter the connected state without receiving an RRC request message, such as an RRC setup request message from the UE 102.

Next, several example methods that can be implemented in the UE or in one or more base station to support communications in the inactive state are discussed next with reference to FIGS. 12-18.

FIG. 12 is a flow diagram of an example method 1200 for processing security-protected packets received from a UE operating in an inactive state associated with a protocol for controlling radio resources, which can be implemented in a RAN (e.g., the RAN 105), for example.

At block 1202, the RAN receives plural MAC PDUs from the UE operating in the inactive state, wherein each of the MAC PDUs includes a data packet and at least one of the MAC PDUs includes a UL RRC message (e.g., events 306, 310, 409, 410, 506, 510, 606, 610, 709, 710, 806, 810, 906, 910, 1009A, 1010A, 1009B, 1101B, 1109, 1110). At block 1204, the RAN identifies and/or verifies the UE in accordance with the UL RRC message. At block 1206, the RAN generates at least one security key after identifying the UE. At block 1208, the RAN uses the at least one security key to perform security function(s) (e.g., decryption and/or integrity check) to the plural data packets to obtain reconstructed data packets. At block 1210, the RAN refrains from transmitting to the UE a first DL RRC message to configure the UE to enter a connected state, while receiving the plural MAC PDUs.

In some implementations, after determining no more data needs to be exchanged between the UE and RAN, the RAN transmits a second DL RRC message to the UE 102 (e.g., events 318, 418, 616, 618, 716, 718, 818, 918). In other implementations, after determining more data needs to be exchanged between the UE and RAN, the RAN transmits the first DL RRC message to the UE 102 (e.g., event 1138) to configure the UE 102 to enter the connected state.

Referring next to FIG. 13, a UE (e.g., the UE 102) can implement an example method 1300 to transmit plural data packets while the UE operates in an inactive state of the protocol for controlling radio resources. The method 1300 begins at block 1302, where the UE in the inactive state initiates early data transmission (304, 404, 504, 604, 704, 804, 904, 1004A, 1004B, 1104). At block 1304, the UE in the inactive state performs security function(s) to plural data packets using at least one security key (e.g., encryption key and/or integrity key) to obtain plural security-protected data packets in response to or after initiating the early data transmission.

At block 1306, the UE in the inactive state transmits to a RAN (e.g., RAN 105) an initial MAC PDU, which includes a UL RRC message and an initial security-protected data packet of the plural security-protected data packets (e.g., events 306, 409, 506, 606, 709, 806, 906, 1009A, 1009B, 1109). At block 1308, the UE in the inactive state transmits to the RAN subsequent MAC PDU(s), where each includes a particular security-protected data packet of the plural security-protected data packets (e.g., events 310, 410, 510, 610, 710, 810, 910, 1010A, 1010B, 1110). At block 1310, the UE in the inactive state receives from the RAN a DL RRC message and stops using the at least one security key in the early data transmission and next early data transmission in response to or after receiving the DL RRC message.

Next, FIG. 14A illustrates another example method 1400A a RAN (e.g., the RAN 105) can implement to process security-protected packets received from a UE operating in an inactive state associated with a protocol for controlling radio resources. The method 1400A begins at block 1402A, where the RAN receives a MAC PDU, including a UL RRC message and a security-protected packet, from a UE operating in the inactive state (e.g., events 306, 409, 506, 606, 709, 806, 906, 1009A, 1009B, 1109). At block 1404A, the RAN identifies the UE in accordance with the UL RRC message. At block 1409A, the RAN generates at least one security key in accordance with the identification of the UE. At block 1408A, the RAN applies the at least one security key to perform security function(s) to the security-protected packet to obtain a reconstructed data packet. After receiving the MAC PDU, the RAN at block 1410A determines whether more data needs to be exchanged between the UE and RAN (e.g., whether the UE has subsequent data to transmit or the RAN has plural data packets to transmit). If the RAN determines that more data needs to be exchanged between the UE and RAN, the RAN at block 1412A refrains from transmitting an RRC release message to the UE while communicating multiple data packets with the UE 102 operating in the inactive state. Thus, the RAN can continue to communicate data packets with the UE operating in the inactive state. If the RAN determines no more data needs to be exchanged between the UE and RAN, the RAN at block 1414A transmits an RRC release message to the UE (e.g., events 318, 418, 618, 718, 818, 918). Thus, the UE stops the early data communication with the RAN.

Next, FIG. 14B illustrates another example method 1400B a RAN (e.g., the RAN 105) can implement to process security-protected packets received from a UE operating in an inactive state associated with a protocol for controlling radio resources. FIG. 14B is similar to FIG. 14A with differences described below. Unlike block 1410A in FIG. 14A, the RAN at block 1409B determines whether the UE supports exchanging multiple data packets (e.g., multiple UL data packets or multiple DL data packets) while operating in the inactive state. If the RAN determines that the UE supports exchanging (e.g., transmitting or receiving) multiple data packets while operating in the inactive state, the RAN at block 1412B refrains from transmitting an RRC release message to the UE while communicating multiple data packets with the UE 102 operating in the inactive state. Thus, the RAN can continue to communicate data packets with the UE operating in the inactive state. If the RAN determines that the UE does not support exchanging multiple data packets while operating in the inactive state, the RAN at block 1414B transmits an RRC release message to the UE (e.g., events 318, 418, 618, 718, 818, 918). Thus, the method prevents the UE from encountering an error due to that the UE exceeds its capabilities.

In some implementations, the method 1400B can be combined with the method 1400A. When the UE supports exchanging multiple data packets the inactive station per event 1409B, the RAN can transition to the determination at event 1410A in FIG. 14A. In accordance with a result of the determination 1410A, the RAN either transmits or refrains from transmitting an RRC release message to the UE as described for blocks 1412B and 1414B respectively.

Next, FIG. 14C illustrates another example method 1400C a RAN (e.g., the RAN 105) can implement to process security-protected packets received from a UE operating in an inactive state associated with a protocol for controlling radio resources. FIG. 14C is similar to FIG. 14B with differences described below. Unlike block 1409B in FIG. 14B, the RAN at block 1411C determines whether the RAN enables exchanging (e.g., transmitting or receiving) multiple data packets (e.g., multiple UL data packets or multiple DL data packets) with UEs (e.g., UE 102 and other UEs) operating in the inactive state. If the RAN enables exchanging multiple data packets with UEs operating in the inactive state, the RAN at block 1412C refrains from transmitting an RRC release message to the UE while communicating multiple data packets with the UE 102 operating in the inactive state. Thus, the RAN can continue to communicate data packets with the UE operating in the inactive state. If the RAN does not enable exchanging multiple data packets with the UE while the UE operates in the inactive state, the RAN at block 1414C transmits an RRC release message to the UE (e.g., events 318, 418, 618, 718, 818, 918).

In some implementations, the RAN can determine whether to enable exchanging multiple data packets with the UE operating in the inactive state in accordance with a configuration stored or received at the RAN. For example, the configuration can be preconfigured or pre-determined. In another example, the RAN can receive the configuration from a network node (e.g., CN 110 or an operation and maintenance (O&M) node).

In some implementations, the method 1400C can be combined with the method 1400A. When the RAN enables exchanging multiple data packets with UEs operating the inactive station per event 1411C, the RAN can transition to the determination at event 1410A in FIG. 14A. In accordance with a result of the determination 1410A, the RAN either transmits or refrains from transmitting an RRC release message to the UE as described for blocks 1412C and 1414C respectively. In other implementations, the method 1400C can be combined with the methods 1400A and 1400B. When the RAN enables exchanging multiple data packets with UEs operating the inactive station per event 1411C, the RAN can make the determination at event 1409B in FIG. 14B. When the UE supports exchanging multiple data packets the inactive station, the RAN can make the determination at event 1410A in FIG. 14A. In accordance with a result of the determination 1410A, the RAN either transmits or refrains from transmitting an RRC release message to the UE as described for blocks 1412C and 1414C respectively.

FIG. 15A illustrates an example method 1500A a UE (e.g., the UE 102) can implement to perform early data communication in an inactive state of the protocol for controlling radio resources. The method 1500A begins at block 1502A, where the UE in the inactive state initiates early data transmission (e.g., 304, 404, 504, 604, 704, 804, 904, 1004A, 1004B, 1104). At block 1504A, the UE in the inactive state transmits to a RAN (e.g., RAN 105) an initial MAC PDU, which includes a UL RRC message and an initial data packet in response to initiating the early data transmission (e.g., events 306, 409, 506, 606, 709, 806, 906, 1009A, 1009B, 1109). At block 1506A, the UE determines whether the RAN supports exchanging multiple data packets (e.g., multiple UL data packets or multiple DL data packets) with the UE operating in the inactive state. If the RAN supports exchanging (e.g., transmitting or receiving) multiple data packets with the UE operating in the inactive state, the UE at block 1508 transmits subsequent data packet(s) to the RAN without waiting for a DL RRC message (e.g., the RRC release message at events 318, 418, 618, 718, 818, 918, or the DL RRC message at event 514), while operating in the inactive state (events 310, 410, 510, 610, 710, 810, 910, 1010A, 1101B, 1110). Thus, the UE can continue to transmit data packets to the RAN while operating in the inactive state. If the RAN does not support exchanging multiple data packets with the UE operating in the inactive state, the UE at block 1510A refrains from transmitting subsequent data packet(s) to the RAN until receipt of a DL RRC message (e.g., the RRC release message at events 318, 418, 618, 718, 818, 918, or the DL RRC message at event 514). Thus, the method prevents the UE from wasting power on transmissions of the subsequent data packet(s) that the RAN does not expect to receive. The method also prevents the RAN from encountering an error when the RAN cannot process the unexpected subsequent data packet(s).

FIG. 15B illustrates an example method 1500B a UE (e.g., the UE 102) can implement to perform early data communication in an inactive state of the protocol for controlling radio resources. FIG. 15B is similar to FIG. 15A with differences described below. Unlike block 1506A, the UE at block 1507B determines whether the UE supports exchanging multiple data packets (e.g., multiple UL data packets or multiple DL data packets) in the inactive state. If the UE supports exchanging (e.g., transmitting or receiving) multiple data packets in the inactive state, the UE at block 1508B transmits subsequent data packet(s) to the RAN without waiting for a DL RRC message (e.g., the RRC release message at events 318, 418, 618, 718, 818, 918, or the DL RRC message at event 514), while operating in the inactive state (events 310, 410, 510, 610, 710, 810, 910, 1010A, 1101B, 1110). Thus, the UE can continue to transmit data packets to the RAN while operating in the inactive state. If the UE does not support exchanging multiple data packets in the inactive state, the UE at block 1510B refrains from transmitting subsequent data packet(s) to the RAN until receiving a DL RRC message (e.g., events 318, 418, 514, 618, 718, 818, 918). Thus, the method prevents the UE from wasting power on transmissions of the subsequent data packet(s) that the RAN does not expect to receive. The method also prevents the RAN from encountering an error when the RAN cannot process the unexpected subsequent data packet(s).

In some implementations, the method 1500B can be combined with the method 1500A. When the UE enables exchanging multiple data packets with UEs operating the inactive station in event 107B, the UE can transition to the determination at event 1506A in FIG. 15A. In accordance with a result of the determination 1506A, the UE either transmits or refrains from transmitting subsequent data packet(s) to the RAN as described for blocks 1508B and 1510B respectively.

FIG. 16 illustrates an example method 1600 a UE (e.g., the UE 102) can implement to perform early data communication in an inactive state of the protocol for controlling radio resources. The method 1600 begins at block 1602, where the UE in the inactive state transmits to a RAN (e.g., RAN 105) a MAC PDU, which includes a UL RRC message and a data packet (e.g., events 306, 310, 409, 506, 510, 606, 610, 709, 806, 810, 906, 910, 1009A, 1010A, 1009B, 1010B, 1109, 1110). At block 1604, the UE determines whether the UL RRC message is the initial RRC message that the UE transmits after initiating early data transmission in the inactive state. If the UL RRC message is the initial RRC message that the UE transmits after initiating early data transmission in the inactive state, the UE at block 1606 starts a timer in response to transmission of the UL RRC message. If the UL RRC message is not the initial RRC message that the UE transmits after initiating early data transmission in the inactive state, the UE at block 1608 refrains from (re)starting the timer in response to transmission of the UL RRC message.

In some implementations, the timer can be timer T319 specified in 3GPP specification 38.331. In other implementations, the timer can be a new timer specific for early data transmission and specified in 3GPP specification 38.331.

When the timer expires, the UE stops the early data communication (i.e., transmission and/or reception) with (to/from) the RAN 105. If the UE receives a DL RRC message (e.g., events 318, 418, 514, 618, 718, 818, 918)

while the timer is running, the UE stops the timer and stops the early data communication.

FIG. 17 illustrates an example method 1700 a UE (e.g., the UE 102) can implement to perform early data communication in an inactive state of the protocol for controlling radio resources. The method 1700 begins at block 1702, where the UE in the inactive state transmits to a RAN (e.g., RAN 105) a MAC PDU, which includes a UL RRC message (e.g., events 306, 310, 409, 506, 510, 606, 610, 709, 806, 810, 906, 910, 1009A, 1010A, 1009B, 1010B, 1109, 1110). At block 1704, the UE determines whether to transmit a data packet with the UL RRC message in MAC PDU. If the UE determines to transmit a data packet with the UL RRC message in a MAC PDU, the UE at block 1706 starts a first timer in response to transmission of the UL RRC message. If the UE determines to not transmit a data packet with the UL RRC message in a MAC PDU, the UE at block 1708 starts a second timer in response to transmission of the UL RRC message.

In some implementations, the first timer can be a new timer specific for early data transmission and the second timer is a timer T319, as specified in 3GPP specification 38.331. In other implementations, the first timer and second timer are the same timer (e.g., timer T319) with different timer values.

In some implementations, the RAN can broadcast system information (e.g., one or more SIBs) including a first timer value and a second timer value for the first timer and second timer respectively on cell(s) (e.g., cell(s) 124, 126) operated by the RAN (e.g., RAN 105). Thus, the UE can receive the system information before transmitting the MAC PDU. For example, the SIB is a SIB1. In another example, the SIB(s) include a first SIB (e.g., SIB1) and a second SIB. The first SIB includes the first timer value and the second SIB includes the second timer value. In other implementations, the UE 102 can use preconfigured or predetermined timer value(s) for the first timer and second timer.

In some implementations, the RAN can set the first timer value longer than the second timer value for exchanging multiple data packets in the early data communication with UEs. In other implementations, the RAN can set the first timer value shorter than or equal to the second timer value for exchanging multiple data packets in the early data communication with UEs, e.g., because the UE in the inactive state restarts the first timer in response to every transmission of a data packet or an associated UL RRC message (e.g., events 306, 310, 409, 410, 506, 510, 606, 610, 709, 710, 806, 810, 906, 910, 1009A, 1010A, 1009B, 1010B, 1109, 1110).

Figure 18A:
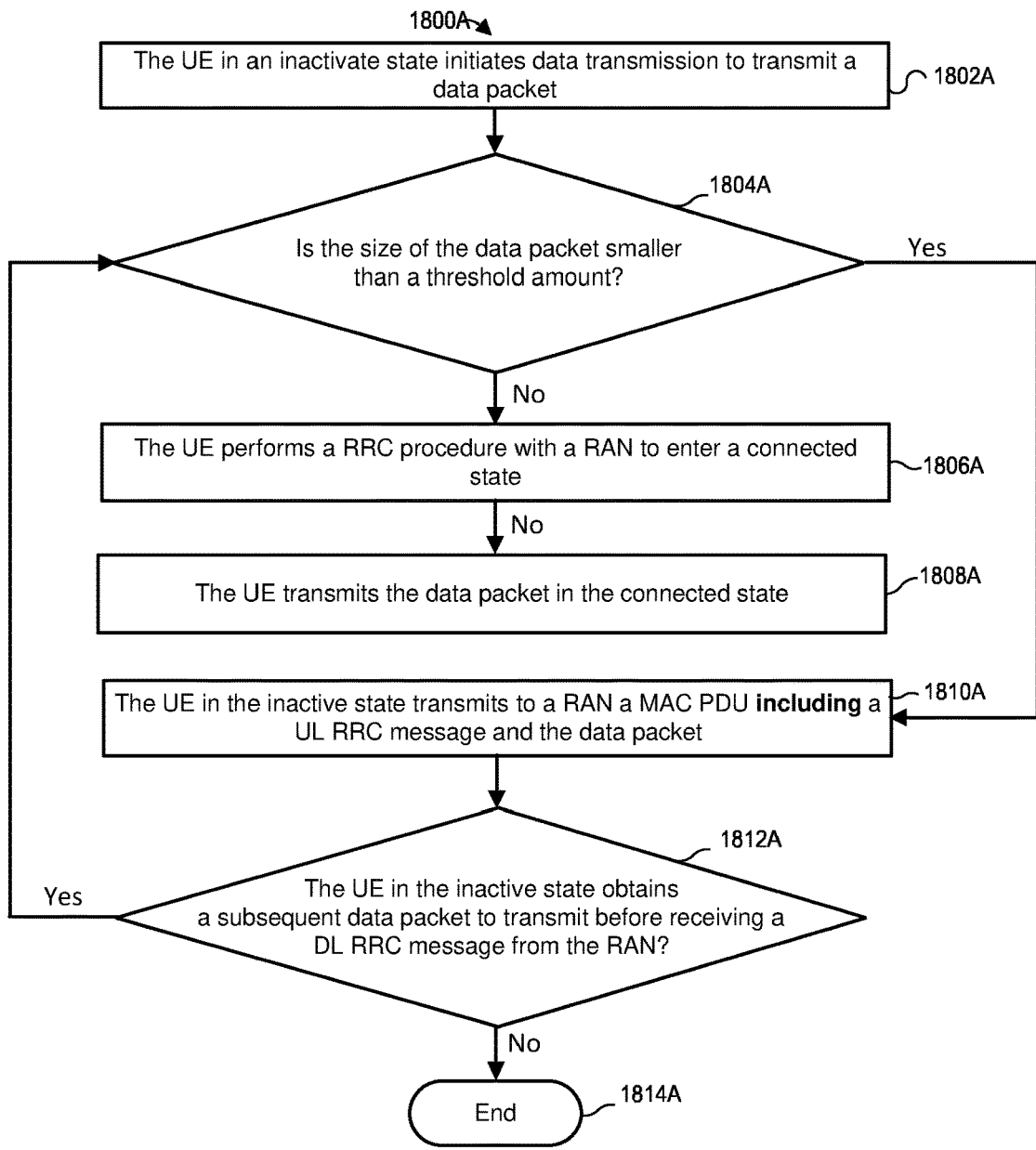
FIG. 18A is a flow diagram of an example method for determining when to enter a connected state when performing early data transmission procedures with a RAN, which can be implemented in the UE of FIG. 1A.

FIG. 18A illustrates an example method 1800A a UE (e.g., the UE 102) can implement to perform data communication in an inactive state of the protocol for controlling radio resources. The method 1800A begins at block 1802A, where the UE in the inactive state initiates data transmission to transmit a data packet (e.g., 304, 404, 504, 604, 704, 804, 904, 1004A, 1004B, 1104). At block 1804A, the UE in the inactive state determines the size of the data packet is smaller than a threshold amount. If the size of the data packet is not smaller than the threshold amount, the UE at block 1806A performs an RRC procedure with a RAN to enter a connected state, and at block 1808A transmits the data packet in the connected state. If the size of the data packet is smaller than the threshold amount, the UE at block 1810A in the inactive state transmits to a RAN (e.g., RAN 105) a MAC PDU, which includes a UL RRC message and the data packet (e.g., events 306, 409, 506, 606, 709, 806, 906, 1009A, 1009B, 1109). At block 1812A, the UE in the inactive state determines whether to obtain a subsequent data packet to transmit before receiving a DL RRC message from the RAN. If the UE obtains a subsequent data packet to transmit before receiving a DL RRC message from the RAN, the UE goes to block 1804A. Otherwise, the method ends at block 1814A. In some implementations, the DL RRC message can be an RRC release message (e.g., events 318, 418, 618, 718, 818, 918). In other implementations, the DL RRC message can be the DL RRC message at event 514. In yet other implementations, the DL RRC message can be the RRC response message at event 1138.

In some implementations, the UE can receive an RRC message from the RAN including a configuration (e.g., IE or field) configuring the amount (value) before initiating the data transmission. For example, the RRC message can be an RRC release message (e.g., the initial RRC message described for FIG. 3A). In another example, the RRC message can be a SIB broadcast by the RAN. In other implementations, the amount (value) can be preconfigured or predetermined by the UE, i.e., not from the RAN.

Figure 18B:
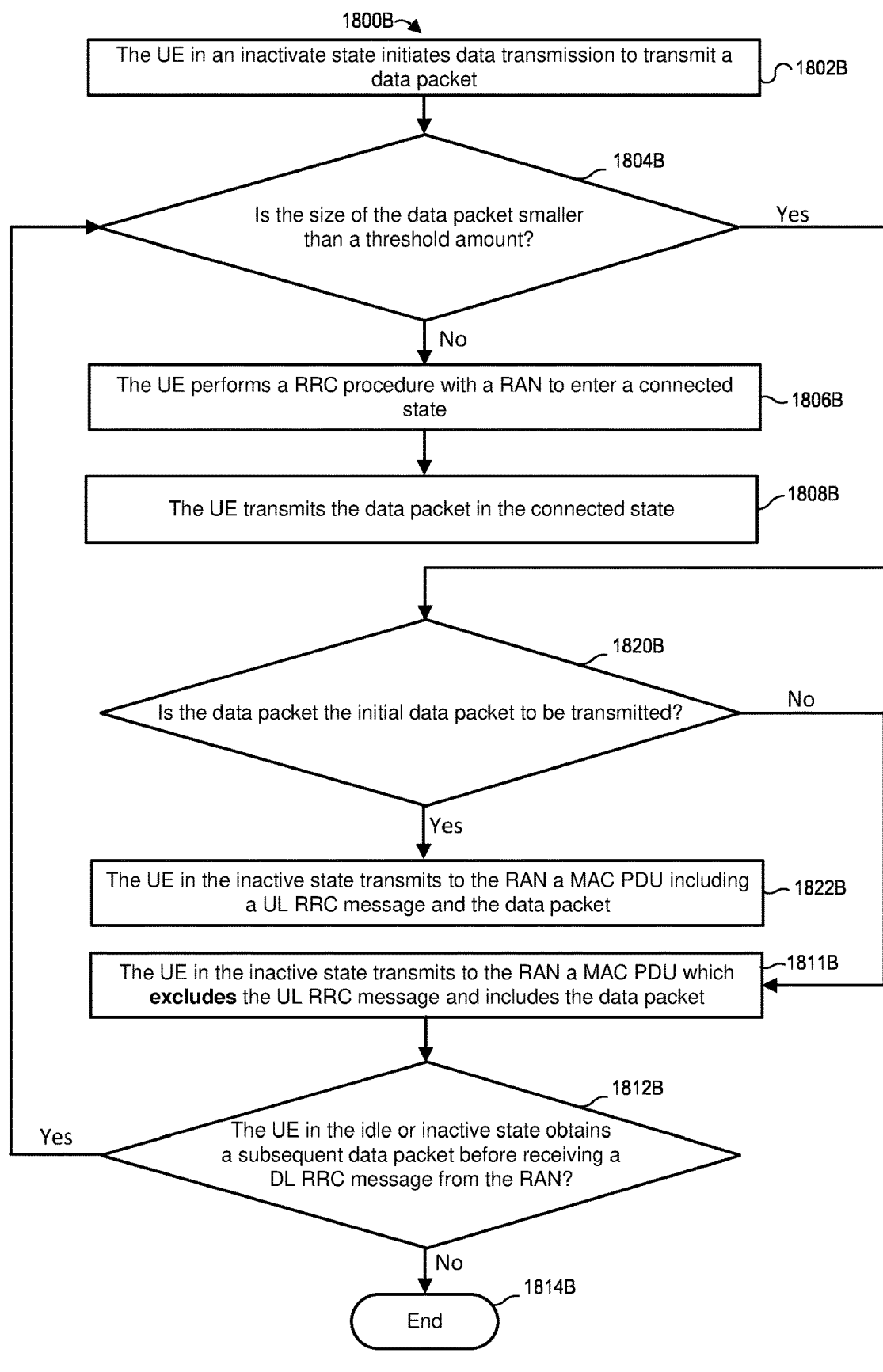
FIG. 18B is a flow diagram of another example method for determining when to enter a connected state when performing early data transmission procedures with a RAN, which can be implemented in the UE of FIG. 1A.

FIG. 18B illustrates an example method 1800B a UE (e.g., the UE 102) can implement to perform data communication in an inactive state of the protocol for controlling radio resources. FIG. 18B is similar to FIG. 18A with difference described below. If the size of the data packet is smaller than the amount, the UE at block 1820B determines whether the data packet is the initial data packet to be transmitted after initiating the data transmission. If the data packet is the initial data packet to be transmitted, the UE in the inactive state, at block 1822B, transmits to a RAN (e.g., RAN 105) a MAC PDU, which includes a UL RRC message and the data packet (e.g., events 306, 409, 506, 606, 709, 806, 906, 1009A, 1009B, 1109). If the data packet is not the initial data packet to be transmitted (i.e. the data packet is a subsequent data packet), the UE in the inactive state, at block 1811B, transmits to a RAN (e.g., RAN 105) a MAC PDU, which excludes a UL RRC message and includes the data packet (e.g., events 410, 710, 910, 1010A, 1010B, 1110).

Embodiments of the techniques described in the present disclosure may include any number of the following aspects, either alone or combination:

1. A method in a UE for early data transmission to a radio access network (RAN), the method comprising: transmitting, by processing hardware and when a radio connection between the UE and the RAN is inactive, an initial data packet to the RAN; transmitting, by the processing hardware subsequent to transmitting the initial data packet and while the radio connection remains inactive, a subsequent data packet to the RAN.

2. The method according to aspect 1, wherein transmitting the initial data packet includes transmitting, by the processing hardware, a radio resource message to the RAN with the initial data packet.

3. The method according to any one of the preceding aspects, wherein transmitting the radio resource message and the initial data packet includes transmitting a protocol data unit (PDU) associated with a media access control (MAC) layer including the radio resource message and the initial data packet.

4. The method according to any one of the preceding aspects wherein the radio resource message is an initial radio resource message and the subsequent data packet is transmitted with a subsequent radio resource message.

5. The method according to any one of the preceding aspects, wherein the subsequent data packet is transmitted without a radio resource message.

6. The method according to any one of the preceding aspects, wherein transmitting the radio resource message and the initial data packet includes transmitting the radio resource message with the initial data packet included in the radio resource message.

7. The method according to any one of the preceding aspects, further comprising:

applying, by the processing hardware, a security function to the initial data packet and the one or more additional data packets using at least one security key to generate an initial security-protected data packet and one or more additional security-protected data packets, wherein: transmitting the initial data packet includes transmitting, by the processing hardware, the initial security-protected data packet to the RAN; and transmitting the subsequent data packet includes transmitting the subsequent security-protected data packet to the RAN.

8. The method according to any one of the preceding aspects, wherein the security function includes an integrity protection function and the initial security-protected data packet includes a message authenticated code for integrity.

9. The method according to any one of the preceding aspects, wherein the radio resource message includes a UE identifier for the RAN to identify a base station storing context information for the UE for retrieving data from the initial and subsequent security-protected data packets.

10. The method according to any one of the preceding aspects, further comprising:

receiving, by the processing hardware, a downlink radio resource message from the RAN; and refraining, by the processing hardware, from using the at least one security key in the early data transmission in response to receiving the downlink radio resource message.

11. The method according to any one of the preceding aspects, further comprising:

receiving, by the processing hardware from the RAN, a release message to configure the UE to remain in an inactive state.

12. The method according to any one of the preceding aspects, further comprising:

receiving, by the processing hardware from the RAN, an initial response message to the initial data packet; and receiving, by the processing hardware from the RAN, a subsequent response message to the subsequent data packet.

13. The method according to any one of the preceding aspects, wherein the initial and subsequent response messages are received after transmitting the initial and subsequent data packets.

14. The method according to any one of the preceding aspects, wherein the initial data packet is an initial uplink data packet, and receiving the initial response message includes receiving, by the processing hardware from the RAN, an initial downlink data packet.

15. The method according to any one of the preceding aspects, wherein receiving the initial downlink data packet includes receiving a downlink radio resource message with the initial downlink data packet included in the downlink radio resource message.

16. The method according to any one of the preceding aspects, further comprising: in response to transmitting the initial data packet to the RAN, receiving, by the processing hardware from the RAN, a response message to cause the UE to transition to the connected state.

17. The method according to any one of the preceding aspects, further comprising: in response to transmitting the initial data packet to the RAN, determining, by the processing hardware, to request the RAN to enter a connected state; and transmitting, by the processing hardware to the RAN, a radio resource message requesting to enter the connected state, wherein the response message is received in response to transmitting the radio resource message to the RAN requesting to enter the connected state.

18. The method according to any one of the preceding aspects, wherein transmitting the radio resource message includes transmitting, by the processing hardware to the RAN, the radio resource message requesting to enter the connected state prior to receiving a release message from the RAN.

19. The method according to any one of the preceding aspects, wherein transmitting the radio resource message includes transmitting, by the processing hardware to the RAN, the radio resource message requesting to enter the connected state after receiving a release message from the RAN.

20. The method according to any one of the preceding aspects, wherein determining to request the RAN to enter the connected state includes: determining, by the processing hardware, that at least one of the initial and subsequent data packets does not qualify for transmission in an inactive state; and determining, by the processing hardware, to request the RAN to enter the connected state in response to determining that the at least one data packet does not qualify for transmission in the inactive state.

21. The method according to any one of the preceding aspects, further comprising: determining, by the processing hardware, whether the RAN supports exchanging a plurality of data packets with the UE operating in an inactive state; wherein transmitting the subsequent data packet includes transmitting, by the processing hardware, the subsequent data packet in response to determining that the RAN supports exchanging the plurality of data packets with the UE operating in the inactive state.

22. The method according to any one of the preceding aspects, further comprising: determining, by the processing hardware, whether the UE is enabled to exchange a plurality of data packets with the RAN while operating in an inactive state; wherein transmitting the subsequent data packet includes transmitting, by the processing hardware, the subsequent data packet in response to determining that the UE is enabled to exchange the plurality of data packets with the RAN while operating in the inactive state.

23. The method according to any one of the preceding aspects, further comprising: starting, by the processing hardware, a timer in response to transmitting the initial data packet.

24. The method according to any one of the preceding aspects, further comprising: starting, by the processing hardware, a first timer in response to transmitting a radio resource message with a data packet; and starting, by the processing hardware, a second timer in response to transmitting the radio resource message without a data packet.

25. The method according to any one of the preceding aspects, wherein the first and second timers have different timer values.

26. The method according to any one of the preceding aspects, further comprising: determining, by the processing hardware, whether a size of the initial or subsequent data packet is smaller than a threshold size.

27. The method according to any one of the preceding aspects, further comprising: in response to determining that the size of the initial or subsequent data packet is not smaller than the threshold size: performing, by the processing hardware, a procedure with the RAN to enter a connected state; and transmitting, by the processing hardware to the RAN, the initial or subsequent data packet in the connected state.

28. The method according to any one of the preceding aspects, further comprising: in response to determining that the size of the initial or subsequent data packet is smaller than the threshold size, transmitting, by the processing hardware, the initial or subsequent data packet to the RAN while the radio connection remains inactive.

29. The method according to any one of the preceding aspects, further comprising: in response to determining that the size of the initial or subsequent data packet is smaller than the threshold size, determining, by the processing hardware, whether the initial or subsequent data packet is the initial data packet to be transmitted; in a first instance, in response to determining that the initial or subsequent data packet is the initial data packet to be transmitted, transmitting, by the processing hardware, the initial data packet to the RAN with a radio resource message; and in a second instance, in response to determining that the initial or subsequent data packet is not the initial data packet, transmitting, by the processing hardware, the subsequent data packet to the RAN without the radio resource message.

30. The method according to any one of the preceding aspects, further comprising: prior to transmitting the initial data packet to the RAN, receiving, by the processing hardware from the RAN, a paging message for a downlink early data transmission; and transmitting, by the processing hardware, a radio resource message to the RAN without a data packet.

31. The method according to any one of the preceding aspects, further comprising: receiving, by the processing hardware, one or more downlink data packets from the RAN; receiving, by the processing hardware from the RAN, a release message to configure the UE to remain in an inactive state, wherein the initial data packet and the subsequent data packet is transmitted after receiving the release message from the RAN.

32. A user equipment (UE) comprising processing hardware and configured a method according to any one of the preceding aspects.

33. A method in a radio access network (RAN) for processing early data transmissions from a UE, the method comprising: receiving, by processing hardware and when a radio connection between the UE and the RAN is inactive, an initial data packet from the UE; and prior to activating or releasing the radio connection, receiving, by the processing hardware from the UE, a subsequent data packet.

34. The method according to aspect 33, wherein receiving the initial data packet includes receiving, by the processing hardware from the UE, a radio resource message with the initial data packet.

35. The method according to either one of aspect 33 or aspect 34, wherein receiving the radio resource message and the initial data packet includes receiving a protocol data unit (PDU) associated with a media access control (MAC) layer including the radio resource message and the initial data packet.

36. The method according to any of the aspects 33-35, wherein the radio resource message is an initial radio resource message and the subsequent data packet is received with a subsequent radio resource message.

37. The method according to any of the aspects 33-36, wherein the subsequent data packet is received without a radio resource message.

38. The method according to any of the aspects 33-37, wherein receiving the radio resource message and the initial data packet includes receiving the radio resource message with the initial data packet included in the radio resource message.

39. The method according to any of the aspects 33-38, further comprising: transmitting, by the processing hardware to the UE, an initial response message to the initial data packet; and transmitting, by the processing hardware to the UE, a subsequent response message to the subsequent data packet.

40. The method according to any of the aspects 33-39, wherein transmitting the initial and subsequent response messages includes transmitting, by the processing hardware to the UE, the initial and subsequent response messages after receiving the initial and subsequent data packets.

41. The method according to any of the aspects 33-40, further comprising: transmitting, by the processing hardware to the UE, a release message to configure the UE to remain in an inactive state.

42. The method according to any of the aspects 33-41, wherein transmitting the release message includes transmitting, by the processing hardware to the UE, the release message to configure the UE to remain in the inactive state after receiving the initial and subsequent data packets.

43. The method according to any of the aspects 33-42, further comprising: determining, by the processing hardware, whether additional data needs to be exchanged between the UE and the RAN, wherein the release message is transmitted to the UE in response to determining that additional data does not need to be exchanged between the UE and the RAN.

44. The method according to any of the aspects 33-43, further comprising: determining, by the processing hardware, whether the UE supports exchanging a plurality of data packets with the RAN while operating in an inactive state, wherein the release message is transmitted to the UE in response to determining that the UE does not support exchanging the plurality of data packets with the RAN while operating in the inactive state.

45. The method according to any of the aspects 33-45, further comprising: determining, by the processing hardware, whether the RAN is enabled to exchange a plurality of data packets with the UE while the UE operates in an inactive state, wherein the release message is transmitted to the UE in response to determining that the RAN is not enabled to exchange the plurality of data packets with the UE while the UE operates in the inactive state.

46. The method according to any of the aspects 33-45, further comprising: refraining from configuring the UE to enter a connected state while receiving the initial and subsequent data packets.

47. The method according to any of the aspects 33-46, further comprising: transmitting, by the processing hardware, the initial data packet and the subsequent data packet to a core network.

48. The method according to any of the aspects 33-47, wherein receiving the initial and subsequent data packets includes receiving, by the processing hardware, an initial security-protected data packet and a subsequent security-protected data packet.

49. The method according to any of the aspects 33-48, further comprising: generating, by the processing hardware, at least one security key; applying, by the processing hardware, the at least one security key to the initial security-protected data packet and the subsequent security-protected data packet to obtain the initial data packet and the subsequent data packet; and transmitting, by the processing hardware, the initial data packet and the subsequent data packet to a core network.

50. The method according to any of the aspects 33-49, further comprising: receiving, by the processing hardware from the UE, a radio resource message with the initial data packet; and identifying, by the processing hardware, the UE from the radio resource message.

51. The method according to any of the aspects 33-50, wherein the initial and subsequent data packets are received at a first base station in the RAN, and further comprising: determining, by the processing hardware, that a second base station in the RAN stores context information for the UE for retrieving data from the security-protected data packets based on the identity of the UE.

52. The method according to any of the aspects 33-51, further comprising: retrieving, by the first base station, the context information for the UE from the second base station; deriving, by the first base station, at least one security key from the context information; and applying, by the first base station, the at least one security key to the initial security-protected data packet and the subsequent security-protected data packet to obtain the initial data packet and the subsequent data packet.

53. The method according to any of the aspects 33-52, further comprising:
transmitting, by the first base station, the initial security-protected data packet to the second base station.

54. The method according to any of the aspects 33-53, further comprising: retrieving, by the first base station, the context information for the UE from the second base station; deriving, by the first base station, at least one security key from the context information; and applying, by the first base station, the at least one security key to the subsequent security-protected data packet to obtain the subsequent data packet.

55. The method according to any of the aspects 33-54, further comprising: in response to receiving the initial data packet, transmitting, by the processing hardware to the UE, a response message to cause the UE to transition to the connected state.

56. The method according to any of the aspects 33-55, further comprising: receiving, by the processing hardware from the UE, a radio resource message requesting to enter the connected state.

57. The method according to any of the aspects 33-56, further comprising: in response to receiving the initial data packet, determining, by the processing hardware, to configure the UE to enter the connected state.

58. A method in a radio access network (RAN) for downlink early data transmission with a UE, the method comprising: transmitting, by processing hardware to the UE when a radio connection between the UE and the RAN is inactive, a paging message for a downlink early data transmission; transmitting, by the processing hardware, an initial downlink data packet to the UE; and prior to activating or releasing the radio connection, transmitting, by the processing hardware to the UE, a subsequent downlink data packet.

59. The method according to any one of the aspects 33-58, wherein the paging message is transmitted prior to receiving the initial data packet from the UE, and further comprising: receiving, by the processing hardware from the UE, a radio resource message without a data packet in response to transmitting the paging message.

60. The method according to any one of the aspects 33-59, further comprising: transmitting, by the processing hardware to the UE, a release message to configure the UE to remain in an inactive state, wherein the initial data packet and the subsequent data packet is received after transmitting the release message to the UE.

61. A RAN comprising processing hardware and configured a method according to any of the aspects 33-60.

The following description may be applied to the description above.

In some implementations, "message" is used and can be replaced by "information element (IE)". In some implementations, "IE" is used and can be replaced by "field". In some implementations, "configuration" can be replaced by "configurations" or the configuration parameters.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

What is claimed is:

1. A method for wireless communication in a user equipment (UE), the method comprising:
    applying an encryption function to an initial data packet and a subsequent data packet using at least one security key to generate an initial security-protected data packet and a subsequent security-protected data packet;
    determining whether a size of the initial or subsequent security-protected data packet is smaller than a threshold size;
    in response to determining that the size of the initial or subsequent security-protected data packet is smaller than the threshold size and in response to determining that the initial or subsequent security-protected data packet is the initial security-protected data packet: transmitting, when a radio connection between the UE and a radio access network (RAN) is inactive, the initial security-protected data packet to the RAN with a radio resource message;
    receiving, subsequent to transmitting the initial security-protected data packet and while the radio connection remains inactive, downlink control information (DCI) from the RAN; and
    in response to determining that the initial or subsequent security-protected data packet is not the initial security-protected data packet, transmitting, subsequent to transmitting the initial security-protected data packet and while the radio connection remains inactive, the subsequent security-protected data packet to the RAN using the DCI without the radio resource message.

2. The method of claim 1, wherein the radio resource message is a radio resource control (RRC) message including a UE identifier for the RAN to identify context information for the UE for retrieving data from the initial and subsequent security-protected data packets.

3. The method of claim 1, further comprising:
    receiving a downlink radio resource message from the RAN; and
    refraining from using the at least one security key in an early data transmission in response to receiving the downlink radio resource message.

4. The method of claim 1, further comprising:
    receiving, from the RAN, a release message to configure the UE to remain in an inactive state;
    receiving, from the RAN, an initial response message to the initial security-protected data packet; and
    receiving, from the RAN, a subsequent response message to the subsequent security-protected data packet;
    wherein the initial and subsequent response messages are received after transmitting the initial and subsequent security-protected data packets, respectively.

5. The method of claim 4, wherein the initial response message includes the DCI from the RAN and wherein the subsequent response message includes a subsequent DCI from the RAN.

6. The method of claim 1, further comprising:

in response to transmitting the initial security-protected data packet to the RAN, receiving, from the RAN, a response message to cause the UE to transition to the connected state;

in response to transmitting the initial security-protected data packet to the RAN, determining to request the RAN to enter a connected state; and transmitting, to the RAN, a radio resource message requesting to enter the connected state, wherein the response message is received in response to transmitting the radio resource message to the RAN requesting to enter the connected state; and/or wherein transmitting the radio resource message includes at least one of:

transmitting, to the RAN, the radio resource message requesting to enter the connected state prior to receiving a release message from the RAN, or transmitting, to the RAN, the radio resource message requesting to enter the connected state after receiving the release message from the RAN.

7. The method of claim 1, further comprising:

prior to transmitting the initial security-protected data packet to the RAN, receiving, from the RAN, a paging message for a downlink early data transmission;

transmitting a radio resource message to the RAN without a data packet;

receiving one or more downlink data packets from the RAN;

receiving, from the RAN, a release message to configure the UE to remain in an inactive state, wherein the initial security-protected data packet and the subsequent security-protected data packet is transmitted after receiving the release message from the RAN.

8. A user equipment (UE) comprising:

memory; and at least one processor coupled to the memory and configured to:

apply an encryption function to an initial data packet and a subsequent data packet using at least one security key to generate an initial security-protected data packet and a subsequent security-protected data packet;

determine whether a size of the initial or subsequent security-protected data packet is smaller than a threshold size;

in response to determining that the size of the initial or subsequent security-protected data packet is smaller than the threshold size and in response to determining that the initial or subsequent security-protected data packet is the initial security-protected data packet: transmit, when a radio connection between the UE and a radio access network (RAN) is inactive, the initial security-protected data packet to the RAN with a radio resource message;

receive, subsequent to transmitting the initial security-protected data packet and while the radio connection remains inactive, downlink control information (DCI) from the RAN; and in response to determining that the initial or subsequent security-protected data packet is not the initial security-protected data packet, transmit, subsequent to transmitting the initial security-protected data packet and while the radio connection remains inactive, the subsequent security-protected data packet to the RAN using the DCI without the radio resource message.

9. The UE of claim 8, wherein the at least one processor is further configured to:

receive, from the RAN, an initial response message to the initial security-protected data packet; and receive, from the RAN, a subsequent response message to the subsequent security-protected data packet;

wherein the initial and subsequent response messages are received after transmission of the initial and subsequent security-protected data packets, respectively.

10. The UE of claim 9, wherein the initial response message includes the DCI from the RAN and wherein the subsequent response message includes a subsequent DCI from the RAN.

* * * * *